US010424000B2

(12) United States Patent
Chow

(10) Patent No.: US 10,424,000 B2

(45) Date of Patent: Sep. 24, 2019

(54) METHODS AND SYSTEMS FOR ANNOTATION OF DIGITAL INFORMATION

(71) Applicant: Edmond K. Chow, Hong Kong (HK)

(72) Inventor: Edmond K. Chow, Hong Kong (HK)

( * ) Notice: Subject to any disclaimer, the term of this patent is extended or adjusted under 35 U.S.C. 154(b) by 0 days.

(21) Appl. No.: 15/059,317

(22) Filed: Mar. 3, 2016

(65) Prior Publication Data

US 2016/0225059 A1 Aug. 4, 2016

Related U.S. Application Data

(63) Continuation-in-part of application No. 14/604,458, filed on Jan. 23, 2015, now abandoned, which is a (Continued)

(51) Int. Cl.

*G06F 7/02* (2006.01)

*G06F 16/00* (2019.01)

(Continued)

(52) U.S. Cl.

CPC ......... *G06Q 30/0625* (2013.01); *G06F 16/22* (2019.01); *G06F 16/245* (2019.01);

(Continued)

(58) Field of Classification Search

CPC ........... G06Q 30/0625; G06Q 30/0623; G06Q 30/0629; G06F 17/30312; G06F 17/30525;

(Continued)

(56) References Cited

U.S. PATENT DOCUMENTS

| | | | |
|---|---|---|---|
| 5,606,688 | A | 2/1997 | McNutt et al. |
| 5,850,446 | A | 12/1998 | Berger et al. |

(Continued)

*Primary Examiner* — Bruce M Moser

(74) *Attorney, Agent, or Firm* — BakerHostetler

(57) ABSTRACT

Disclosed is an invention for methods, processes and systems that, among its enabling features and benefits, enhance retrieval of relevant information over a communication network. For instance, methods, processes and systems for performing annotation of digital information are provided. One method includes searching for items of interest using a search engine. Once the URIs associated with the item of interest are identified, a plurality of attributes are provided that may be associated with each URI. A user may provide the values for the attributes or the system may suggest values for the attributes based on information associated with each URI. Once the attributes and values are assigned, the annotated URI along with the attributes and values is stored. Another method provides for sharing of the annotated information. A user may communicate annotated information to an external storage system for sharing with other users having access to the external storage system. Another method provides for automatic updates of the annotation entries by periodically fetching the digital information associated with each URI and updating the values associated with each attribute. In addition, a system, method or process may provide a more reliable, inclusive, or otherwise effective way of collecting or identifying quality reviews for products, services, and sellers. Furthermore, a system, method or process may enable or otherwise enhance generation of actionable information for online shopping or comparative shopping. Furthermore, according to one embodiment, an interface or protocol that a computer uses to communicate with other computers is associated with a subject matter context. User-level contents or digital resources received across that interface or protocol are then associated with that subject matter context, and the com- (Continued)

puter may respond accordingly. For instance, a computer may associate a given network port with a subject matter context of shopping, and treat all digital resource requests received on that port as applying to only a shopping subject matter context. A web server may also listen on a network port associated with a subject matter context, thereby contextualizing the overall nature of the web site that the web server hosts.

27 Claims, 32 Drawing Sheets

Related U.S. Application Data continuation-in-part of application No. 13/631,465, filed on Sep. 28, 2012, now Pat. No. 9,015,166, which is a continuation-in-part of application No. 13/615,079, filed on Sep. 13, 2012, now abandoned, which is a continuation-in-part of application No. 12/505,328, filed on Jul. 17, 2009, now Pat. No. 8,301,631, application No. 15/059,317, which is a continuation-in-part of application No. 13/850,295, filed on Mar. 25, 2013, now abandoned, and a continuation-in-part of application No. 13/161,155, filed on Jun. 15, 2011, now abandoned.

(60) Provisional application No. 61/182,693, filed on May 30, 2009, provisional application No. 61/615,274, filed on Mar. 24, 2012, provisional application No. 61/354,702, filed on Jun. 15, 2010.

(51) Int. Cl.

| | |
|---|---|
| ***G06Q 30/06*** | (2012.01) |
| ***G06F 17/24*** | (2006.01) |
| ***H04L 29/08*** | (2006.01) |
| ***G06F 16/22*** | (2019.01) |
| ***G06F 16/955*** | (2019.01) |
| ***G06F 16/2457*** | (2019.01) |
| ***G06Q 30/02*** | (2012.01) |
| ***G06F 16/245*** | (2019.01) |
| *G06Q 50/00* | (2012.01) |

(52) U.S. Cl.
CPC ...... *G06F 16/24573* (2019.01); *G06F 16/955* (2019.01); *G06F 17/241* (2013.01); *G06Q 30/0263* (2013.01); *G06Q 30/0282* (2013.01); *H04L 67/02* (2013.01); *G06Q 50/01* (2013.01)

(58) Field of Classification Search
CPC ......... G06F 17/30861; G06F 17/30864; G06F 17/30876; G06F 16/22; G06F 16/24573; G06F 16/95; G06F 16/951; G06F 16/955
See application file for complete search history.

(56) References Cited

U.S. PATENT DOCUMENTS

| | | | | |
|---|---|---|---|---|
| 5,941,954 | A | 8/1999 | Kalajan | |
| 6,631,496 | B1 | 10/2003 | Li et al. | |
| 6,877,137 | B1 | 4/2005 | Rivette et al. | |
| 6,904,408 | B1 | 6/2005 | Mccarthy | |
| 7,058,695 | B2 | 6/2006 | Takagi et al. | |
| 7,085,736 | B2 | 8/2006 | Keezer et al. | |
| 7,185,073 | B1 | 2/2007 | Gai et al. | |
| 7,315,830 | B1 | 1/2008 | Wirtz et al. | |
| 7,421,448 | B2 | 9/2008 | Spork | |
| 7,536,323 | B2 | 5/2009 | Hsieh | |
| 7,584,194 | B2 | 9/2009 | Tuttle et al. | |
| 7,610,484 | B2 | 10/2009 | Kapoor | |
| 7,698,398 | B1 | 4/2010 | Lai | |
| 7,761,436 | B2 | 7/2010 | Norton et al. | |
| 7,792,709 | B1 * | 9/2010 | Trandal | G06Q 30/02 705/26.1 |
| 8,001,003 | B1 | 8/2011 | Robinson et al. | |
| 8,069,435 | B1 | 11/2011 | Lai | |
| 8,121,902 | B1 | 2/2012 | Desjardins et al. | |
| 8,127,008 | B2 | 2/2012 | Manning et al. | |
| 8,146,134 | B2 | 3/2012 | Bechtel et al. | |
| 8,321,300 | B1 | 11/2012 | Bockius et al. | |
| 8,527,629 | B2 | 9/2013 | Manning et al. | |
| 8,763,074 | B2 | 6/2014 | Bechtel et al. | |
| 2002/0112152 | A1 | 8/2002 | Vanheyningen | |
| 2002/0144156 | A1 | 10/2002 | Copeland | |
| 2004/0138946 | A1 | 7/2004 | Stolze | |
| 2004/0199430 | A1 | 10/2004 | Hsieh | |
| 2004/0220884 | A1 * | 11/2004 | Khan | G06Q 30/08 705/80 |
| 2005/0065958 | A1 | 3/2005 | Dettinger et al. | |
| 2005/0078668 | A1 | 4/2005 | Wittenberg | |
| 2005/0114271 | A1 | 5/2005 | Sindambiwe | |
| 2005/0125718 | A1 * | 6/2005 | Van Doorn | G08C 17/00 715/234 |
| 2005/0234891 | A1 | 10/2005 | Walther et al. | |
| 2006/0056317 | A1 | 3/2006 | Manning | |
| 2006/0059092 | A1 | 3/2006 | Burshan | |
| 2006/0265417 | A1 | 11/2006 | Amato | |
| 2007/0022098 | A1 | 1/2007 | Malik | |
| 2007/0022135 | A1 | 1/2007 | Malik | |
| 2007/0106620 | A1 | 5/2007 | Khandelwal | |
| 2008/0005064 | A1 | 1/2008 | Sarukkai | |
| 2008/0195495 | A1 | 8/2008 | Rubin | |
| 2008/0201326 | A1 | 8/2008 | Cotter | |
| 2009/0044144 | A1 | 2/2009 | Morris | |
| 2010/0011282 | A1 | 1/2010 | Dollard et al. | |
| 2010/0107215 | A1 | 4/2010 | Bechtel et al. | |
| 2010/0306080 | A1 * | 12/2010 | Trandal | G06Q 10/10 705/26.8 |
| 2012/0278252 | A1 | 11/2012 | Sethna | |
| 2015/0039462 | A1 * | 2/2015 | Shastry | G06Q 30/0633 705/26.7 |

* cited by examiner

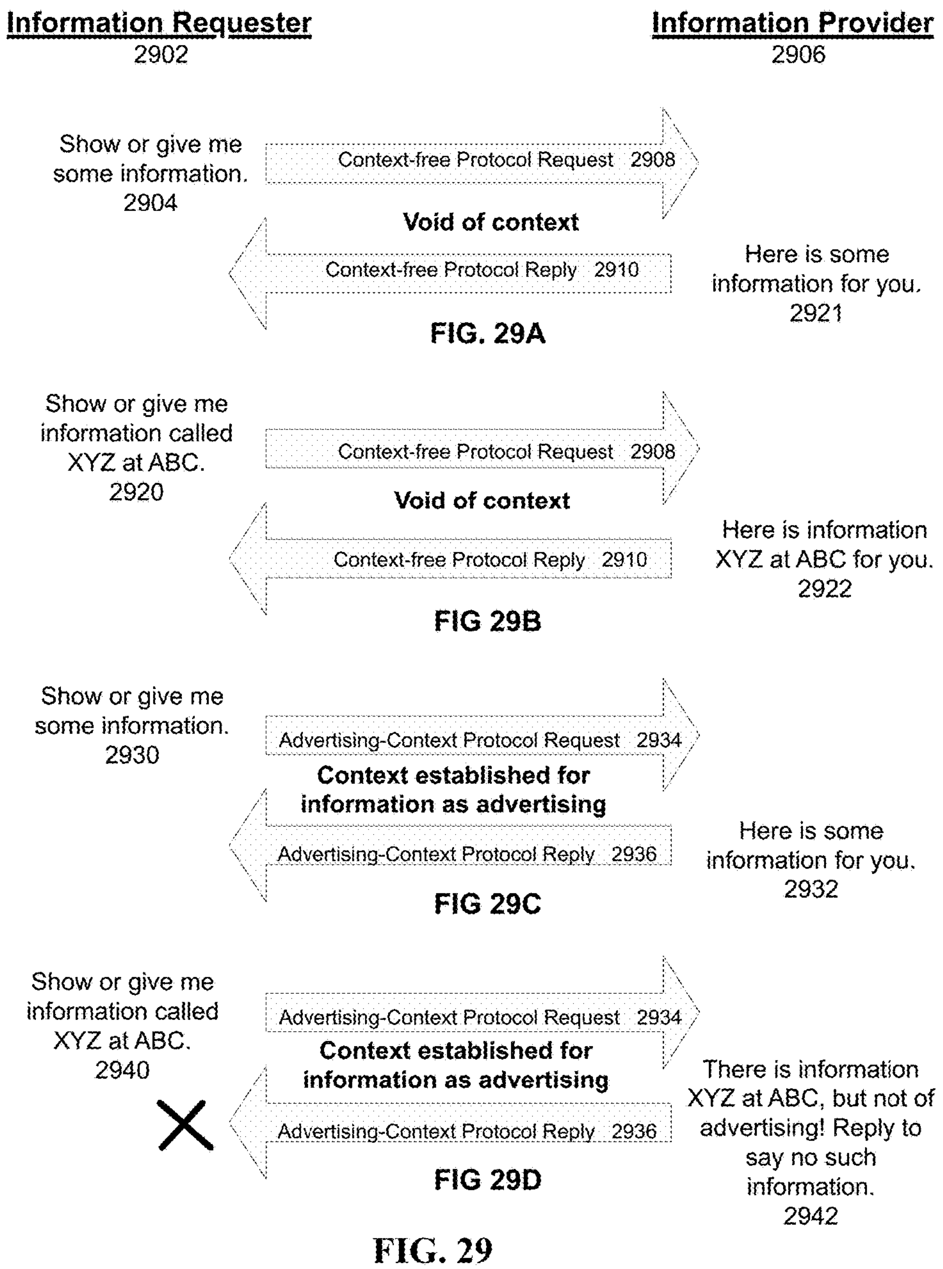

FIG. 29

Information Requester
2902

Information Provider
2906

Show or give me
some information.
2904

Context-free Protocol Request 2908 →

Void of context

← Context-free Protocol Reply 2910

Here is some
information for you.
2921

Show or give me
information called
XYZ at ABC.
2920

Context-free Protocol Request 2908 →

Void of context

← Context-free Protocol Reply 2910

Here is information
XYZ at ABC for you.
2922

Show or give me
some information.
2930

Advertising-Context Protocol Request 2934 →

**Context established for
information as advertising**

← Advertising-Context Protocol Reply 2936

Here is some
information for you.
2932

Show or give me
information called
XYZ at ABC.
2940

Advertising-Context Protocol Request 2934 →

**Context established for
information as advertising**

← Advertising-Context Protocol Reply 2936

There is information
XYZ at ABC, but not of
advertising! Reply to
say no such
information.
2942

METHODS AND SYSTEMS FOR ANNOTATION OF DIGITAL INFORMATION

CROSS REFERENCE TO RELATED APPLICATIONS

This application is a continuation-in-part of U.S. application Ser. No. 14/604,458, filed Jan. 23, 2015, which is a continuation-in-part of U.S. application Ser. No. 13/631,465, filed Sep. 28, 2012, and entitled "Methods and Systems for Annotation of Digital Information" (issued as U.S. Pat. No. 9,015,166 on Apr. 21, 2015), which is a continuation-in-part of U.S. application Ser. No. 13/615,079, filed Sep. 13, 2012, which is a continuation-in-part of U.S. application Ser. No. 12/505,328, filed Jul. 17, 2009, and entitled "Methods and Systems for Annotation of Digital Information" (issued as U.S. Pat. No. 8,301,631 on Oct. 30, 2012), which claims benefit under 35 U.S.C. § 119(e) of U.S. Provisional Patent Application No. 61/182,693, filed May 30, 2009, and entitled "Comparative Annotation," each of which is hereby incorporated by reference in its entirety.

This application is also a continuation-in-part of U.S. application Ser. No. 13/850,295, filed Mar. 25, 2013, which claims benefit under 35 U.S.C. § 119(e) of U.S. Provisional Patent Application No. 61/615,274, filed Mar. 24, 2012, each of which is hereby incorporated by reference in its entirety.

This application is also a continuation-in-part of U.S. application Ser. No. 13/161,155, filed Jun. 15, 2011, which claims benefit under 35 U.S.C. § 119(e) of U.S. Provisional Patent Application No. 61/354,702, filed Jun. 15, 2010, each of which is hereby incorporated by reference in its entirety.

TECHNICAL FIELD

This invention relates to methods, processes, and systems for transfer, distribution or sharing of information over a communication network.

BACKGROUND

As the use of the Internet proliferates, it is increasingly being used as a vehicle for buying and selling of goods and services. The vendors who sell their goods or services on the Internet are often referred to as "online merchants." These online merchants primarily use a website to advertize their products and services and secure orders from consumers for their offerings. For instance, a typical online merchant webpage may display relevant information about a product including but not limited to its price, sales tax, shipping and warranty information and details about the product. The information displayed on a website is often encoded in a digital form. Such information may be generally referred to as 'digital information.' One of the most difficult tasks for a consumer is to determine which online merchant is offering the best bargain for a particular product or service. To this effect, consumers often engage in bargain hunting where they may visit online merchants and bookmark the webpage displaying information about the product or service of interest to them. In some instances, the consumer may add some information e.g., metadata, of his own to each product web page so bookmarked. This activity of adding additional information is sometimes referred to as "annotation" or "tagging."

The idea of tagging is not limited to textual information. Any type of digital information e.g., audio, video, graphics, etc. may be tagged. For example, a person watching or having watched a video online may provide annotation against the video or the location of the video.

However, the conventional techniques for gathering and analyzing such digital information often involves manual processing of the tags and annotations. For example, a webpage or a Web resource on the World Wide Web ("Web") is most often identified by a Uniform Resource Identifier (URI) or Uniform Resource Locator (URL). Other digital information available on a storage medium or a network may be identified by a "recall handle" similar to a URI or URL. Like the URI or URL, each recall handle is unique and is associated with only one item or page of information. Conventional techniques allow use of associating relevant keywords and phrases with a webpage, which is otherwise contextually uncertain. A user may be able to group contextually related web pages for later use. However, in some instances, web pages that share the same or similar annotation keywords and phrases may be grouped together even if they are contextually different. In addition, if the number of related web pages in a group lack specific information of interest to the user, it becomes difficult for the user to judge the relevancy of the web pages in light of the desired data to be analyzed. For example, a user may bookmark several web pages during his research, which he believes provide the information of his interest. The user may group these pages together as relating to the same item of interest. However, these bookmarked pages may not contain information that is actually relevant to what the user is searching. Subsequently, if the user attempts to extract relevant information from each of these bookmarked pages, he will have difficulty in evaluating the merits and relevancy of the information contained in the bookmarked web pages. The level of difficulty encountered by the user is directly proportional to the number of web pages being bookmarked.

Therefore, there is a need in the art for a method, process and system for efficient annotation or identification of digital information.

Moreover, in the era of the Internet, online reviews, including opinions, ratings and votes, are influential in determining the success of a product or seller. However, the current approaches to collecting such reviews cause scattering of knowledge for the same product or seller, or questionable reliability of the resulting data. For instance, some websites limit sources of reviews to well-known commentators, select reviewers, and people who have purchased the product from the websites. While this approach alleviates the potential inaccuracy of including reviews and ratings from people who may not have actually experienced or otherwise engaged with the product or seller, it excludes input from people who may have bought the product or interacted with the seller on another website, or at a brick-and-mortar store. Inevitably, if these people were to provide their opinions, they need to do so elsewhere thereby creating multiple destinations for reviews for the same product or seller. To be more inclusive, some other website, for example, allows any member to provide reviews against a product or seller. However, the readers of these reviews and ratings do not know if they came from a real customer or not. To achieve a compromise between such reliability and inclusivity, some websites allow reviews and ratings from non-customers, while providing an indicator to reviews associated with their customers. However, this approach could discriminate reviews from people who did purchase the product elsewhere. The present invention addresses these problems, and provides other benefits.

Furthermore, the World Wide Web (the Web) is an open distributed online repository of digital resources available through the Internet, mostly in form of web pages linked to one another through hypertext (or more broadly, hypermedia) links. Publication or retrieval of digital resources on the Web may be made by anyone via a server capable of accepting and handling HTTP (HyperText Transport Protocol) requests at a specific TCP/IP (Transport Control Protocol/Internet Protocol) port over the Internet. (The default or well-known TCP port for the Web is port 80, a network port number.) Because of the vast amount of digital resources available on the Web, tools are available for online users or consumers to locate relevant digital resources quickly, such as via a search engine. These tools may mostly be automated (e.g., crawling and indexing webpages) to collect information useful for this purpose. However, the accuracy of such effort has so far been met with limited success, because despite both digital resources (such as webpages) and requests for information (e.g., queries for digital resources relevant to a certain interest) may often belong to or otherwise be associated with a certain primary semantic context, there lack reliable and effective tools or schemes to establish contexts of digital resources and match them against requests consistent with their contexts.

For instance, one type of information pervasive on the Web is advertising. An ad may appear on the same webpage whose primary content may be regarded as belonging to another type or context, such as a journalistic article about health in relation to an ad about a mobile phone. In general, websites may exhibit third-party ads for revenue paid for, for example, by ad sponsors. An ad sponsor is one who is responsible for the cost of an ad placement. In comparison, an ad exhibitor is one that presents ads, such as an ad-carrying website. An ad content provider is one that prepares and produces ad content. On the other hand, a digital resource (or simply a resource) such as a webpage may comprise primarily content of advertising nature, such as those made available by a shopping website.

A user or consumer may often use search engines to research or otherwise discover information of some specific interest, such as looking up medical studies or research publications, shopping for a car, or planning for a trip. A search engine may be regarded as having three components: (a) a component that combs or crawls the Web for content, and indexes the content for suitable storage and optimal lookup; (b) a component that stores and maintains the indexed content; and (c) a component that accepts user queries, such as search words or phrases, and performs lookup against the indexed content, and returns search results to the users. (Often these search results comprise indications of digital resources, such as URLs (Uniform Resource Locators) of webpages and URIs (Uniform Resource Identifiers) of resources. Indications of digital resources may also be regarded as digital resources.) The last component may be available to a user in form of a webpage. In contrast, there may be websites that collect online resources of some specific interest, and allow users to provide queries against or submissions to these collections. For example, a shopping website may allow a seller to submit its individual products and their prices based on some data formats via a submission portal. Yet these seemingly more context-certain websites do not replace the use of search engines for context-specific information dissemination and discovery, because the former may only capture a small portion of the relevant resources that the Web would have, while the latter not only have the Web as their target for information capture, but also impose no website-specific formats or interfaces on content providers as pre-requisite for making resources available to such information capture. For instance, any digital resources accessible via HTTP (HyperText Transport Protocol) may be made available on the Web.

However, because the Web is context ignorant, any kind of information may be published, including but not limited to political news, personal blogs and entertainments. In addition, a single webpage may comprise content of possibly incompatible contexts, such as a news report about a political election with an ad about a product or service for travel. Such contextual uncertainty or ambiguity poses a substantial challenge to search engines that comb the Web for resources consistent with a certain interest or specific to a certain semantic context, such as ads of products and services. For example, a search for a particular product or service could result in web pages that simply contain the search words but are totally irrelevant to the user's intent. In addition, some content provider may deliberately put popular but contextually inconsistent terms or content in their digital resources (e.g., on their webpages) so to increase their relevancy to queries that may otherwise find them irrelevant.

Embodiments of the present invention would not only provide remedies to the above problems, but also make possible context-aware communications for dissemination and retrieval of digital resources.

SUMMARY

Embodiments of this invention provide methods and systems for annotating digital information. In an embodiment, method includes receiving a search term, presenting a plurality of search results based at least in part on the search term, the search results being presented by providing a plurality of unique identifiers, wherein at least one of the search result is associated with one of the unique identifiers, receiving input indicative of a selection of a first unique identifier. The method further includes providing a list of one or more attributes to be associated with the first unique identifier, receiving data to be associated with the one or more attributes, annotating the first unique identifier with the one or more attributes, which include data from the one or more pages, and saving, in a storage medium, the annotated first unique identifier.

Other embodiments of the present invention provide a method for sharing of annotated digital information. In an embodiment, the method includes presenting a user with information that matches a search term, wherein each page is identified by a unique identifier, identifying one or more attributes to be associated with a first unique identifier from the unique identifiers for the pages, receiving data to be assigned to the one or more attributes, annotating the first unique identifier by associating the one or more attributes with the first unique identifier, and communicating the annotated first unique identifier to an external system, the external system configured to store the annotated first unique identifier in a database.

Still other embodiments of the present invention provide a system for performing annotations to digital information. In an embodiment, the system may include a client computer configured to execute a search query based on a search term. The client computer may further include a user interface module configured to accept the search term and present search results to a user and an annotation collection module configured to communicate with the user interface and one or more search engines to provide search results to the user interface. The system may further include an annotation collection service. The annotation collection service may include a database module configured to store annotated URIs and information associated with the annotated URIs, an annotation engine configured to communicate with the annotation collection module to exchange annotation information, a retrieval module configured to receive queries from the client computer and provide information about annotated URIs to the client computer, and a fetching module communicably coupled to the annotation engine for receiving caching requests and providing cached information to the annotation engine.

Some embodiments of the present invention provide a user interface that includes a first section for accepting a search term, a second section for selecting a search engine to execute the search term, a third section for displaying a unique identifier for a webpage or website identified by the search engine, a fourth section for displaying at least a portion of information included on the identified webpage or website, a fifth section for selecting an attribute to be associated with the unique identifier, and a sixth section for entering data to be associated with the selected attribute.

In accordance with one aspect of the invention, there is provided a method for collecting reviews with verifiable proof of engagement. The method involves receiving in a database from a user an indication of review information relative to a subject matter and an indication of a proof of engagement relative to the subject matter; storing in the database a review entry and a proof record, the review entry relative to the review information, and the proof record relative to the proof of engagement; associating in the database the proof record with the review entry; determining in the database that indications of other review entries associated with the subject matter exist; associating in the database the review entry with the subject matter; receiving from another user a request relative to the subject matter; and in response to the request, presenting to the other user an indication of feedback, the feedback based at least in part on the review entry and one or more of the other review entries. In one embodiment, the feedback presented to the other user includes an indication of the proof record associated with the review entry, or the availability of the proof record, where the other user may retrieve the proof record via the indication.

In accordance with another aspect of the invention, a system equipped with or embodying the present invention may calculate a score based on the review and one or more of the other reviews, and the user feedback may include the score. It may derive a score based on information available in the review entry and in one or more of the other review entries, includes assigning less or zero weight to scores in any of the other review entries not being associated with a proof record, or assigning more weight to scores in those being associated with a proof record.

In accordance with another aspect of the invention, a system equipped with or embodying the present invention may receive price information relative to the subject matter or engagement, and a code relative to the engagement, the code being unique to a seller for each instance of engagement with the seller. And the same code is available on the corresponding proof record for inspection. The method may further determine that the code associated with the seller does not exist, before associating in the database the proof record with the review entry.

In accordance with another aspect of the invention, a system equipped with or embodying the present invention may provide verification that a proof submission comprises information indicating engagement with the subject matter, the verification including, for example, checking via optical-character recognition or manual labor that the subject matter and engagement information (e.g., name of product, transaction time, seller information, payment amount) is present in the proof submission.

In accordance with another aspect of the invention, a system equipped with or embodying the present invention may receive specification or indications relative to a submission of a proof of engagement so that it may extract or obfuscate information available on the submission based on such specification or indications. The system may also receive a submission for a subject matter in relation to the review entry, so to create a new entry in the database for the subject matter, to or with which the review entry is applicable or may be associated.

Methods, processes, systems and products for dissemination or retrieval of digital resources or online information via context layer or context-level protocols and interfaces are also described. For instance, embodiments of the invention include a system for contextualizing digital resources in response to a request, the system comprising:

(a) a processing unit, wherein the processing unit includes a processor and an operating system;

(b) a storage device, wherein the storage device includes a database, file system or memory;

(c) a communication interface, wherein the communication interface includes a network interface; and a protocol server coupled to the communication interface and the storage; wherein the protocol server or the communication interface is related to a context, and the protocol server, when executed by the processing unit, receives via the communication interface a request for one or more digital resources, locates the one or more digital resources, and generates a response comprising a collection of the one or more digital resources or a collection of locations of the one or more digital resources, thereby contextualizing the collection in the response.

The protocol server in such a system may comprise a data transfer protocol server, the data transfer protocol server being coupled to the communication interface, and a context-level protocol server, the context-level protocol server being coupled to the storage. The one or more contexts may include one or more sub-contexts. The request may include one or more dialogue questions and a reference to the one or more digital resources, and the response may include one or more dialogue answers to the one or more dialogue questions, the dialogue answers and questions having queries and results relevant to the context. The data transfer protocol server may include a HTTP server while the context-level protocol server may include a GAP (Global Advertising Protocol) server. The one or more digital resources may include a digital resource from another data transfer protocol server. In addition, the context-level protocol server may provide peer communication in a context layer, the context layer providing services not available in any layer of the ARPANET (Advanced Research Projects Agency Network) TCP/IP Model or OSI (Open System Interconnection) 7-Layer Model. The one or more contexts may include Shopping, Advertising, and News contexts, wherein the one or more sub-contexts for the Shopping context may include Reviews and Offers, and the one or more sub-contexts for the News context may include Business, Finance, Entertainment, and Politics. Furthermore, the context layer may communicatively be coupled to the Application Layer of the ARPANET TCP/IP Model or the Application Layer of the OSI 7-Layer Model, and the context-level protocol server does not provide services to protocol servers belonging to any layer in the ARPANET TCP/IP Model or the OSI 7-Layer Model.

According to one embodiment, the present invention provides a protocol and interface for dissemination, exchange, and inquiry of online ads. It makes possible an advertising context for online ads made available by servers or information providers (e.g., ad exhibitors) to clients or information requesters interested in those ads. According to another embodiment, the present invention provides context-aware dialogue in form of questions and answers between a client and server. According to yet another embodiment, the present invention may also provide asynchronous retrieval or receipt of digital resources via context-level protocols and interfaces.

According to another embodiment, a server may associate an interface with a subject matter context. This interface may, for instance, comprise a port number. The server may then receive a request from a client via the interface. In response to receiving the request, the server may retrieve in a database a first digital resource, the first digital resource being associated with the request, and the subject matter context. For instance, where the server is a search engine, the digital resource may comprise a search result that identifies a web page on another server. The server may then generate a response based at least in part on the first digital resource. For instance, the response may comprise a web page that includes the search result. The server may then send the response to the client.

According to another embodiment, a server receives a message from a computer, the message including information that identifies a subject matter context. The message may comprise, for example, a Hyper-Text Transport Protocol (HTTP) request, where a field of the request is used to identify the subject matter context. The server may then determine that a resource identified by the message is associated with the subject matter context. This may, for instance, comprise determining the subject matter context and a query from the message and searching a database using these two pieces. The server may then retrieve the resource based at least in part on the message, such as by fetching the resource from the database.

According to another embodiment, a client sends a request to a server, the request relating or referring to a uniform resource locator and a port number, the port number being associated with a subject matter context. For instance, all user-level content received by a server on port 800, unless otherwise specified, may correspond to a Shopping subject matter context. In response, the server may send a copy of the resource to the client, and the client may receive a copy of a resource associated with the uniform resource locator. Then, the client may store the copy of the resource in a database in association with the subject matter context.

According to another embodiment, a system comprises means for storing an index, the index including information for resources made available on a first interface. For instance, this system may comprise a search engine computer that stores information about web pages made available by servers on a particular network port, which may or may not correspond to a subject matter context (e.g. Shopping). The computer may also comprise means for receiving a request, the request including a uniform resource locator indicating a second interface, the second interface associated with a subject matter context (e.g., Shopping on port 800). For instance, the computer may receive a request from a client on a TCP/UDP port associated with Shopping context. The computer may also comprise means for identifying in the index a resource, the resource correlated with the subject matter context. The computer may, for instance, store in the index information about the web pages made available by the servers. The computer may also comprise means for sending the resource to a client. This may comprise, for instance, a network interface of the computer configured to communicate with the client across a communications network.

According to another embodiment, a client sends a request to a server, the request including a uniform resource identifier (URI), the URI indicating a subject matter context. For instance, within the text of the URI may be a character string that identifies the subject matter context. Or the request includes a uniform resource locator (URL), the URL implicating or indicating an interface (e.g., a network port) associated with the subject matter context. The client may then receive from the server a resource associated with the subject matter context. For instance, where the client's request comprises a request for a web page, the resource may be this requested web page having contents associated with the subject matter context.

Other aspects and features of the present invention will become apparent to those ordinarily skilled in the art upon review of the following description of specific embodiments of the invention in conjunction with the accompanying figures.

OBJECTS AND ADVANTAGES

Embodiments of the present invention provide methods, systems, processes and products that would greatly reduce problems of irrelevant content retrieval or search results that have been plaguing the Web or other information systems. For instance, a consumer who may be looking for scholastic and research literature on some health issues would often receive for his queries to a search engine a listing of webpages containing mostly advertising that are of no relevance to his intent or interest. Alternatively, he may be looking for advertising of products, services, or offers but instead receiving among the results many personal blogs that happen to include his query text. Yet, in embodiments of the invention, an online content system (e.g., the Web) would enable a digital resource or information provider to furnish or otherwise declare its resources or content in a context-aware manner. For instance, online consumers would be able to ascertain with ease and confidence that a given digital resource is of advertising nature, as determined or otherwise indicated by a contextualizing interface or protocol via which the digital resource may be obtained or otherwise presented. Existing web-based tools and technologies could readily be re-used to create greater value for both web advertisers and consumers. For example, a context-ignorant but otherwise unbiased search engine may be instructed to look for the query or search words or phrases only in web pages of advertising nature as determined or otherwise indicated by a contextually advertising protocol or interface. Such a search engine could easily outperform a very sophisticated search engine in ridding search results of contextually irrelevant webpages. An ad sponsor would be able to make available context-aware online advertisement to their most valued target audience (i.e., online shoppers who are attracted to unbiased search results and maximum content coverage and accuracy). Embodiments of the invention comprising a system, method or process would provide effective contextualization of digital resources (e.g., advertising webpages) without undue effort imposed on content production (e.g., ad production).

According to one embodiment, the present invention provides flexible and progressive interpretation of context-level inquiries and responses, comprising dialogue questions and answers respectively. It may lower the barrier to and enable incremental approach for providing effective dissemination of digital resources or online information. For instance, an ad content provider could simply type up an ad that is free of any special syntax needed for declaring and denoting the written content as advertisement, and the ad in its entirety may then be published online and made accessible via an advertising-context protocol or interface. An online ad with an unambiguous advertising context may therefore be established. The ad content provider may also choose to provide answers to a context-level protocol's set of dialogue questions relevant to the product or service his ad represents. These answers augment the online ad and may be regarded as either its data or metadata. They become readily available when the protocol is looking for answers from the ad in response to some dialogue questions. As preciseness of a dialogue response becomes more and more important for a successful advertising campaign, and therefore justifying its cost and effort, more tools and support may in turn become available to ad content providers and ad exhibitors. Subsequently, the cost to providing preciseness of dialogue responses, and of specification of product and service offers in general, would then become more affordable and usable to advertisers, large and small. Yet all this potential development may co-exist with yet the simplest form of ads (e.g., in unstructured pure-text format), affording the same unambiguous advertising context to ads of such simplicity.

According to another embodiment, the present invention makes possible a globally distributed open system for advertising, where ads may be placed online with a proper context. Given its simplicity, efficiency and transparency, this system could become the de facto advertising platform of choice for making offers of goods and services known locally and beyond, as Internet access, devices and applications become more and more ubiquitous and user friendly. This may also help discipline the Web at large to rid itself of a systematic exuberant advertising frenzy that is degenerative to the content integrity of its resources. Such advertising frenzy in large part results from the lack of better alternatives to the current status quo, online advertising on a context-free Web that offers the potential of global reach with seemingly low cost of entry.

Among other benefits and advantages, embodiments of the present invention makes possible useful features and functionality through its ability to establish subject matter-specific and actionable information dissemination and transfer, and a reliable and recognizable context without undue effort from content providers and consumers (e.g., a scholastic and academic context for researchers or an advertising context for advertisers and consumers). Further objects and advantages of embodiments of the present invention will become apparent from consideration of the other parts of the specification herein.

BRIEF DESCRIPTION OF THE DRAWINGS

FIGS. 29A, 29B, 29C, and 29D show a number of context-level interactions between an information requester and provider in accordance with an embodiment.

DETAILED DESCRIPTION OF ILLUSTRATIVE EMBODIMENTS

Certain embodiments of the present invention provide a method and system for annotating digital information and sharing the annotated digital information among multiple users. In the present application, the information to be annotated is referred to as "digital information." Digital information may be any information that is available in a digital format. For example, digital information may include textual information, audio information, video information, or graphical information. Further, a single unit of digital information may include multiple units. For example, a common unit of digital information available on the Web is a website or a webpage, and a website may include multiple webpages. A unit or page of the digital information may be represented by a unique recall handle that provides a reference or link to that unit or page of the digital information—for example, a URI of a webpage or a file pathname for a video clip. In addition, a single unit or page of digital information may include one or more subunits or sub-pages, each subunit or sub-page having its own unique recall handle. A network may be an intranet, Internet or any other network that includes one or more devices that are communicating over the network. Furthermore, the network may include any type of wired or wireless medium.

Figure 1:
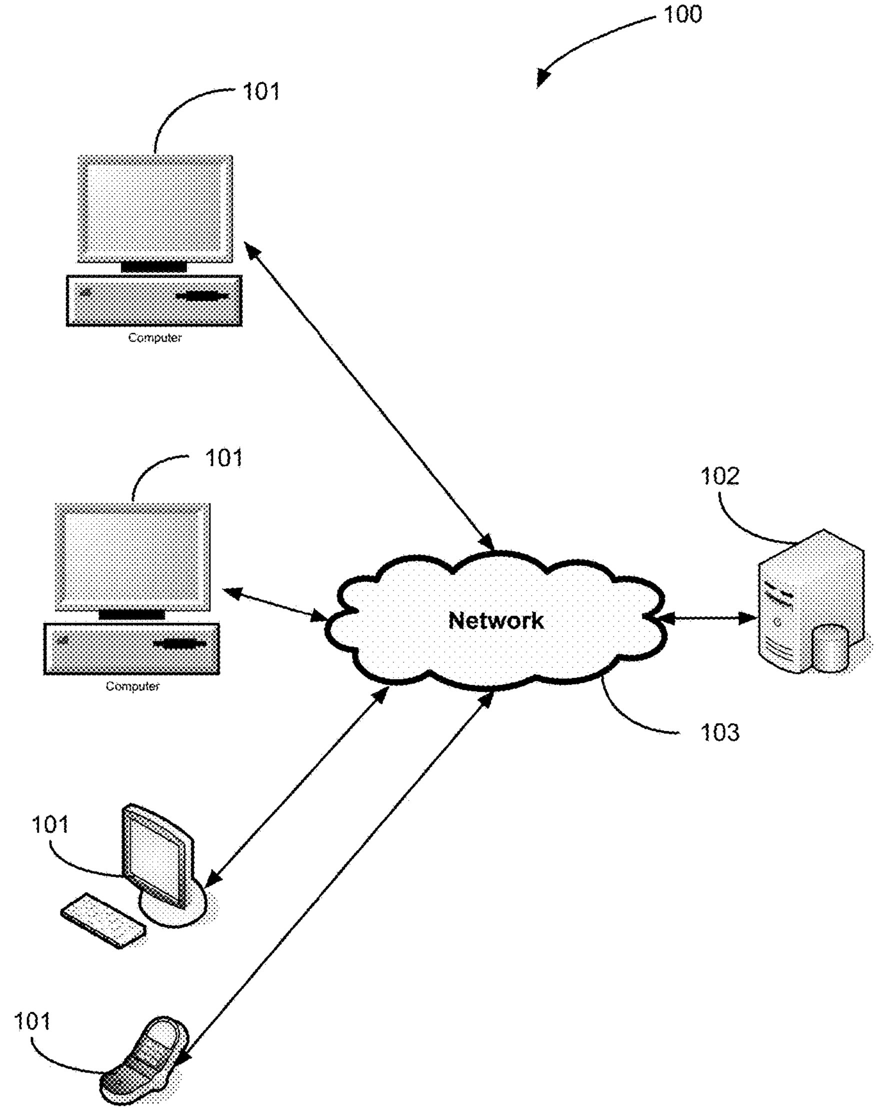
FIG. 1 illustrates a system for performing annotations according to an embodiment of the present invention.

FIG. 1 is a simplified schematic of a system 100 for performing and sharing annotations according to an embodiment of the present invention. System 100 may include one or more client computers 101. Client computer 101 is any general-purpose computer that may communicate with other computers over a network and has the capability of connecting to the Internet. In one embodiment, client computer 101 may be a portable or mobile communications device having the requisite functionality, e.g., cellular phone or a personal digital assistant (PDA). System 100 may also include a database server 102. Database server 102 may be any general-purpose computer capable of hosting a database and communicating with multiple client computers over network 103. Network 103 may be an Intranet, Internet, or any other network, either closed or open. Client computer 101 and database server 102 may communicate using a wired or wireless medium. Each client computer 101 may include a web browser for accessing and browsing the Internet. In addition, client computer 101 may also include an application resident in its memory (not shown) that may provide a user interface through which a user may perform annotations. In some embodiments, the user interface may reside as a toolbar and may be integrated into a web browser resident of client computer 101.

In some embodiments, annotation includes creating an annotation entity by associating data or metadata to a particular anchor information. This anchor information may be the uniform resource identifier (URI) or the recall handle that identifies the digital information. An annotating entry or annotation entity may comprise one or more attributes. An annotation entity may also include a description or specification of an object or item to which the attributes are associated. An attribute may include a name, a value, and a measurement unit for the value. The value of an attribute may be scalar or vector. For comparing attributes, they must be compatible with each other. For example, an attribute is compatible with another attribute if the values of the attributes may be compared in an analysis, whether numerical, contextual, or otherwise. Attributes having the same or equivalent names or meanings (e.g., language, synonym, abbreviation, matching code) are compatible with one another by declaration. The determination of compatibility between two attributes includes but is not limited to orthographical, semantic, and manually assigned equivalence between attribute names. In some embodiments, an attribute may be customized, e.g., its meaning, valid value ranges and possible measurement units may be determined and given a name or code for reference.

An attribute is a characteristic trait or property that serves to define or describe an object of interest and is free of ambiguity or subjective interpretation. An object of interest may be a thing, an idea, a product, an offer, an activity, a purpose, a context, etc. For example, the price included in an offer to sell a book is an attribute of the offer. A user provided rating of the book on a website is not an attribute of the book per se, because the same book may have an entirely different rating on another website since rating is a subjective assessment of a book and may vary enormously between different users. In the other words, an attribute of rating without further qualification is ambiguous and may not be used for meaningful comparison with another attribute that may also offer rating information. Hence, such a rating alone is not an attribute of the book. In contrast, a rating qualified by its source, e.g., the name of the website where the rating is obtained and the "as of" date, may be regarded as an attribute of the book. For example, the rating of a particular program or episode on television when it was first aired is an attribute for the particular program or episode.

Comparative analysis such as relational comparison may be performed on compatible attributes. The results obtained from the analysis may be sorted, filtered, and searched. In some embodiments, numerical weights and score generating formulas may also be associated with the individual attributes during a comparative analysis to determine the desirability of one resource over another resource among resources having one or more compatible attributes in common.

In some embodiments, the anchor information that is used for the annotation is the recall handle of the digital information. All the annotations are associated with this unique recall handle regardless of the location of the data being used for annotation.

Figure 2:
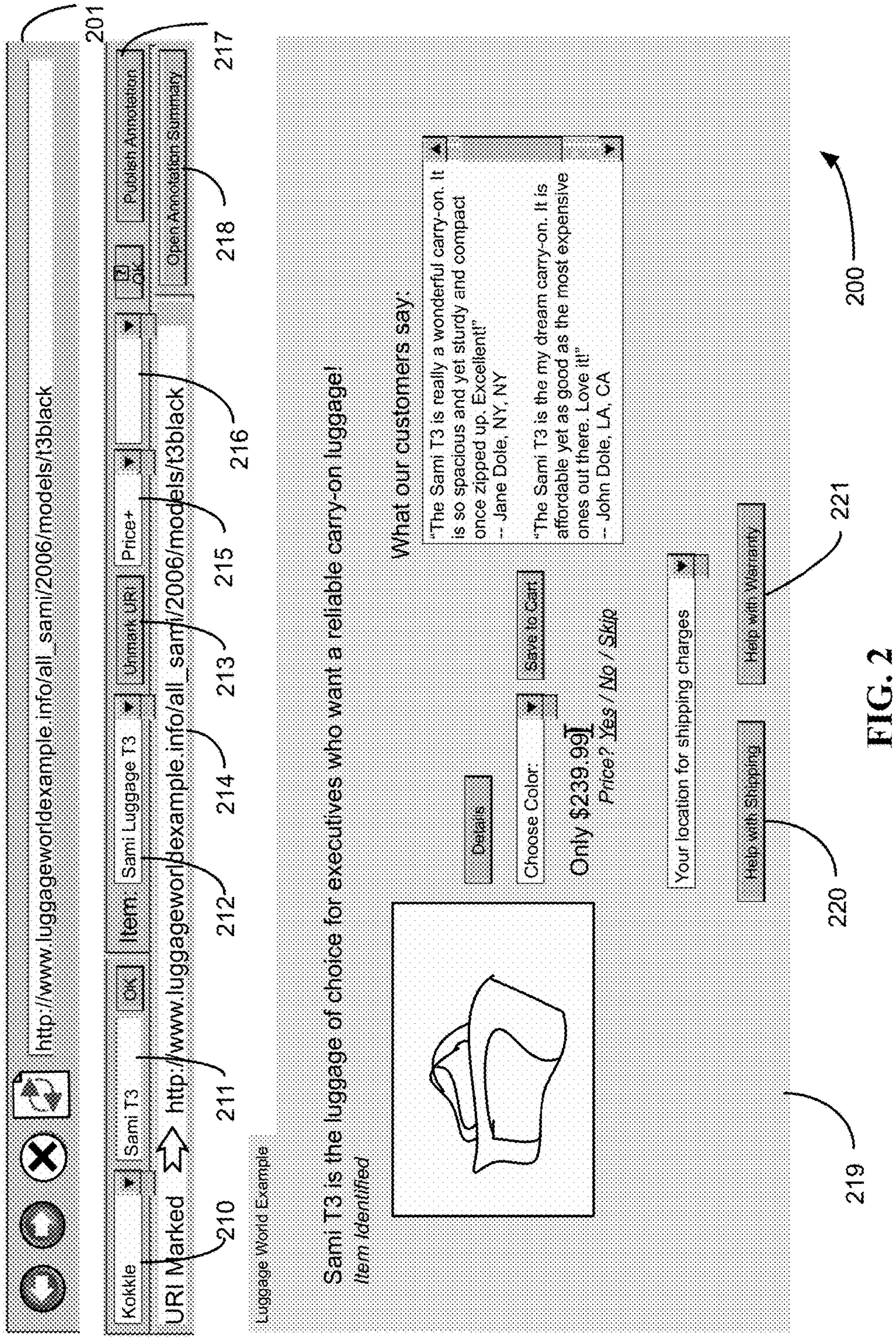
FIG. 2 is a sample user interface that may be used to perform annotations according to an embodiment of the present invention.

FIG. 2 is a simplified illustration of an user interface (UI) 200 that may be used by the computer system to perform annotation, add metadata or summarize data according to an embodiment of the present invention. UI 200 may be presented on a computer monitor in the form of a toolbar, which is embedded in a web browser resident on client computer 101 or may be a stand alone application that is resident on client computer 101 described above. UI 200 may be activated by clicking a designated button on the browser or by selecting the UI application from the memory of the client computer. UI 200 includes a display screen 201. Display screen 201 includes section 210 for selecting a search engine. The search engine may be employed to perform an initial search for locating the item of interest. Section 211 provides a location for the user to enter a search term for the subject matter of interest. A search term may include one or more words or phrases, graphics, audio, or video. Section 212 is a pull down menu that provides descriptions or specifications about items of interest that the user has previously created. For example, a user may be interested in buying a piece of luggage belonging to a specific brand, book a flight to New York City, and buy travel insurance. The user may proceed to provide input to the computer system to create three items: "Sami Luggage T3", "Flight to New York", and "Travel Insurance". These created items may appear in section 212. An item may also include additional information or data to further qualify the item, e.g., the minimum and maximum dimensions and weights of the luggage, the origin of the flight to New York, the duration of travel insurance, etc. The item information may also provide or otherwise serve as an initial search term for entry into section 211.

Figure 10:
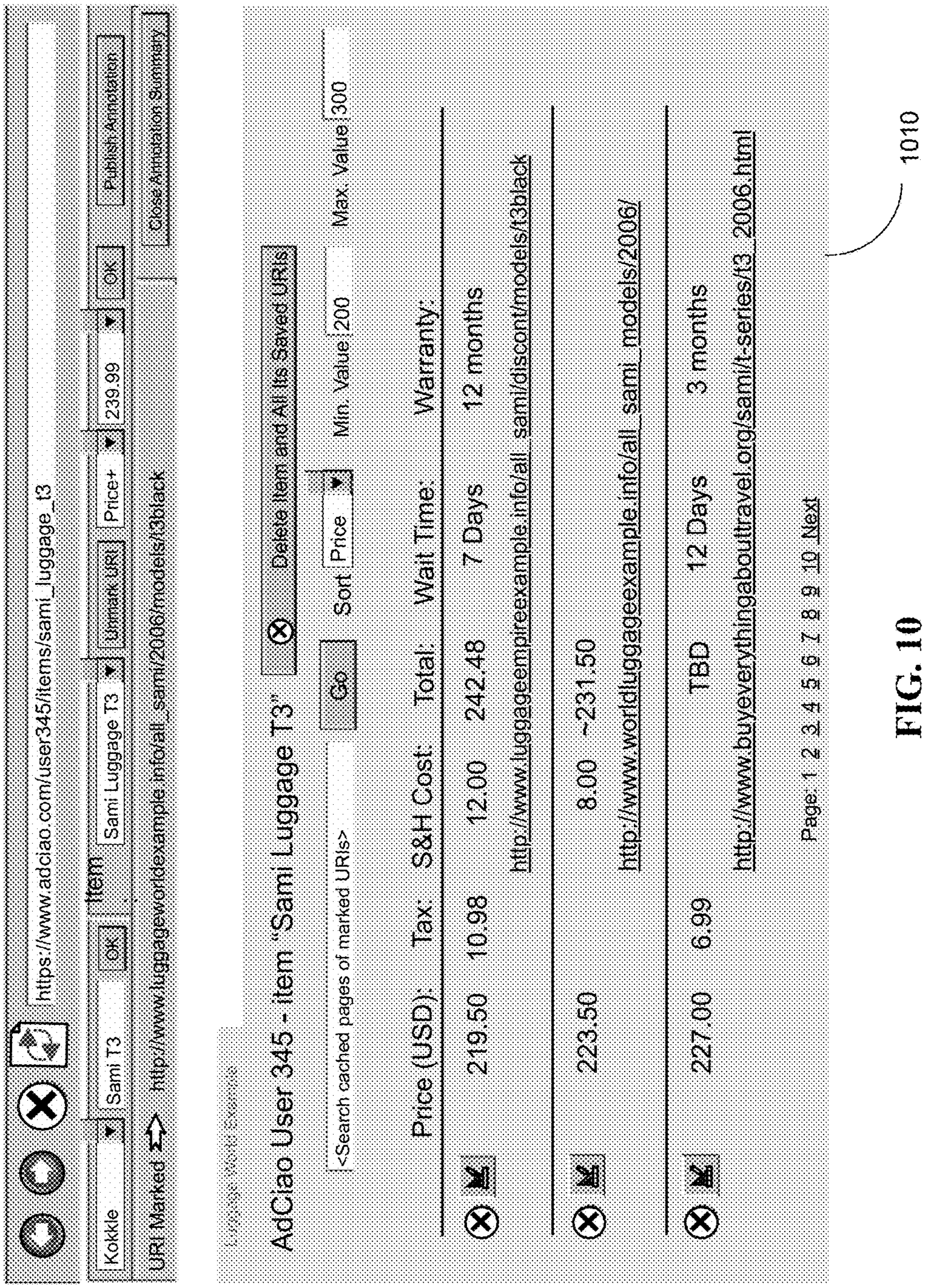
FIG. 10 illustrates a sample annotation summary user interface screen according to an embodiment of the present invention.

Screen button 213 allows a user to mark (or unmark) a particular recall handle for annotation. The recall handle may be the URI associated with one of the search results delivered when the user executes a search query based on a search term. In one embodiment, the 'marked' recall handle is the recall handle whose webpage is currently on display in section 219. Once a recall handle is marked using screen button 213, the recall handle appears in section 214. In section 215, the user may select from among a plurality of attributes to be associated with the marked recall handle. Alternatively, the user may define his own attributes by entering them in the client computer. In section 216, the user may enter a value to be associated with the selected attribute. In an embodiment, this section may be automatically populated by the client computer based on the information displayed in section 219. Section 219 displays contents of the websites that the user may visit using UI 200. In yet another embodiment, the application may scan the contents displayed in section 219 and suggest values to be populated in section 216. Screen button 217 allows the user to communicate his annotation to an external system or designate the annotated information for sharing with other users on a network. Screen button 218 may allow the user to display a listing of previously annotated recall handles. The listing may be displayed on a separate page and may additionally provide query, filtering, sorting, editing, and navigation facilities for operating and manipulating these recall handles and their annotation data. FIG. 10 shows a sample listing of previously annotated recall handles that may be displayed upon selection of screen button 218.

Figure 3:
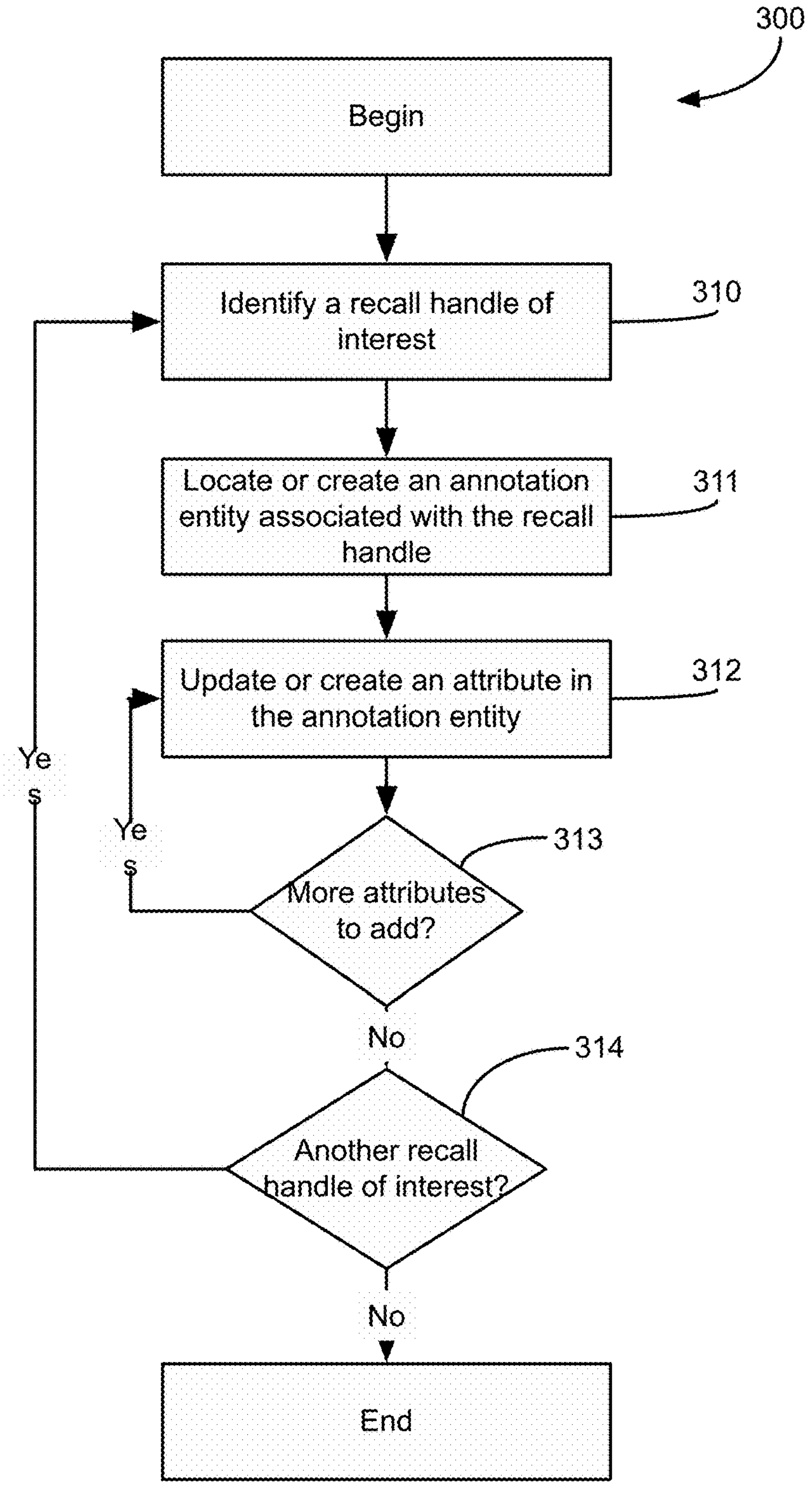
FIG. 3 is a flow diagram of a process for assigning attributes to a URI according to an embodiment of the present invention.

FIG. 3 is a high level flow diagram of a process 300 for assigning attributes to a URI or recall handle associated with digital information according to an embodiment of the present invention. At step 310, the URI associated with particular digital information (or some online resource such as those available on the Web) is identified. For example, the URI identified may be the one provided by the search engine based on a search term. In some embodiments, the user may enter a URI manually e.g., file path information of the location of a video clip on the user's computer. At step 311, an annotation entry is created for that URI, e.g., by using UI application 200. In an embodiment, prior to creating an annotation entry, the system may search for any existing annotations for that URI. At step 312, the user adds data to the selected attribute, e.g., the user may add a purchase price in dollars for an attribute "price" associated with the item of interest. In an embodiment, if there is already an existing attribute with data associated with it, the user may be given an option to update the attribute with the new data. At step 313, it is determined whether additional attributes for the selected item of interest are to be added. If there are more attributes to be added, the process returns to step 312 to allow user to enter additional attributes. If at step 313 it is determined that, no additional attributes are to be added, the system may check for a new URI to be annotated at step 314. If there is no new URI to be annotated, the process ends. If there is a new URI to be annotated, the process returns to step 310.

It will be appreciated that process 300 described herein is illustrative and that variations and modifications are possible. Acts described as sequential may be executed in parallel, order of acts may be varied, and acts may be modified or combined.

Figure 4:
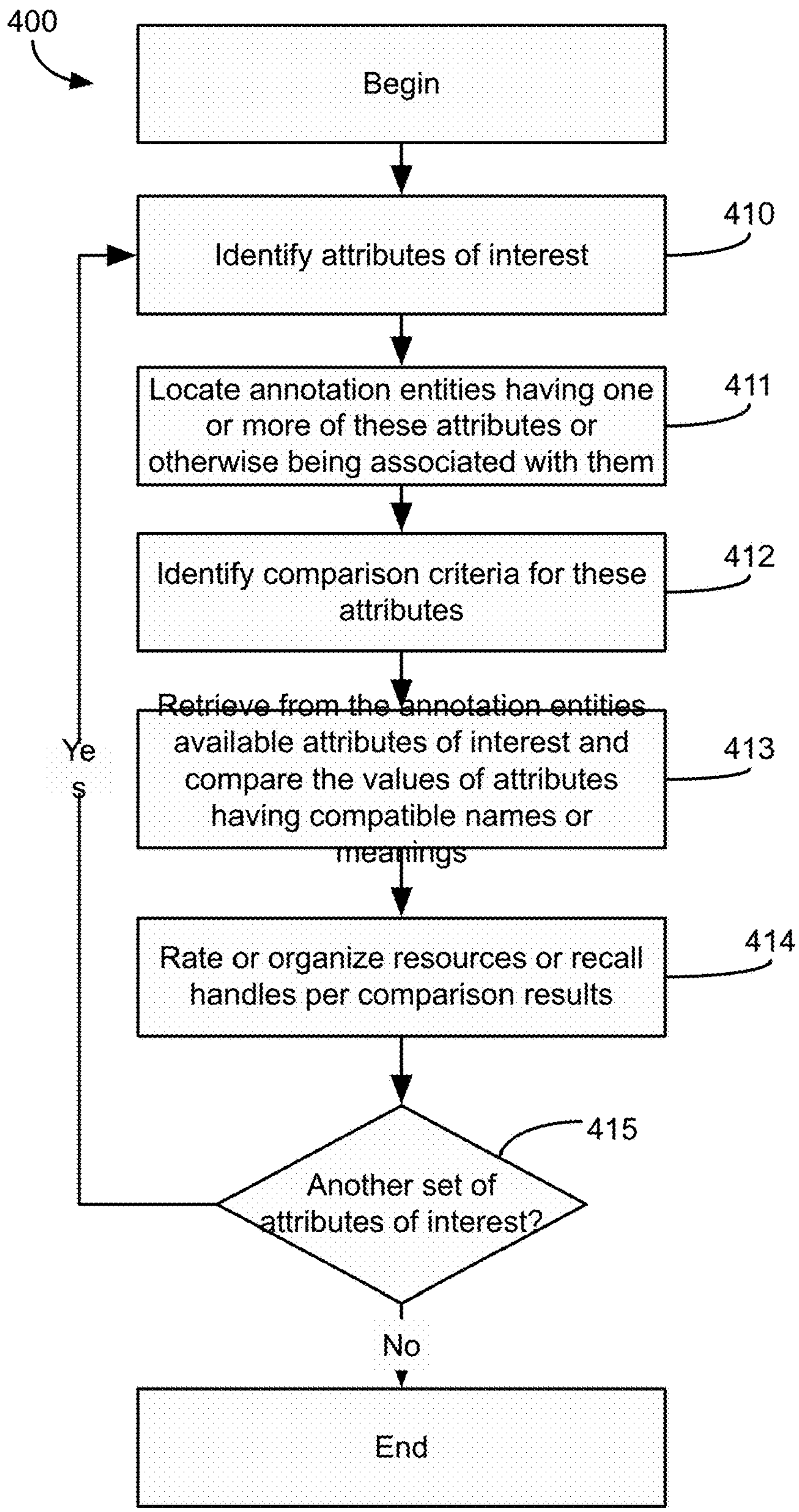
FIG. 4 is a flow diagram of a process for comparing attributes of various annotated URIs according to an embodiment of the present invention.

FIG. 4 is a high-level flow diagram of a process 400 for comparing attributes of various annotated URIs or recall handles according to an embodiment of the present invention. At step 410, the attributes to be compared are identified, e.g., price and warranty period. Next, at step 411, the annotated URIs or recall handles that include the identified attributes are located. As described previously, the annotated URIs/recall handles may be stored on an internal storage medium of client computer 101 or on the remote database server 102. Once the annotation entries that are associated with the URIs of interest are identified, comparison criteria for the attributes are determined at step 412. The comparison criteria may specify a priority of one attribute over another to be considered during comparison and subsequent presentation of the comparison results. For example, the attribute 'warranty period' may be more important than the attribute 'price'. In addition, the comparison criteria may also specify desirability of relation order for each attribute. For example, for 'price', a lower number is more desirable whereas for 'warranty period' a higher number is more desirable. At step 413, the data associated with the identified attributes for all the selected URIs is retrieved and compared. At step 414, results of the comparison are presented to the user. The results may be presented in the form of a rating or a score with the respective URIs listed per the comparison criteria. For instance, a request to locate the cheapest price for an item would result in a list of URIs/recall handles whose "price" attribute has one of the lowest values. In some embodiments, if the price is provided in different currencies, the differences in the currency exchange rates may be reconciled automatically and results provided in the currency of user's choice. At step 415, the system may check to see if another set of attributes is to be compared. If at step 415, it is determined that no other attribute is to be compared, the process ends. On the other hand, if there are more attributes to be compared, the process returns to step 410.

It will be appreciated that process 400 described herein is illustrative and that variations and modifications are possible. Acts described as sequential may be executed in parallel, order of acts may be varied, and acts may be modified or combined.

Figure 5:
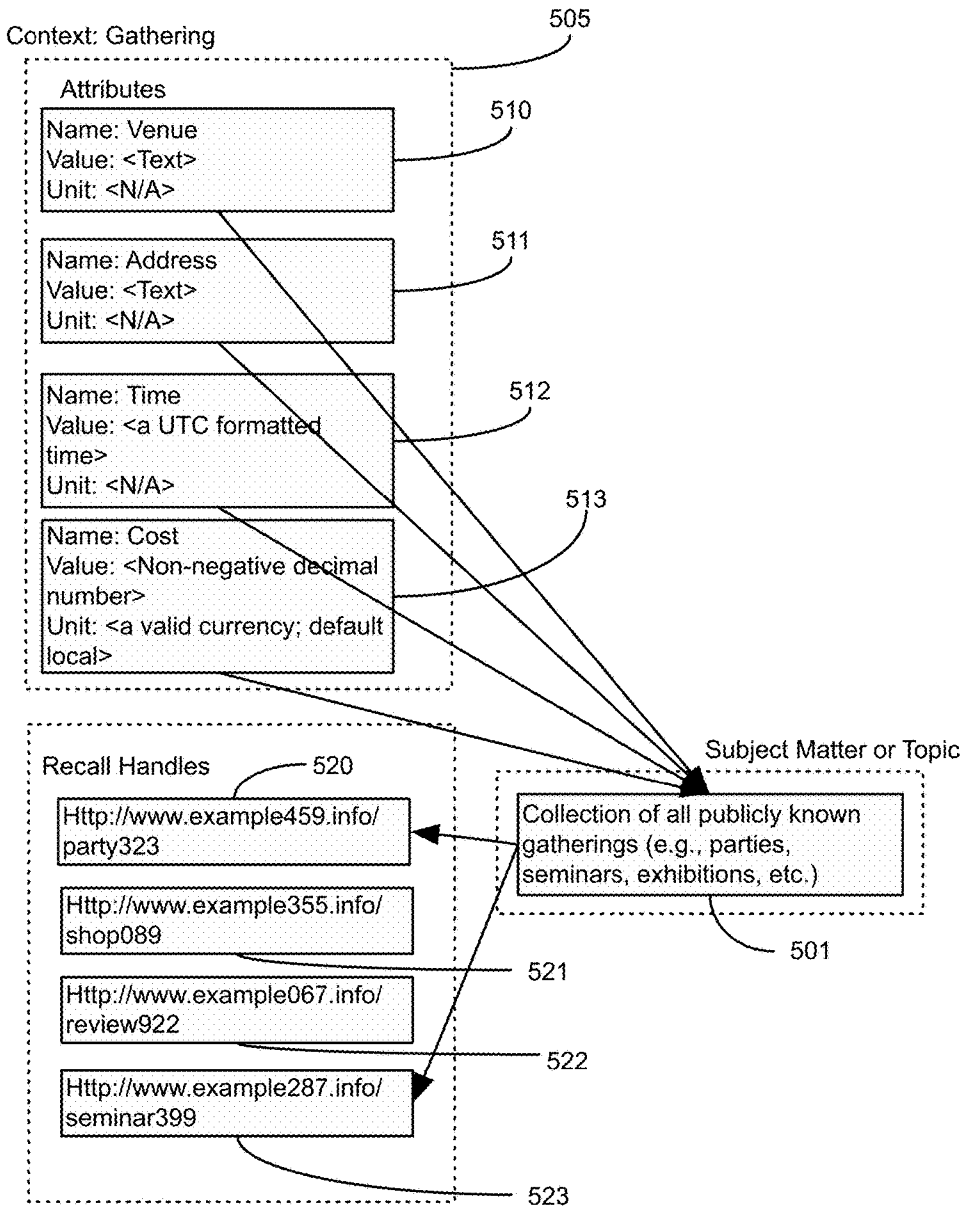
FIG. 5 is a block diagram illustrating subject matter annotation according to an embodiment of the present invention.

Another embodiment of the present invention allows a user to perform subject matter specific annotations. FIG. 5 illustrates subject matter specific annotation according to an embodiment of the present invention. In this illustration, subject matter 501 of interest is 'collection of all publicly known gatherings', e.g., seminar, exhibition, party, etc. Subject matter 501 is related to an overall context of gathering 505. Another subject matter of interest in the gathering context may be 'collection of all scheduled sports events'. The context of scheduled sports events may be a sub-set or sub-context of context 505. Attributes 510 513 are defined for context 505. For example, for a gathering, several attributes such as venue 510, address 511, time 512, and cost to attend 513 may be defined. It is to be noted that the attributes mentioned above are for illustrative purposes only and one skilled in the art will realize that any number of attributes may be defined for a particular context or subject matter. In addition, for subject matter 501, there may be multiple URIs/recall handles 520 523 available for annotation. The user may use the client computer to annotate any number of the available URIs with one or more of the attributes. For example, recall handles 520 and 523 may be annotated with attributes 510-513. One skilled in the art will recognize that a number of permutations and combination may be achieved between the attributes and the recall handles.

Figure 6:
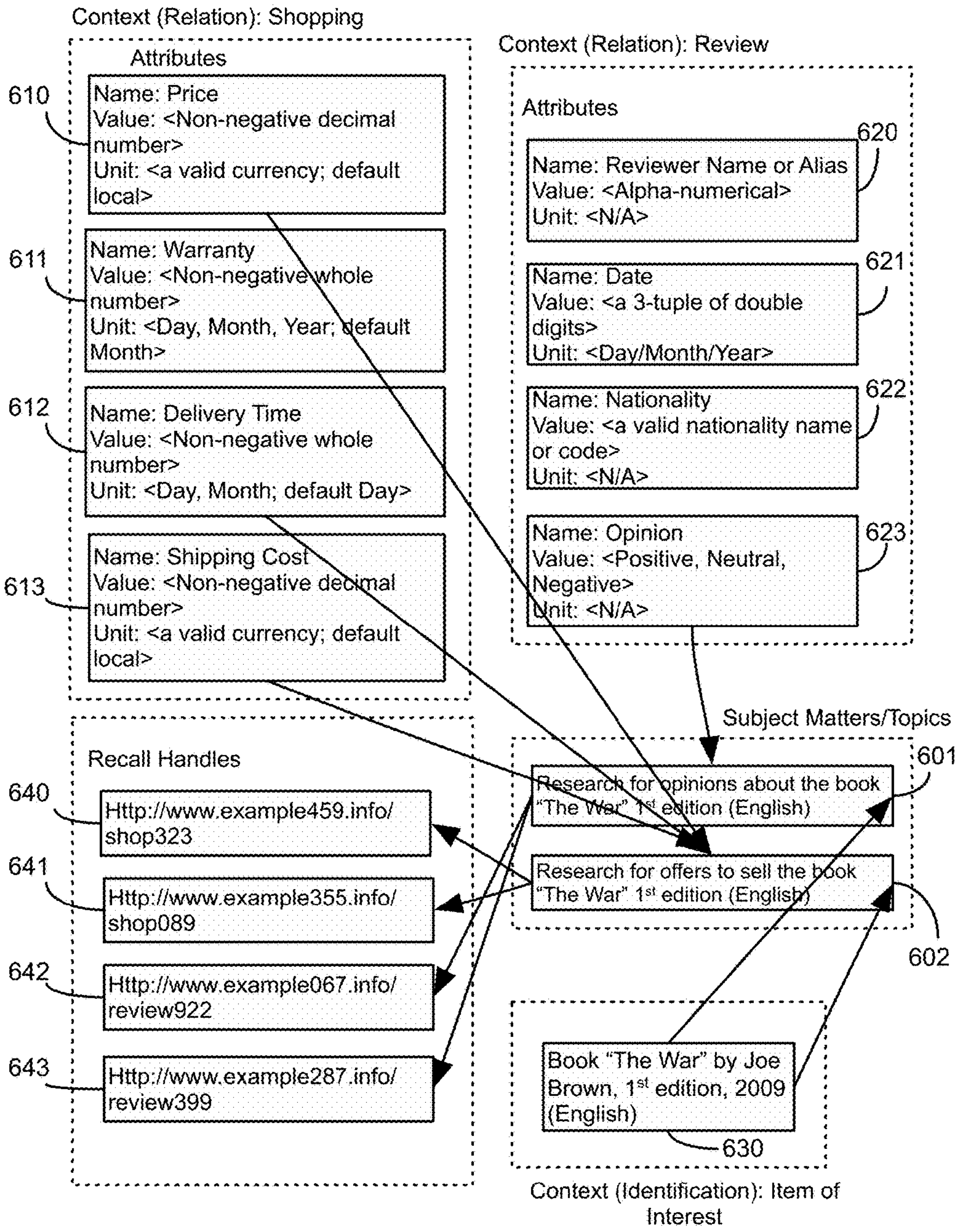
FIG. 6 is a block diagram illustrating subject matter annotation according to another embodiment of the present invention.

FIG. 6 illustrates an example of performing annotations where a subject matter, activity, or topic of interest may have more than one context associated with it according to an embodiment of the present invention. In this embodiment, an item of interest is a book titled "The War." There may be several subject matter/activities/topics associated with this item of interest, e.g., purchasing the book (601) and finding out reviews (602) of the book. It is possible that relevant information for annotation is available at the same URI or at different URIs. Attributes such as price (610), warranty (611), delivery time (612), and shipping cost (613) are defined for the 'shopping' context with which subject matter 602 is associated. Attributes such as name of the reviewer (620), date (621), nationality of the reviewer (622), and the actual opinion (623) are assigned to subject matter 601 under the 'review' context. In addition to the aforementioned attributes, additional attributes such as title, author, language, and edition may be assigned to subject matters 601 and 602 under 'Book' context 630 and are used to describe the item of interest, i.e. the book "The War." The information about the book, whether in textual, image or audio form, may be used as query to search for online information of or about the book. One main difference between the shopping (or review) context and the book context is that the former provides attributes for relational comparison while the latter provided attributes for identification comparison. While the use of attributes may improve the accuracy of both types of comparisons, its absence would typically have a more adverse effect on relational than identification comparison. For instance, to find luggage of meeting certain criteria of dimensions, attributes provide a better specification than just a textual description in freeform. While these attributes may be regarded semantically as identification data for identifying relevant luggage, the attributes are actually used for relation comparison in such identification.

Similar to FIG. 5, one or more recall handles 640-643 may be available for annotation with respect to subject matters 601 and 602. For example, as illustrated in FIG. 6, recall handles 642 and 643 may include information relevant for subject matter 601 while recall handles 640 and 641 may include information relevant for subject matter 602.

Recall handles whose annotations comprise both identification data and attributes for relational comparison provide a better, automated decision making support than those whose user annotations comprise only data of a homogeneous but otherwise undistinguished context. For instance, a user may use the UI described above to search for a book using some identification data for the book (e.g., "Book The War Joe Brown"). The user may then visit the web pages identified by their respective URIs listed by the search engine and through the UI specify attributes (e.g., price, delivery time, shipping cost) against the URIs of those web pages that offer to sell the book. The resulting annotations may comprise identification data for the book and attributes for relation comparison. These annotations may be used for automatic comparison and processing (such as sorting and filtering) with other annotations having compatible attributes as well as the same or equivalent identification data. It is to be noted that identification data need not be the same or equivalent if a user wants to compare, for example, two different but competing products having non matching identification data. Such comparison and processing is able to discern data for identification from those for relational comparison.

Figure 7:
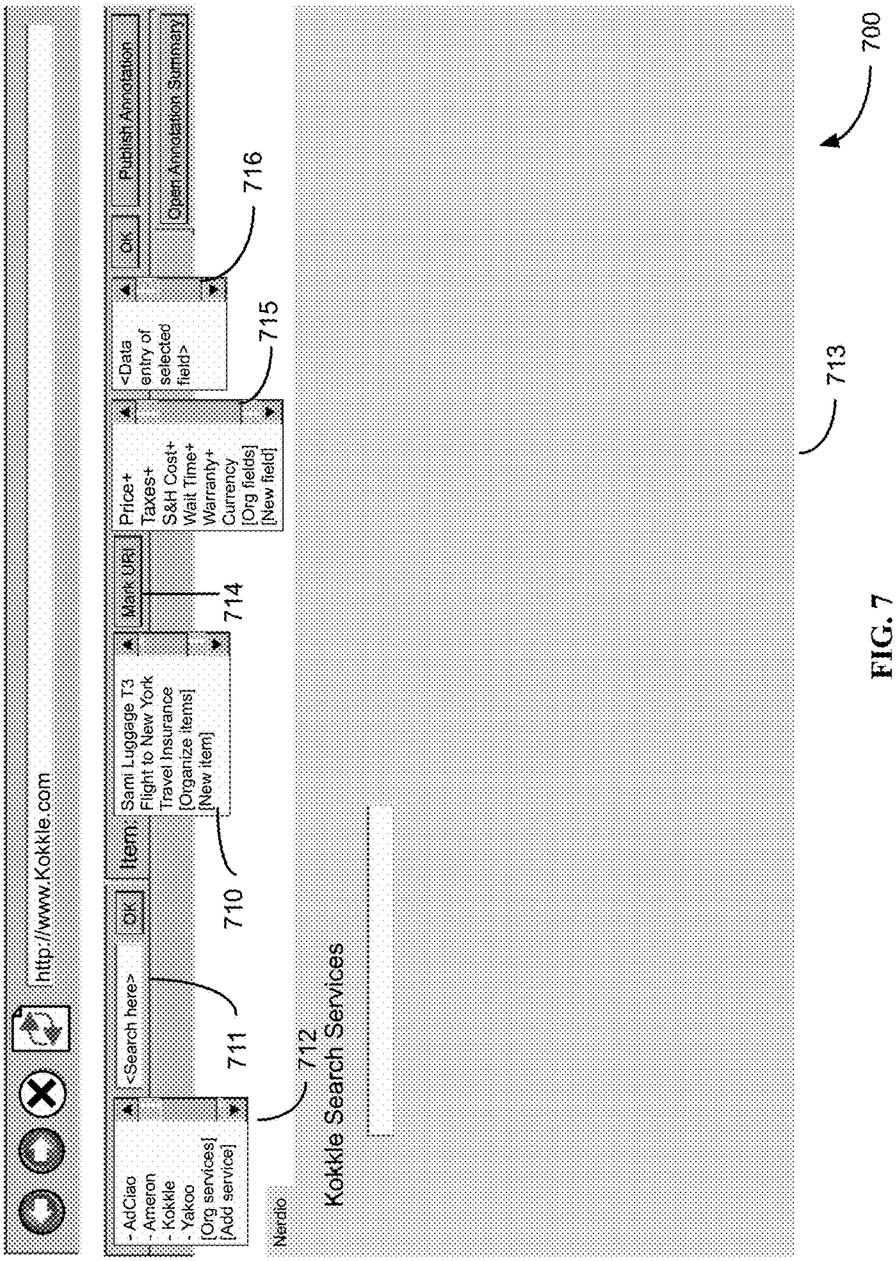
FIG. 7 illustrates a sample display screen of a user interface according to an embodiment of the present invention.

FIG. 7 illustrates UI 700 with expanded drop down boxes showing the various options for annotating a URI/recall handle identifying digital information. According to an embodiment of the present invention, a process for creating an annotation using UI 700 will now be described. A user may select an existing item or enter information into a client computer to enable the client computer to create a new item of interest using drop down menu 710. For enabling the client computer to create a new item, the user may select '[New Item]' option in drop down menu 710. For instance, a user may be planning for a trip. He may want to buy luggage of a specific brand, book a flight to New York City, and buy travel insurance. The user may instruct the client computer to create three items: "Sami Luggage T3", "Flight to New York", and "Travel Insurance." An item may also include additional information or data to further qualify the item, such as the minimum and maximum dimensions and weights of the luggage, the origin of the flight to New York, the duration of travel insurance, and so on. Such additional data would help refine the item of interest to become more specific in comparing and matching web pages that provide the item of interest. If the item entry is a newly created entry, the user may submit a search term in section 711 and select a search engine in section 712. The item information corresponding to the item selected in section 710 may be used as an initial search term in section 711. Once the search query is executed by the search engine, a list of web pages offering the item of interest may be displayed in section 713. The user may select 'mark URI' button 714 and the client computer can make the URI whose webpage is being currently displayed in section 713 to become the currently marked URI. In some embodiments, selection of the 'mark URI' button may also trigger other operations like retrieving existing attributes and data for those attributes for that URI and making the retrieved attributes and data available to the user. The user may instruct the client computer to make changes to one or more attributes by selecting the desired attribute in section 715 and specifying new data (value) for the attribute in section 716. Some attributes may include optional measurement units to qualify their data values. These optional units may be implicit, e.g., some unspecified currency of interest for price and shipping data fields, default, e.g. the current date for a time data field, or explicitly chosen, e.g., day, month or year for warranty period. The suffix '+' displayed alongside certain attributes in section 715 indicates that each of these attributes would be used by an auto prompt feature, described later, whereby a user would be prompted for data entry for each such attribute in a successive manner. It is to be noted that any other means to indicate that a particular attribute provides an auto-prompt feature may be used in place of the '+' symbol but is not required by the present invention. Each attribute may provide further functionality in addition to providing a named piece of data with an optional measurement unit. The currency attribute, for example, would enable the price, taxes, and shipping attributes to be compared consistently with other price, taxes, and shipping data fields if the latter are specified in different currencies.

Changes made to the attributes are automatically updated. If there is an existing annotation entity associated with the marked URI, any new item description specified in section 710 may be merged with the identification data of the existing annotation entity, because such an existing annotation entity could contain identification data that may be different from the current item description (e.g., "Sami bag T3" instead of "Sami Luggage T3"). Reconciliation of identification information may take several forms. For example, the two descriptions may be merged with each other with user confirmation, the old description may be replaced by the new description, or the user may be asked to select one of descriptions.

Selecting the "[New field]" or "[Org fields]" selections on the pull down menu 715 presents a page where the user may be given a plurality of attributes to choose from. These attributes may be organized by categories, e.g., context and subject matter, and may be searchable, for inclusion in the menu. Each attribute may further be given its meaning, acceptable values, and possible measurement units. Relationship with and dependency on other attributes, if any, would be specified. For example, sum of the Price, Taxes, and Shipping & Handling (S&H) Cost data fields may be designated as a field called "Total Cost", and that their comparative values depending on the Currency field. A user may instruct the client computer to modify the relationships and dependencies of these system defined or user submitted attributes and their respective data fields. The user may also define custom relationships and dependencies complete with rules on interpreting and operating the attributes within the client computer. In addition, the user may further instruct the client computer to share these definitions with other users. A user may also instruct the client computer to create an attribute having a textual name and configure data field take on any value without any measurement unit.

In some instances, digital resources may have information spread over several locations. For example, a website offering a product for sale may have the shipping charges for the product listed on a different webpage than the webpage where price information for the product is provided. In one embodiment, the user may visit other locations, for the same digital resource, to select, identify, or enter data for different attributes without losing the already marked recall handle. For example, for a website, a user may use the "mark URI" button and instruct the client computer to designate the URI of a certain page of the website as the marked URI, while visiting other related pages of the website for identifying data to be used for annotation. The data gathered from the different web pages of the website may then be linked or otherwise related to the marked URI via an annotation entry.

As described earlier, the item information and attributes as provided by a user, along with other information (e.g., the timestamp of the latest attribute update), make up an annotation entity or entry for every marked URI. The corresponding URI may be part of the annotation entity or otherwise be associated with it. Such annotation data may undergo transformation or adaptation for the purpose of transmission, storage, indexing or retrieval. Additional data such as a copy of the webpage of the marked URI may also be kept. In some embodiments, a local repository (e.g., storage medium of client computer 101) or a remote repository (e.g., database server 102) may store and maintain the annotation entities for several URIs in a persistent manner. These repositories may provide the operational means or facilities to manage these persistent entities or entries (e.g., to delete, modify, update, and retrieve) and to query against them, e.g., to retrieve entries by filtering and matching criteria, orthographical, semantic, or otherwise, against their URIs, identification data, attribute names, attribute values and other annotation data, and to perform algorithmic, algebraic, relational and presentational manipulation involving these URIs and their annotation data.

Referring back to FIG. 2, an automated method for annotation according to an embodiment of the present invention is described below. As described above, consider that a user wishes to purchase a piece of luggage, e.g., a Sami T3 handbag as shown in FIG. 2. The user may select the item of interest in section 212 and execute a search query through a search engine from section 210 using information in section 212 as search term. Alternatively, a user may manually enter a search term. The search engine presents a plurality of hyperlinked recall handles (e.g., URIs) along with some other information, such as an excerpt of a webpage associated with its recall handle, presented in section 219. The user engages on-screen button 213 to mark the URI if he perceives a URI to be of interest. Selecting button 213 results in the button toggling to display "unmark URI" and now functions as means to unmark a currently marked URI. Section 214 similarly toggles to indicate either a marked URI or no URI. The system may then attempt to locate and then highlight, emphasize, or otherwise identify the text on the webpage that matches the name of the item or one of its aliases. An alias may be the search term used to search for the item or any other derived name that is closely related to the item. For example, as shown in FIG. 3, "Sami T3" displayed in section 219 is underlined since it is considered an alias or equivalent to the item "Sami Luggage T3" in section 212.

Once the user marks the displayed URI, it becomes the anchor URI to which all the annotations are linked. For example, the marked URI appears in section 214. The system may then prompt and assist the user to supply data for a plurality of attributes in section 215. In one embodiment, the system may auto-select the Price+ attribute and highlight the text, in section 219, that it believes provides the data for the selected attribute. The highlighting could be in form of visual cues such as underlining, textual annotation, color-coded background/foreground inversion of the selected text, or other forms such as audio readout. The highlighted and selected text may be captured as data in the data entry area 216 on the UI for the respective attribute upon user confirmation. For example, as shown in FIG. 2, the value "$239.99" is underlined to indicate that it provides valid data for the "Price+" attribute. Alternatively, the user may highlight and select another piece of text and designate that text as the data for the selected attribute. In yet another embodiment, the user may skip to the next attribute for data entry without entering any data for the currently selected attribute.

In addition, the user may navigate to a different page of the presented information using the shipping and warranty buttons 220 and 221, respectively. The new page may also be presented in section 219. The system may likewise auto-select the appropriate attribute and highlight the relevant text or data from within the displayed information. The user may confirm the selected text or data, add a value to the selected attribute, or skip the selected attribute. Any attribute contributed by the user using data on different pages may be associated, by the client computer, with the anchor URI selected by the user and presented in section 214.

Figure 8:
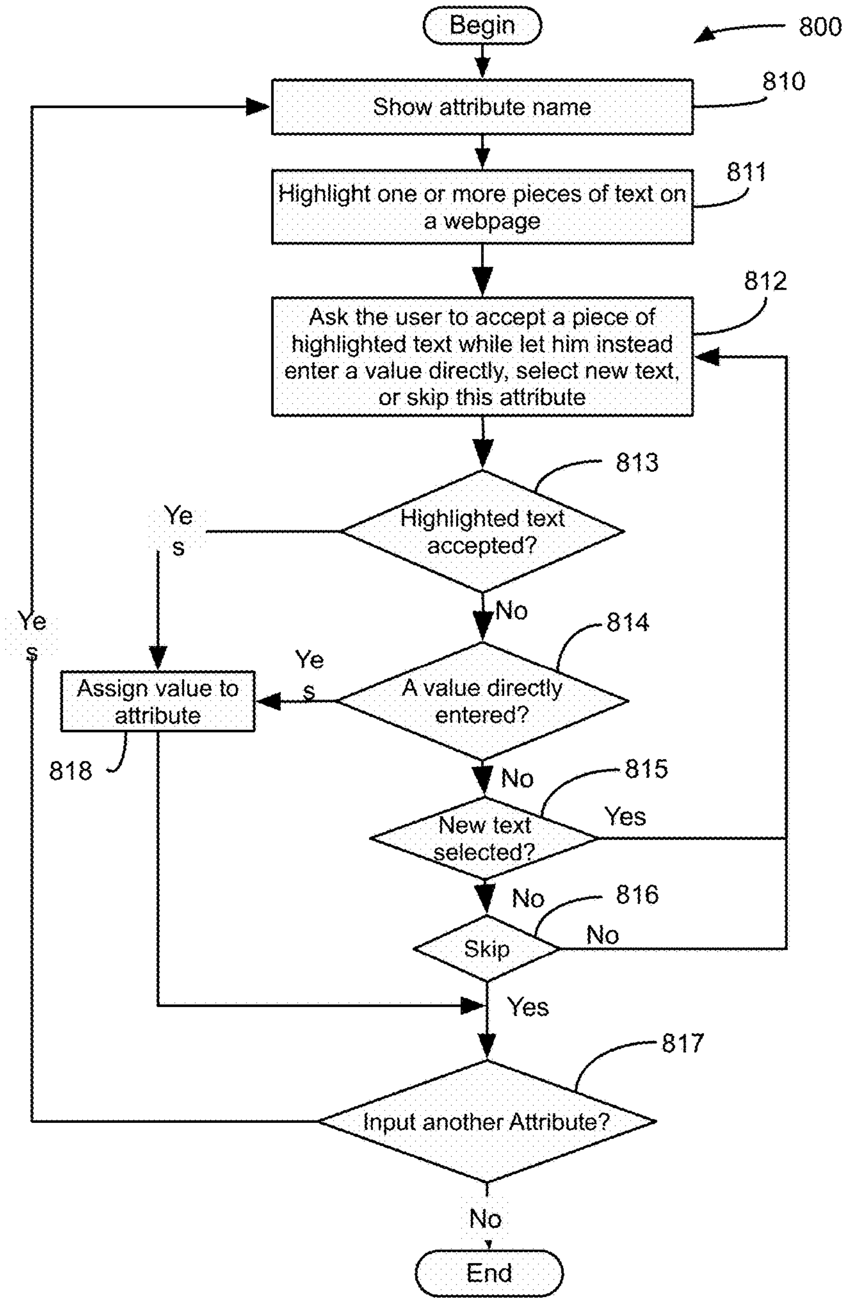
FIG. 8 is a flow diagram of a process for annotating digital information using an auto-prompt feature according to an embodiment of the present invention.

FIG. 8 is a flow diagram for process 800 for annotating information using the auto prompt feature according to an embodiment of the present invention. At step 810, the attribute of interest and the textual description or identification of the attribute is presented to the user. At step 811, one or more pieces of text, from within the presented text are highlighted or made known to the user. In an embodiment, the system may audibly alert the user to the selected attribute and highlighted text. As step 812, the user is provided with a choice to accept the highlighted text and designate the text as data for the selected attribute. In some embodiments, the user may also be given a choice to enter his own data, select some other text, or skip the data entry for that attribute. At step 813, the system checks to see if the user has accepted the highlighted text. If it is determined at step 813 that the user has accepted the highlighted text, the highlighted text is assigned as data for the selected attribute at step 818 and user is asked whether he wants to add data for another attribute at step 817.

If at step 813, the user does not accept the highlighted text, the system checks whether the user has entered a value directly in the data field for the attribute at step 814. If the user enters a value at step 814, the process moves to steps 818 and 817, respectively as described above. If the user does not enter data at step 814, it is determined whether the user has selected some other text at step 815. If the user has selected some other text, the process returns to step 812. If it is determined at step 815 that the user has not highlighted any other text, a determination is made whether the user has indicated that he wants to skip entering data for the selected attribute at step 816. If the user has not elected to skip data entry, the process returns to step 812. If the user selects to skip data entry at step 816, the user is given an option to input data for another attribute at step 817. If the user elects to input data for another attribute, the process return to step 810, if not the process ends.

It will be appreciated that process 800 described herein is illustrative and that variations and modifications are possible. Acts described as sequential may be executed in parallel, order of acts may be varied, and acts may be modified or combined. Information presentations, prompts, selections, and feedbacks as described in process 800 may be visual, audio, tactile, or combinations thereof.

Figure 9:
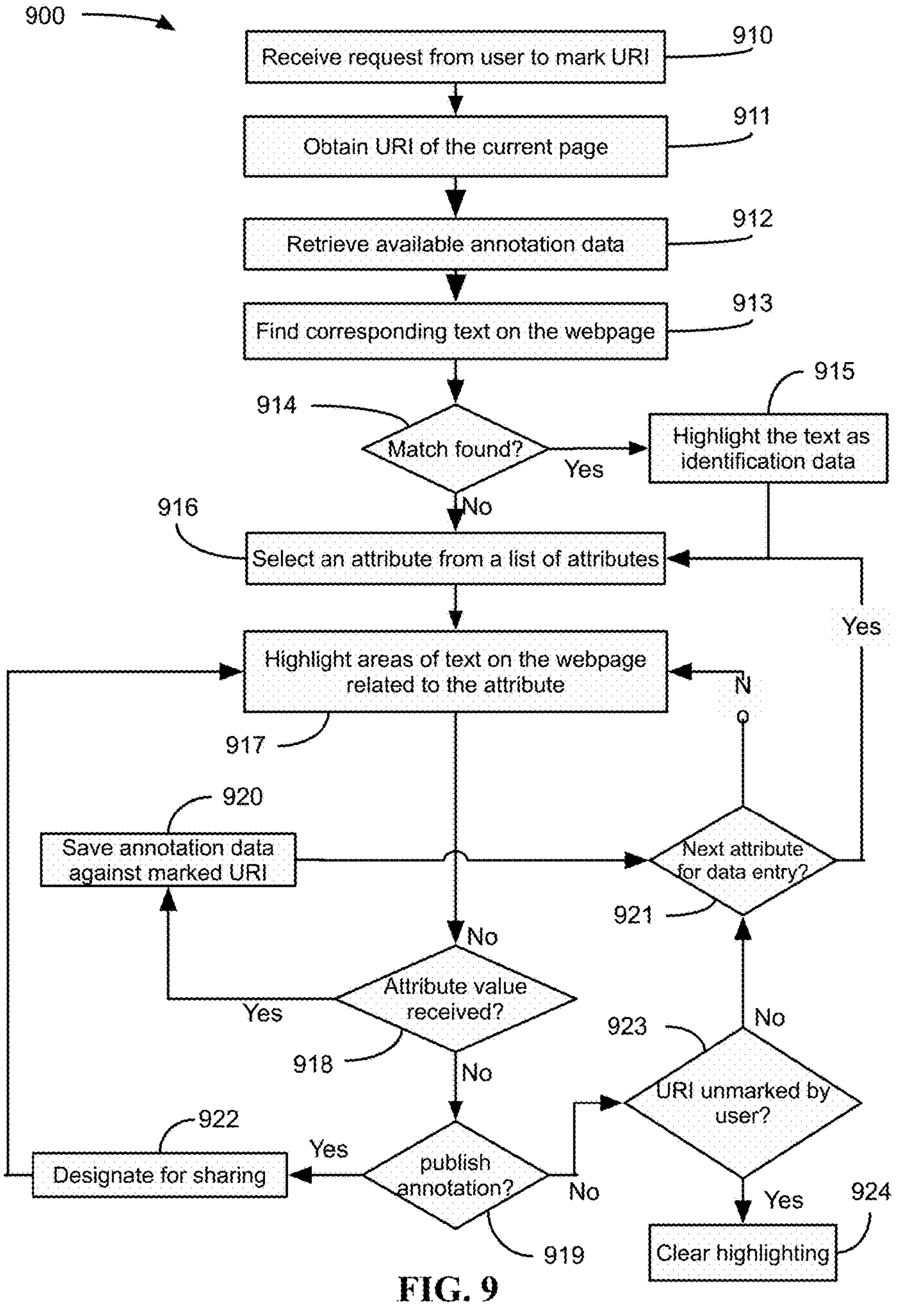
FIG. 9 is a flow diagram of a process for sharing annotations according to an embodiment of the present invention.

FIG. 9 shows a flow diagram of process 900 for sharing annotated digital information according to an embodiment of the present invention. At step 910, the system receives a request from the user to mark a particular URI for annotation. At step 911, the URI may be obtained from, e.g., a browser. Alternatively, the current URI being displayed may be the marked URI. At step 912, existing annotation information for the URI is located. The annotation information may be stored on a local storage medium of the user system or on a remote storage medium. As described previously, the annotation information may comprise identification data related to the item of interest. At step 913, the text for the web page associated with the URI is searched to find whether there is text that matches identification data included in the retrieved annotation information. If a match is found, at step 914, the relevant text is highlighted and designated as identification data at step 915. The new identification data may be appended to the existing identification data or may be overwritten on the existing identification data.

If no match is found at step 914, the system may select an attribute from the list of attributes for the user to update at step 916. At step 917, the displayed text is scanned to reveal/highlight any text that may be considered as valid data for the selected attribute. The user may then designate the highlighted text as data for the respective attributes as discussed in reference to process 800 above. In an embodiment, the user may scroll to various sections of displayed text to locate the relevant highlighted data. Auto highlighting of relevant values for attributes may also be disabled or omitted. The user may be prompted to enter a value of a specific attribute or he may skip to the next attribute or select a piece of text on the webpage as the input for such a value. The value may be assigned to the attribute upon user confirmation. In some embodiments, the value available for an attribute of interest in the existing annotation information obtained at step 912 may be provided as the default value for the attribute. The user may accept the default value as the current value for the attribute. In an embodiment, the name of each attribute of interest may be announced to a user who may respond verbally with either the command “skip” or the value for the attribute in question. The value so received would then be acknowledged audibly and/or visually. The user may then confirm the value before proceeding to the next attribute. In an embodiment, the user may respond to the various prompts by providing his input in textual or audio form. For example, a mobile phone or a multi-media computer may be equipped to provide audio prompts and receive audio input to those prompts from the user.

At step 918, the process checks whether an attribute value was received from the user. If a value is received, the annotation entry is updated with the new value at step 920 and a check is made at step 921 whether there is another attribute to be updated. If no attribute value is received at step 918, the user is given a choice to publish the annotation entry at step 919. If the user chooses to publish the annotation entry, the annotation entry is designated as being available for sharing at step 922. In one embodiment, once an annotation entry is marked for sharing, that entry may be communicated to an external system for storage where other users having access to the external system may use the annotation entry. If the user decides not to publish his annotation entry at step 919, a check is made whether the user has unmarked the URI at step 923. Unmarking a URI stops the data entry process for the marked URI (e.g., no highlighting of the webpage text). However, the annotation process may be resumed by having the same URI marked again.

If at step 923, it is determined that the user has unmarked the URI, the highlighting of the text related to that URI is cleared at step 924. If the user has not unmarked the URI, the user is prompted to enter information for the next attribute at step 921 and text relevant to the next attribute is highlighted for the user. It will be appreciated that process 900 described herein is illustrative and that variations and modifications are possible. Acts described as sequential may be executed in parallel, order of acts may be varied, and acts may be modified or combined. For instance, the locating and highlighting of text on a webpage that may match some identification data of the item of interest may be performed before a user requests a URI be marked. This approach may assist the user to decide relevance of the webpage by automatically locating possible relevant text matching or otherwise related to the item of interest. In addition, information presentations, prompts, selections and feedbacks as described in process 900 may be visual, audio, tactile, or combinations thereof.

FIG. 10 illustrates a sample annotation summary page that may be presented to the user according to an embodiment of the present invention. In one embodiment, the summary may be presented on a UI screen described above. In other embodiments, the summary may be audibly presented to the user. The sample page of FIG. 10 shows annotation summary for the Sami T3 handbag example discussed above. Section 1010 displays annotation summary that includes information about various URIs. The information includes some or all of the relevant attributes that user has associated with the URIs. The page presents a snapshot view of the information that a user may need to make an informed decision about buying the Sami handbag. Although the sample summary page only shows three URIs, the user may designate the maximum number of results to be displayed on a page. Further, if there are more results than may fit on a single page, multiple pages listing the URIs of interest may be generated and the user may navigate to the various pages by selecting from a list of page numbers presented on each page. The summary page also includes the capability of sorting the list according to one or more criteria, e.g., price, total, warranty, etc. The summary page may also include 'total cost'. The total cost is derived value and is a sum of the values for the price, tax and S&H cost attributes. In the instance where an exact value for a particular optional attribute, e.g., tax, is not known, the system may designate the total cost by marking the cost as approximate. In one embodiment, the '~' symbol may be used to indicate an approximate value. In some embodiments, if an essential attribute, e.g., shipping and handling, is not known, the system may designate the total cost as "TBD" (To Be Decided) to indicate its inability to determine the total cost. In other embodiments, the system may approximate the missing values by searching for equivalent information.

Figure 11:
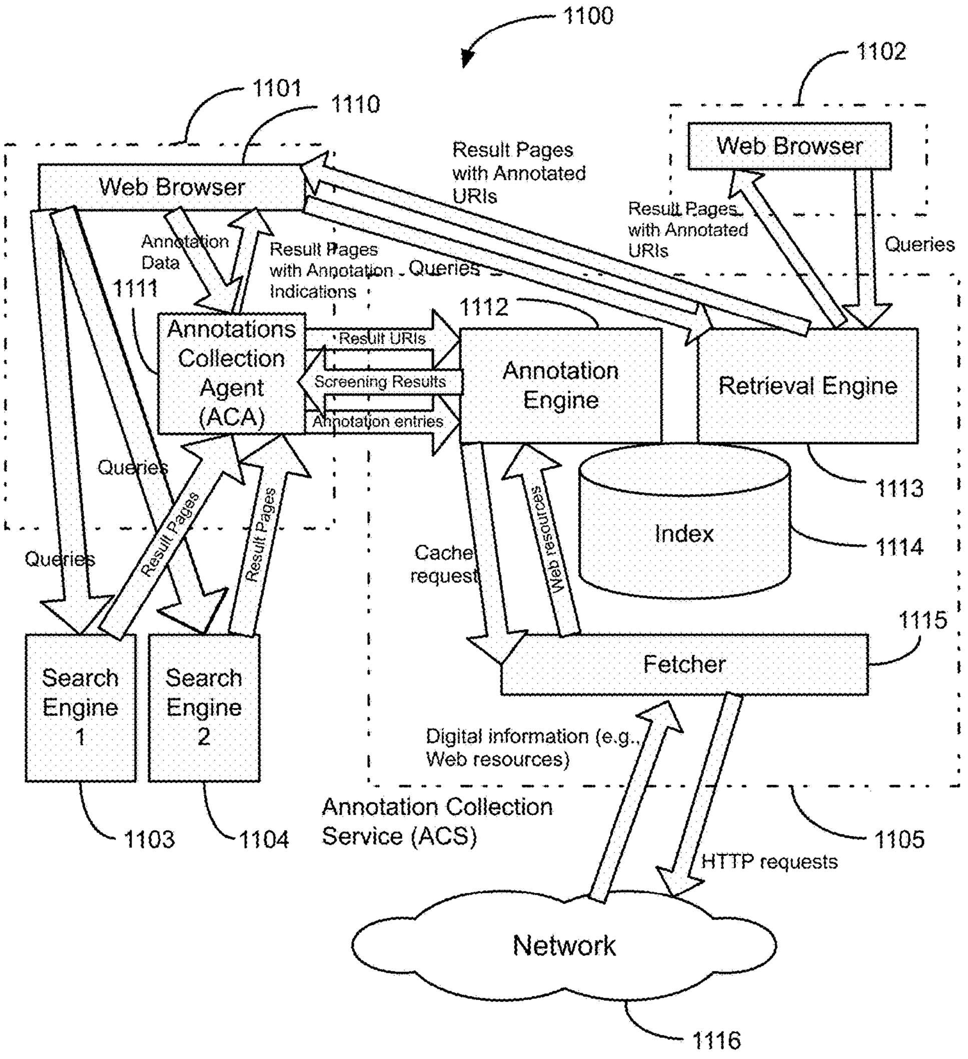
FIG. 11 is a block diagram of a system for sharing of annotated information according to an embodiment of the present invention.

FIG. 11 illustrates a system 1100 for performing annotation collection and retrieval according to an embodiment of the present invention. System 1100 includes client computers 1101 and 1102. Client computers 1101 and 1102 may be any general-purpose computers or devices capable of communicating with other devices over a network and having the ability to connect to the Internet. System 1100 also includes search engines 1103 and 1104. Search engines 1103 and 1104 may be any conventional search engines or specialized search engines. In an embodiment, search engines 1103 and 1104 may be included as part of client computers 1102 and/or 1102. Annotation collection service (ACS) 1105 may provide annotation management functions such as, annotation creation, storage, modification, and retrieval. In some embodiments, ACS 1105 may be referred to as annotation management unit.

Client computer 1101 (or 1102) may provide user interface 1110, e.g., as described in FIG. 2 and provide predefined attributes for a plurality of contexts such as shopping, etc. A user may use user interface 1110 to submit a search query to search engines 1103 or 1104 to search for an item of interest. In an embodiment, a user query may be submitted to multiple search engines concurrently. The results pages from the search engines may be received by annotation collection agent (ACA) 1111. The workings of the ACA are described in more detail below. ACA 1111 communicates with annotation engine 1112 of ACS 1105 in order to exchange information about marked URIs, annotation entries, etc. Retrieval engine 1113 is configured to accept queries from client computers 1101 and 1102 for retrieving information and communicate the results including annotated URIs to the client computers. Index 1114 is a repository or database that stores annotated URIs and the information associated with the annotated URIs. For example, information associated with annotated URIs may include item description and content information represented by the URI. Fetcher 1115 may communicate with network 1116 to collect digital information based on requests from annotation engine 1112. For example, upon receipt of an annotation entry or related information from ACA 1111, the annotation engine may send a request to fetcher 1115 to cache one or more webpages implicated by the URI to which the annotation corresponds or is otherwise associated. Fetcher 1115 may periodically fetch web pages associated with a URI and cache these web pages in index 1114. If a particular URI is no longer valid, fetcher 1115 may report this invalidity to annotation engine 1112, which may update index 1114 accordingly. Annotation engine 1112 may analyze these fetched web pages for information to update the attributes of existing annotation entries or create new and more recent annotation entries using attributes so updated. For example, a fetched web page may be compared with an older web page of the same URI. The differences in content, specific elements or parts of the content, and the locations or identities of these differences in relation to the locations or identities of the data for the attributes accumulated since the previous annotation entry may provide the information to update the existing attributes should such information changes over time. The cached web pages provide a snapshot of the contents of the web pages as of the day of caching. The annotation engine receives a copy of a web page from fetcher 1115 and stores it against the annotation data entry of the URI maintained in index 1114. The content of the copy of the web page may also further be analyzed and indexed. A user may later recall the web page and use it for comparing against a newer version of the web page or any other web page of interest.

System 1100 may receive and maintain annotation entries or data specific to a context or subject matter of interest, e.g., for context of shopping or for a subject matter of shopping for handbags or a particular handbag, the resulting annotation entries may serve as online offers with explicit item descriptions (i.e., identification data) and comparable attributes. For example, if retrieval engine 1113 is looking for items of interest, the retrieval engine may place a primary emphasis on item descriptions if matching user queries against such annotation entries, while treating attributes as dependent to this primary emphasis. A user, in one embodiment, may use a typical Web browser to search or otherwise access such online offers maintained in index 1114 of ACS 1105, in the same or similar manner as it may interact with typical search engines or services. For example, client computer 1102 may send queries to and receive result pages from ACS 1105 through retrieval engine 1113 in the same way as it may with any typical search engine or service. However, unlike result pages from search services 1103 and 1104, the search results received from ACS 1105 comprise recall handles that are all contextually congruent and annotated. ACS 1105 may also provide an input page or interface that accepts individual inputs or search items as attributes or data for the attributes for query, in addition to a description of the item of interest. Client computer 1101 may use the search service provided by ACS 1105, through retrieval engine 1113 of ACS 1105 or have ACS 1105 as one of the search service choices available to accept general textual queries (i.e., one that lacks specifically denoted identification data and attributes) sent from Client computer 1101. For the latter case, the user queries and result pages need not be intercepted or otherwise handled by ACA 1111 of Client computer 1101. For the context-specific general queries, identification data, available attributes and cached copies of the resources maintained in the index may assume different weights in the determination of which annotation entries (and therefore which URIs and resources) are more relevant to the queries from among the available annotation entries. For instance, identification data may have higher weight under typical circumstances.

Figure 12:
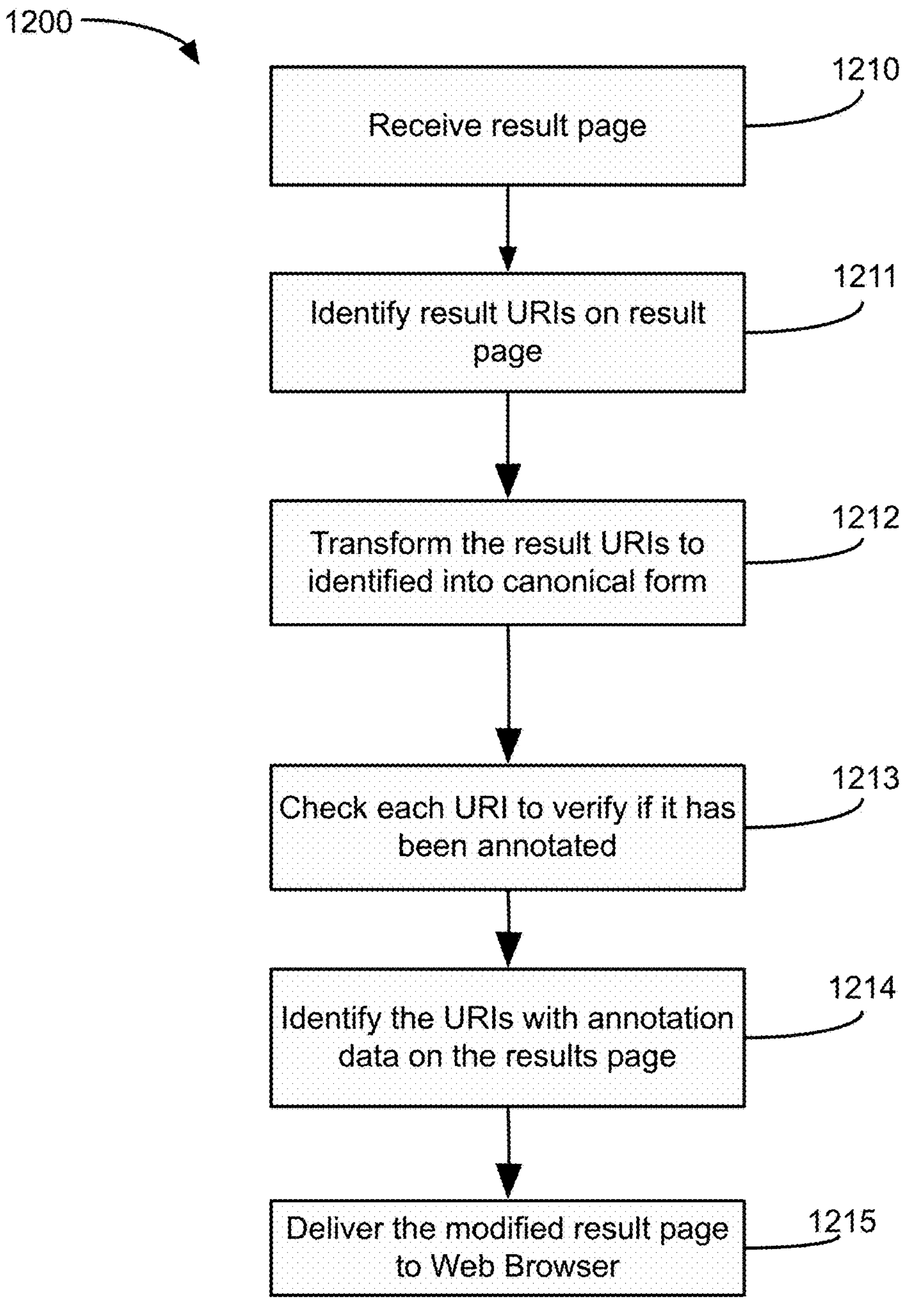
FIG. 12 is a flow diagram of a process for modifying presentation of search results having annotation entries according to an embodiment of the present invention.
Figure 13:
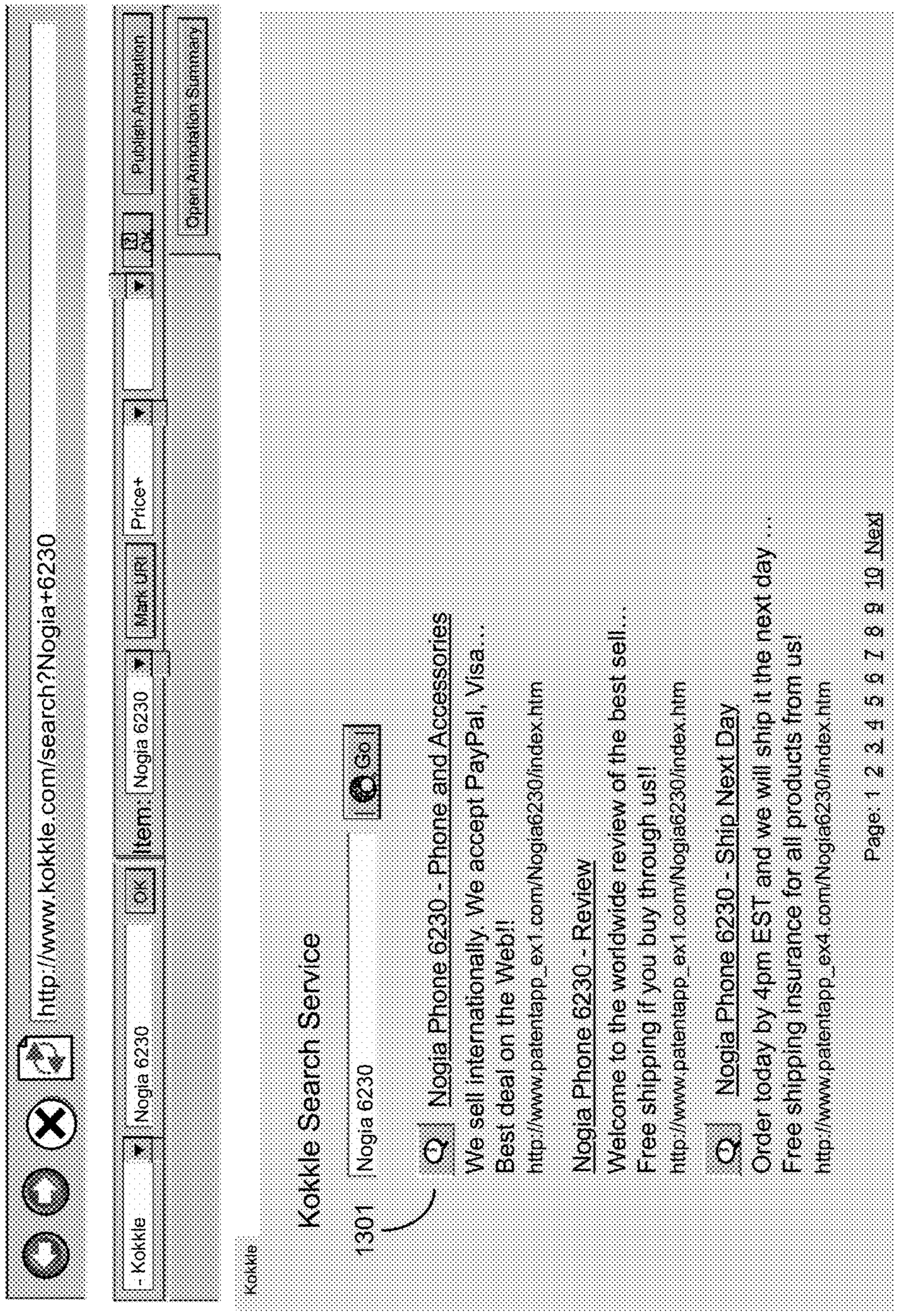
FIG. 13 illustrates modified presentation of search results having annotation entries, according to an embodiment of the present invention.

FIG. 12 is a high-level flow diagram of a process 1200 for modifying search results received from a search engine before being communicated to a UI such as a Web browser, according to an embodiment of the present invention. Process 1200 may be implemented e.g., by ACA 1111 of FIG. 11. At step 1210, the ACA receives the results page from the search engine. At step 1211, the ACA may identify the relevant URIs that correspond to the search term/s provided by the user. At step 1212, the ACA transforms the identified URIs into their canonical form. This is done to maintain consistency between disparate URIs. The ACA may communicate with the annotation engine of an ACS to identify the URIs that have annotation data associated with them, at step 1213. The annotation engine of the ACS may query the index of the ACS to determine which of the URIs have annotation data associated with it and communicate that information to the ACA at step 1214. In an embodiment, the ACA may also request the annotation engine to provide entries of URIs equipped with hyper-texting to annotation entries of screened URIs. The ACA may embed such hyper-texting as part of an annotation availability indication in the result page for presentation to the user. At step, 1215, the ACA modifies the result page in accordance to the results obtained from the annotation engine and other relevant information from the ACS (through the annotation engine) and presents the modified page to the user. FIG. 13 provides an illustration of a sample modified results page according to an embodiment of the present invention. In an embodiment, the modified search results that have annotation information available are indicated using annotation indicator 1301. Annotation indicator 1301 is linked to the annotation data for that particular URI. Selecting annotation indicator 1301 will result in the annotation data for the associated URI being presented to the user.

It will be appreciated that process 1200 described herein is illustrative and that variations and modifications are possible. Acts described as sequential may be executed in parallel, order of acts may be varied, and acts may be modified or combined.

In addition, embodiments of the present invention may be realized using any combination of dedicated components and/or programmable processors and/or other programmable devices. While the embodiments described above may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. For instance, multiple processors may be involved in interaction with a user and in the creation and storage of the annotation entities. The annotation entities may be stored in a plurality of storage media, which these processors may access independently. For instance, the attributes and the values associated with the attributes may be stored on separate storage media. Further, the creation of annotation entities is not limited to information searched by a user. A content creator may pre-annotate information before making it available to the public at-large. The pre-annotated information may be shared among multiple users. For example, an annotation or metadata entry for a retail offer may be prepared or otherwise made available by a retailer or an advertiser for a consumer to publish or share with other consumers. In one embodiment, users may access the pre-annotated information, add their own annotations and share the modified annotated information with other users. In some embodiments, the user may specify a time for which annotated URIs and/or information designated for sharing will be kept private and non-accessible to other users. For instance, the user may specify that his collection of personal annotation entries or his preference or ranking of annotation entries remains private until his current annotation or search session associated with this collection is complete, which may be triggered by various events. For example, in researching for retail online offers, the user may signal the end of session by indicating which annotated online offer he would choose among those that have been collected or included in his collection of annotation entries of online offer for a particular retail product or service. In one embodiment, the user's collection of annotation entries will be cleared upon the end of session, and ready for a new session. In another embodiment, a summary may be provided for an attribute related to annotation entries in a session or in some category of classification. For example, a price range may be determined and published for the lowest and highest prices (currency-adjusted, if applicable) of all the annotated online offers in a shopping session or in a particular city.

In yet another embodiment, a user may be associated with multiple concurrent sessions, for example, one session for a particular subject matter of interest, such as retail offers for a particular good or service. Annotation entries may be related to a particular good or service by having the same, equivalent, or compatible description of a good or service, or a reference to the good or service, or via some other means. An embodiment may also publish or advertise the most chosen or favorite annotation entries based on the interaction of a plurality of users with the available annotation entries. For example, a user may mark an annotation entry as favorite, like, or bookmark. A user may rank a plurality of annotation entries. A user may be allowed only to favor or recommend a limited number of annotation entries during a session of annotation or an interval of time for a particular subject matter of interest. For instance, an embodiment may enable users in a social group to annotate a plurality of retail items or offers on the Web, and to vote or rank among these annotated items or offers, so to rank or determine the most favorable items or offers, for example, as group gifts, group purchases, or some other common purposes.

In one embodiment, an annotation entry for an online item or offer of interest may include a photo of the item or a sales receipt for the item, or a hyperlink (textual, visual, or otherwise) to the offer webpage. In another embodiment, a software button or hyperlink on a webpage may cause creation of or make available an annotation entry, the annotation entry comprising, for example, an image of an item available online, or a URI or URL of an offer posted online. The user triggering the software button or hyperlink may specify or select a subject matter (e.g., best gifts, cool nightclubs, or retail offers) with which the annotation entry is associated. The user may further qualify a subject matter that might have otherwise been made available to him for selection, for example, user input of wedding for best gifts and of a particular retail product or service name for retail offers. The user may be regarded as author of the annotation entry or otherwise responsible for the submission of the annotation entry to a system equipped with the present invention. In one embodiment, the software button or hyperlink may be associated with a subject matter, e.g., quality offer, so that the user needs not explicitly provide a subject matter. In another embodiment, attributes and their data may be preconfigured or preloaded, e.g., by the webpage, and they may or may not be editable by the user. The user may also be able to add or remove an attribute or its values. In another embodiment, an application installed on a user device may, upon receiving an indication from the user (such as a touch tap or mouse click on a software link, button or icon on the device screen), cause the device to submit an entry to one or more computer systems equipped with the present invention, wherein the entry comprises information pertaining a subject matter, the user did not manually enter the information, and the information is available to another user for the subject matter. For instance, the application may present a retail offer on the device screen along with a button to bookmark or favorite it. Upon receiving a click or tap on the button, the application may cause the device to send an entry comprising information about the retail offer, such as identification of the item, seller and price to a computer system for comparative shopping, where the user did not enter the information. For example, the application may present to the user some content with advertisements, each being associated with a trigger such as a button, link or icon. A pre-made or otherwise prepared retail offer information entry, the content of which having been provided by the advertiser or content provider, for instance, is associated with each trigger. These individual entries may be stored on the data store in the device or otherwise associated with the application, or embedded as part of the content presented by the application. The corresponding entry will be sent by the application or device upon selection of a trigger by the user. Multiple devices equipped with such an application or devices capable of visiting websites implementing this functionality (e.g., via a browser application installed thereon) may contribute retail offer or shopping entries to enhance or otherwise improve comparative shopping online.

In yet another embodiment, the software button or hyperlink may be activated to present or otherwise be associated with one or more templates of attributes, each template being associated with a subject matter. For example, a user may specify or select a subject matter, the specification or selection of which resulting in the user being presented a template of attributes, with or without preloaded data, for input, edit or confirmation. In one embodiment, a system equipped with the present invention may determine one or more subject matters in question of a document associated with an annotation entry that the system or its proxy receives, for example, based on data, attributes, or data associated with the attributes that are available in the annotation entry, without the user associated with the annotation entry having explicitly specified a subject matter. For instance, an analysis of such data, attributes, or data associated with the attributes, e.g., based on their standalone meanings (pre-defined or otherwise), their semantic relationships and interpretations with other terms therein, a relative likelihood of a group of semantically relevant terms being present together in relation to a particular subject matter, and so on, may be utilized, in part or in whole, to determine a subject matter for the document of interest. In one embodiment, the presence of such a software button or hyperlink on a website is sufficient for indicating the subject matter of interest. For example, a button, hyperlink or a user interface element labelled with a designation, description or expression specific to a shopping website, service or brand may indicate shopping-related content or subject matter, and information entered by a user or otherwise made available through this button, hyperlink or user interface element is therefore associated with shopping.

In another embodiment, a subject matter of an annotation entry or a document associated with the annotation entry may be pre-assigned or pre-determined without the user associated with the annotation entry having provided an indication of the subject matter, for instance, by having the document or its associated metadata embed such information that may be readable or otherwise interpretable by the invention-embodying system. For example, an author, publisher, or machine generator of the document may have embedded the subject matter information into the document or its metadata, the subject matter information which may or may not be readable or perceivable by the user associated with the annotation entry; or a computer sending the annotation entry to the system may be capable of retrieving subject matter information from or for the document without specific input from the user to perform such retrieval. And the user may, for example, simply submit or cause the computer to submit an annotation entry for the document to the system, the annotation entry comprising subject matter information for the document without the user having provided the subject matter information.

In yet another embodiment, data, attributes, or data associated with the attributes available in an annotation entry received by a system equipped with the present invention may be generated without the user associated as an author, submitter, contributor, or originator with the annotation entry having provided the data, attributes, or data associated with the attributes. For instance, an author, publisher, or machine generator of the document may have embedded such data, attributes, or data associated with the attributes into the document or its metadata, such data, attributes, or data associated with the attributes which may or may not be readable or perceivable by the user associated with the annotation entry; or a computer sending the annotation entry to the system may be capable of retrieving such data, attributes, or data associated with the attributes from or for the document without any input from the user. In some embodiments, the user may identify an attribute for inclusion into the annotation entry, and the computer may provide the data associated with the attribute to the annotation entry in response to such act of identifying. In another embodiment, the user may submit or cause the computer to submit an annotation entry for the document to a system equipped with the present invention, the annotation entry comprising data, attributes, or data associated with the attributes in relation to the document, without the user having provided the data, attributes, or data associated with the attributes.

A method, process, and system for collecting review information per some subject matter, such as that by consumers of products, sellers, offers, and events, are also provided. Such review information includes any information expressing or comprising an opinion, and it includes but not limited to a vote, a selection of discrete choice(s) (e.g., like, dislike, OK), a numerical value, comments in text, audio or video, and so on. Example subject matters include a specific product, place, event, and so on, with which a consumer may engage or be involved. Review information may be associated with a proof record indicating previous engagement or relevant experience with the subject matter for which the review information is provided. A product may be a service, food and beverage, digital goods, or anything that may be owned, experienced, bought, auctioned, bartered, exchanged, or transferred. A place may be any provider of a product, including but not limited to a retail store, a whole-sales, and a person. A subject matter may also be about an abstract entity. For example, a retail offer may be the subject matter of interest, and retail offer information may comprise product, seller, and price information. A retail offer description may also include time information, such as expiry time, transaction time, and/or submission time.

Figure 14:
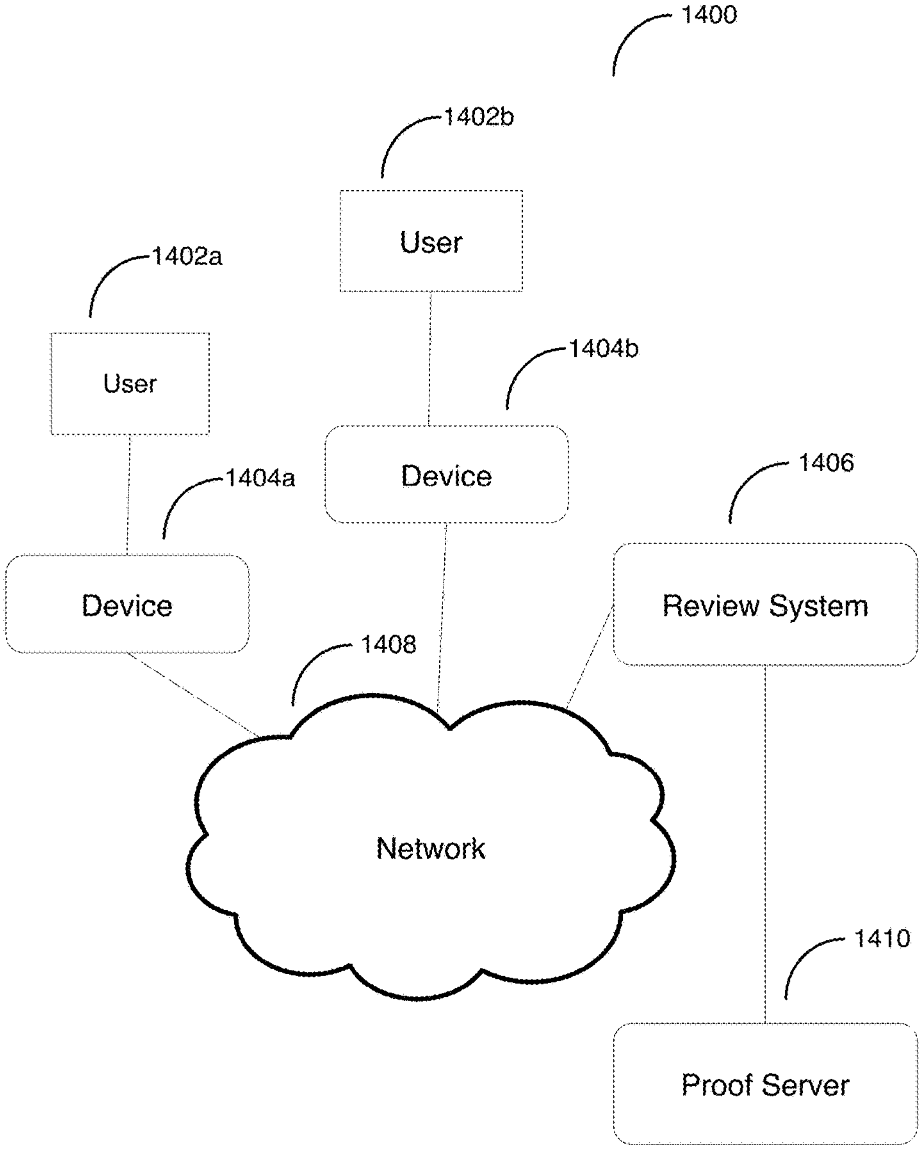
FIG. 14 illustrates an example environment for collecting reviews from users.

FIG. 14 illustrates an example environment 1400 for collecting reviews of some subject matters from a user. A plurality of users 1402*a* and 1402*b* may submit and retrieve review information for a subject matter, such as a product, seller, offer, or event, at their respective devices 1404*a* and 1404*b*, which are communicatively coupled to a review system 1406 via a network 1408 such as the Internet. (And any type of network is within the scope of various embodiments.) The review system 1406 may comprise any entity that receives, organizes, or publishes consumer reviews or their summaries pertaining to one or more subject matters, and include any system that accepts submissions of content or information comprising or indicating review content or information For example, the review system may include a search service that accepts queries or requests about a product or seller from one or more users through a device such as a computer, a terminal, or mobile phone, and presents the one or more users with consumer reviews or their summaries pertaining to the product, seller, sellers of the product, or the offers of the product or seller. The mode of such queries, requests or presentations may be textual, visual, audio, tactile, or anything communicable to or perceivable by the users. In addition, the review system 108 may act as a gateway or proxy to review information available at another review system (not shown), to which the review system may be coupled directly or via a network.

A proof server 1410 is communicatively coupled to the review system 1406. The proof server 1410 maintains proof records in relation to the reviews that are available via the review system 1406. According to one embodiment, an image of retail receipt may be a proof record, as well as an assertion by an authorized person such as a system administrator or an outsourced party that is tasked to verify a proof of engagement submission, or proof submission, submitted by a user. An example of a proof submission may include a retail sales receipt.

For instance, according to one embodiment, the user 1402*a* may send a query via the device 1404*a* about a retail item to a search engine comprised by or otherwise associated with the review system 1406. In response the review system 1406 retrieves review information associated with the retail item, the review information including the individual consumer reviews and a summary score based on the reviews, and presents the review information to the user 1402*a* via the device 1404*a*. Each review so presented includes an indication (e.g., an icon, a button, a hyperlinked text) that a copy of sales receipt is available for view. The user may select the indication so that in response the review system 1406 may obtain from the proof server 1410 the corresponding receipt image and presents the image to the user 1402*a* via the device 1404*a*.

According to another embodiment, a query about a retail item received by the review system 1406 may cause the system 1406 to return a list of sellers offering the retail item for sales, or a list of offers or advertisements relating to the retail item. Each entry in the list comprises an indication of consumer reviews, such as a review summary (e.g., a score based on the individual scores associated with the reviews). In one embodiment, the system may calculate or determine an overall or weighted average score based on the scores in individual reviews collected as part of user feedback. For example, the calculation or determination may include assigning less or zero weight to scores in reviews not being associated with a proof record, or assigning more weight to scores in reviews being associated with one. For instance, to calculate an overall score or rating for a product, service or seller, the system may take an average of the scores or ratings received from a plurality of score or rating submitters, after each of these scores or ratings have been adjusted. For example, if a submission of a score or rating is accompanied or otherwise associated with a proof record, the score or rating may be weighed twice as much as a submission without a proof record. For example, if there are eight submissions of rating on a scale from one to five stars, where two of them have two stars and are accompanied with an invoice, a sales receipt, or the like, while the other six have four stars but with no invoice, sales receipt or the like, then the overall score may become three stars, corresponding to the calculation that: sums the number of stars for submissions associated with an invoice, sales receipt or the like, then multiplies the sum with a weight associated with submissions for having such a proof record; sums the number of stars for submission with no invoice, sales receipt or the like; and adds these two sums, then divides the total by the sum of the number of submissions or submitters and the number of submissions or submitters associated with a proof record. With the weight being two, the example result would be (8+24)/(8+2)=3.2, which is rounded down to 3, i.e., three stars. In contrast, an overall score may have been three and a half stars (i.e., 3.5) if there is no such weighting or weight consideration. In an embodiment where a submitter may update or otherwise revise his submitted rating, such an update or revision may trigger re-calculation taking into account if a proof record is provided with the update or revision. One skilled in the art would be able to adapt existing rating or review systems (e.g., product reviews on Amazon.com), schemes, algorithms and the like, or derive a new system, scheme, algorithm and the like, to take into account of assigning a higher value to ratings or scores given in a submission associated with a proof record. For instance, in an embodiment, scores associated with feedback or reviews from a user who has experience with a minimum number of entities in a category (e.g., having visited five different Japanese restaurants in a particular city) would be given or otherwise associated with a higher value of weight or weighting (e.g., 2), when the feedback or reviews are given for or otherwise associated with entities in the category (e.g., Japanese restaurants in the city), and are submitted or otherwise associated with a proof record (e.g., a bill, invoice, sales receipt, or a verifiable code from the reviewed entities). Otherwise, scores associated with feedback or reviews from a user would be given or otherwise associated with a neutral value of weighting (e.g., 1) when the feedback or reviews are submitted or otherwise associated with a proof record, and a lower value of weighting (e.g., 0.5) when they are without a proof record. One skilled in the art would be able to identify, derive or otherwise determine various methods, schemes, formulas, algorithms and equations to arrive at an overall score based on individual scores that are weighted differently, such as those illustrated herein.

In one embodiment, an indication of consumer reviews is selectable so that its being selected by a user would cause the review system 1406 to obtain a list of reviews relative to the seller, offer, or advertisement in question, where each review entry is associated with a user-selectable indication of the availability of proof of purchase, and the selection of this indication by a user causes the review system 1406 to obtain an available representation of the proof from the proof server 1410, and to present the representation to the user 1402*a* via his coupled device 1404*a*.

The user 1402*a* may also select an existing entry of a subject matter as provided by the review system 1406, or add a new entry for the subject matter to the review system 1406, and then submit to the review system 1406 a review (textual, audio, or otherwise) and a representation of proof of engagement (e.g. a photo of a sales receipt) in association with this entry. The review system 1406 causes the proof server 1410 to store as a proof record a representation of proof of engagement, and to maintain it for future retrieval. According to another embodiment, an administrator (not shown) may access the proof server 1410 and select to accept or reject the proof submission comprising the proof of engagement or its representation.

The users 1402*a* and 1402*b* in FIG. 14 may submit reviews, receive reviews, or do both. They may be a machine or computer system acting in the role of a user. The users 1402*a* and 1402*b* may also be communicatively coupled to the review system 1406 directly without via a network or a device. According to other embodiments, the review system 1406 may comprise the proof server 1410, or the proof server 1410 may comprise a module or component associated with the review system 1406.

Figure 15:
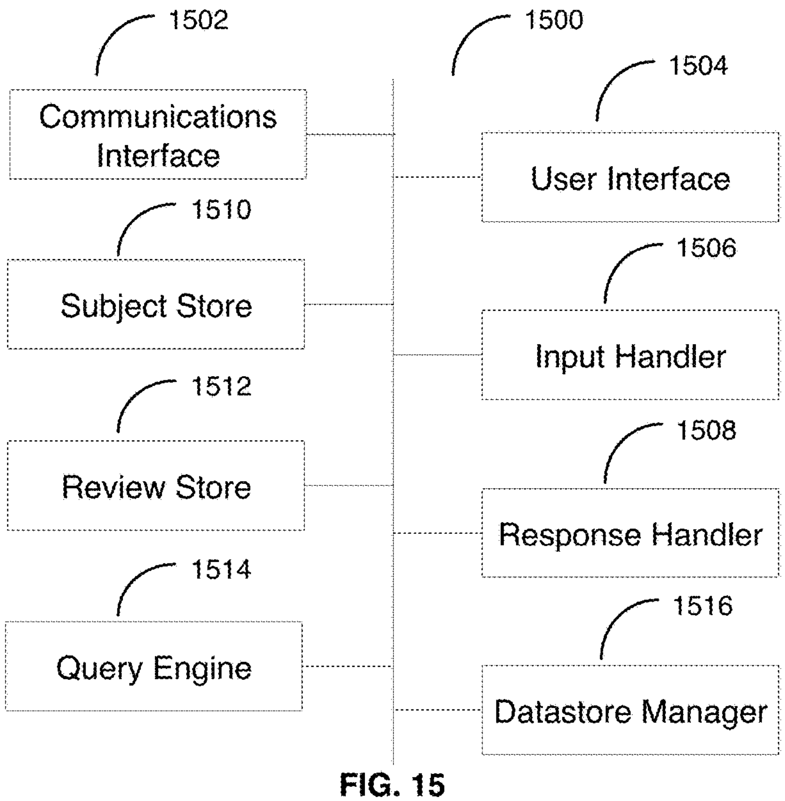
FIG. 15 illustrates a block diagram of an example review system.

Referring to FIG. 15, a block diagram of an example review system 200, such as the review system 1406 illustrated in FIG. 14, is shown. The example review system 200 includes a communications interface 1502, a user interface 1504, an input handler 1506, a response handler 1508, a subject store 1510, a review store 1512, a query engine 1514, and a datastore manager 1516.

The communications interface 1502 is provided for communicating with devices over a communications medium, such as the devices 1404*a* and 1404*b* and the network 108 shown in FIG. 14. These devices communicate with the review system 200 via the communications interface 1502 utilizing various modes of delivery of data or messages, such as requests, responses, and notifications. Examples of such requests include login credentials; submissions of subject matter information, reviews and representations of proof of engagement; queries for subject matters and reviews; requests for presentation of subject matters, reviews and proof records; and so on. Examples of such responses include search results or parts thereof, subject matter, review and proof information, references to subject matter, review and proof information, error messages, and so on. Examples of such notifications include asynchronously delivered subject matter, review and proof information, alerts of subject matter, review and proof information, location-triggered or time-of-day messages, and so on. Any type of communications interface or mode of delivery is within the scope of various embodiments.

The user interface 1504 is provided for communicating with a user, such as via the devices 1404*a* and 1404*b* described herein. It is configured to interact with the user to obtain his input as well as presenting output to him. For instance, it may be configured to communicate with a display engine or graphical user interface included in the devices 1404*a* and 1404*b* that are coupled to the users 1402*a* and 1402*b*. It may also comprise a display engine or graphical user interface capable of accepting and presenting information from and to the users 1402*a* and 1402*b*, whether the information is graphical, textual, audio, or any other mode of communication. For example, the user interface 1504 may present a search input box with which the user 1402*a* types in their query, accept the query, and present information entries in response to the query. Data or messages between the user 1402*a* and the user interface 1504 are delivered via the communications interface 1502. Any type of user interface is within the scope of various embodiments.

The input handler 1506 is provided for processing requests and submissions. For instance, it interprets requests received by the user interface 1504 from the user or the device, and directs or otherwise causes other components or modules in the review system to fulfill those requests. Examples of such requests include a query, new subject matter entry submission, review submission, proof submission, account login, and so on. For example, the input handler 1506 may cause the datastore manager 1516 to store reviews in the review store 1512 in relation to a subject matter entry or entity maintained in the subject store 1510. For a query request, the input handler 1506 may cause the query engine 1514 and response handler 1508 to process the query and respond to the user or the device via the user interface 1504. According to one embodiment, the input handler 1506 may for some requests respond to the device or the user via the communications interface 1502 or user interface 1504. Examples of this type of requests include an information submission request, new user account request, and so on. The input handler may also generate inter-component or inter-module instructions based on or in response to incoming requests or submitted information.

The response handler 1508 is provided for preparing data for delivery to the device via the communications interface 1502 and for presentation to the user via the user interface. For instance, it may cause the query engine 1514 to retrieve requested information (e.g., a list of offers for a product) as well as other relevant information (e.g., reviews for the product or each offer on the list) when it receives instructions from the input handler 1506 to process a query. After receiving the results from the query engine 1514, the response handler 1508 may select an initial or partial set of the results and present to the user via the user interface 1504 a response comprising this set. It may also include as part of the response a reference such as a URL with which the user may obtain another set of the results via the user interface 1504. In some embodiments, the user interface 1504 may cause the response handler 1508 to process this request for the other set of results without involving the input handler 1506. The response handler 1508 may then cause the query engine 1514 to retrieve the other set of results. According to other embodiments, the user interface 1504 may cause the datastore manager 1516 to retrieve the other set of results. The response handler 1508 may also interact with a proof server such as the one (1410) shown in FIG. 14 to retrieve additional information or references to additional information (such as proof records) and make them available as part of the response for delivery and presentation to the device and the user.

The subject store 1510 is provided for storing information about subject matters of interest and their related data, including but not limited to their submission and publication timestamps, authorship, submitter identification, authorship or submitter privacy settings, and so on. The information and their related data may be stored, modified, added and so forth to any storage medium. Examples of timestamp include order of occurrence in a database, date, time of day, and the like. According to one embodiment, the subject store includes at least one index for the information entries available therein.

The review store 1512 is provided for storing review information pertaining to subject matter entries maintained in or otherwise accessible via the subject store, as well as any associated metadata such as submission timestamps and submitter identities. It also maintains the association of review entries available therein with their corresponding subject matter entries. According to one embodiment, the review store 1512 includes at least one index for the information entries available therein.

The datastore manager 1516 is provided for maintaining, organizing and operating the subject store 1510 and review store 1512. Other modules or components communicate with the datastore manager 1516 for access to the subject store 1510 and review store 1512. In one embodiment, other modules or components such as the query engine 1514 may access directly the subject store 1510 and review store 1512 to obtain specific information entries or search their respective indexes. In some embodiments, the datastore manager 1516 may include an indexing component or module that indexes the information entries or records available in the subject store 1510 and review store 1512 and facilitate fast retrieval for those information entries. It may maintain and store such indexes in a separate store (not shown).

The query engine 1514 is provided for handling queries for subject matter information and related data or metadata. It may interpret or validate the queries and provide results to the queries as well as other data pertaining to the queries or results. For example, the query engine 1514 may include in its response the size of the available results and the searching time associated with a query. It may communicate with the datastore manager 1516 for access to the subject store 1510 and review store 1512 where the information entries and their related data or metadata are stored. In some embodiments, the query engine 1514 may access the subject store 1510 and review store 1512 without involving the datastore manager 1516 as an intermediary.

Although the review system 200 is described as being comprised of various components or modules (the communications interface 1502, user interface 1504, input handler 1506, response handler 1508, subject store 1510, review store 1512, query engine 1514, and datastore manager 1516), fewer or more components or modules may comprise the review system 200 and still fall within the scope of various embodiments. For example, the datastore manager 1516 may comprise the query engine 1514. The subject store 1510 may comprise the review store 1512. The input handler 1506 may comprise the user interface 1504, or the user interface 1504 may be omitted (e.g., when the device provides the full user interface capability and communicates directly with the input handler 1506). The input handler 1506 may comprise the response handler 1508. The response handler 1508 may comprise the query engine 1514 and datastore manager 1516. The user interface 1504 may comprise both the input handler 1506 and response handler 1508. And so on.

In one embodiment, the proof server 1410 shown in FIG. 14 is configured to maintain and manipulate indications or representations of proof of engagement (e.g., an image of a sales receipt) associated with review entries maintained in a database (e.g., in the review store 1512). The proof server 1410 handles requests or instructions for accepting submissions of these indications or representations, and retrieving the same. For example, the proof server 1410 may receive a retrieval request from the query engine 1514 or response handler 1506, and deliver indications of proof records (e.g., one or more indications or representations of proof of engagement) in response to the request. It may receive a proof submission request from the input handler 1506, and create and maintain the association or relationship between the proof submission and its corresponding review entry in response to the request. It may also process the proof submissions to create proof records for suitable presentation, such as removing personal information for privacy purposes.

Figure 16:
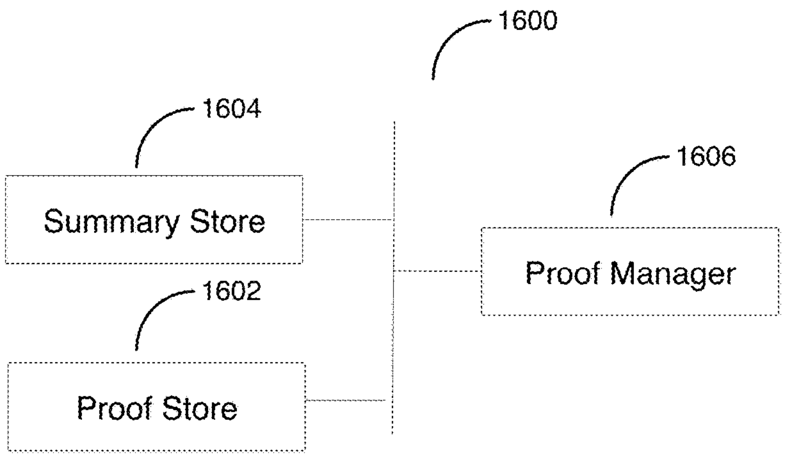
FIG. 16 illustrates a block diagram of an example proof server.

Referring to FIG. 16, a block diagram of an example proof server 1600, such as the proof server 1410 illustrated in FIG. 14, is shown. The example proof server 1600 includes a proof store 1602, a summary store 1604, and a proof manager 1606.

The proof store 1602 is provided for storing information associated with proof records, such as indications or representations of proof of engagement associated with review entries in the review store 1512. It may also store metadata associated with these proof records. In some embodiments, indications or representations of proof of engagement may be created or maintained outside of the proof store 1602, the proof server 1600 or the environment 1400. For example, a third-party database (not shown) may be used to provide for these indications (e.g., URLs, Boolean assertions) or representations (e.g., digital photos, electronic documents) of proof of engagement. Alternatively, the proof store 1602 may be located externally or remotely and accessed by the review system or the proof server over a network.

The summary store 1604 is provided for storing summary information pertaining to reviews for which there exist proof records. Examples of such summary information includes a count of votes, a set of like/dislike counts, an average score of individual ratings, and so on.

The proof manager 1606 is provided for maintaining, organizing and operating the summary store 1604 and proof store 1602. Other modules or components communicate with the proof manager 1606 for access to these stores, such as retrieving a proof record. In one embodiment, the proof manager 1606 may include an indexing component or module that indexes data available in the summary store 1604 and proof store 1602, and facilitate fast information retrieval for the data. It may maintain such indexes in their respective stores, and in another store (not shown). In some embodiments, the proof manager 1606 is operably configured to cause the query engine 1514 to search the summary store 1604 and proof store 1602.

Although the proof server 1600 is described as being comprised of various components or modules (the summary store 1604, proof store 1602, and proof manager 1606), fewer or more components or modules may comprise the review system and still fall within the scope of various embodiments. For example, the proof store 1602 may comprise the summary store 1604. Or the review system 1406 may comprise the proof server 1410 (e.g., the datastore manager 1516 may comprise the proof manager 1606 and the review store 1512 may comprise the summary store 1604 and proof store 1602).

Figure 17:
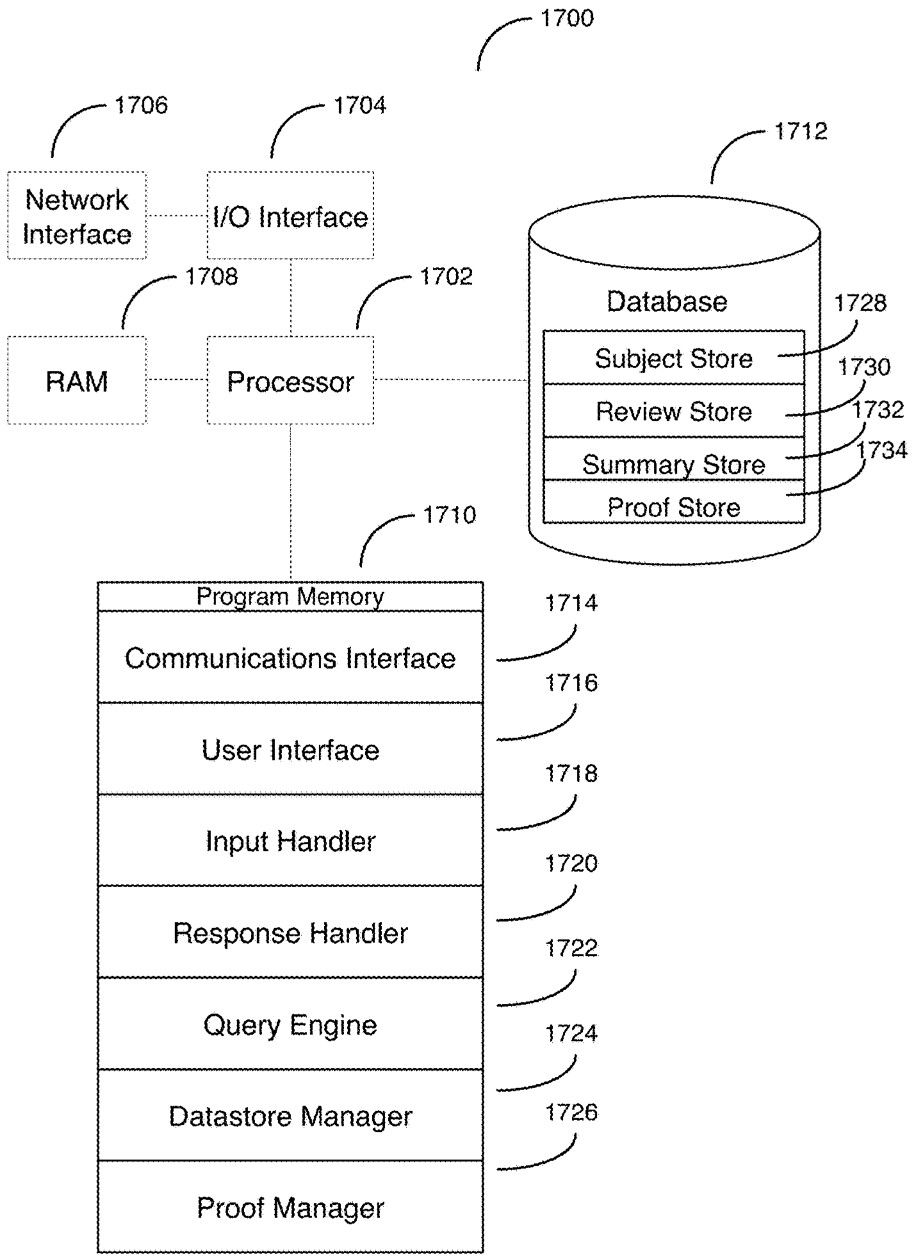
FIG. 17 illustrates a block diagram of a processor system implementing a review system comprising a proof server.

Referring to FIG. 17, a general block diagram of a processor system 1700 implementing a review system comprising a proof server, such as the example review system 200 and the example proof server 1600 illustrated in FIG. 15 and FIG. 16 respectively, is shown. Generally, in the embodiment shown, the processor system 1700 includes a processor circuit comprising a processor 1702, and an input/output (I/O) interface 1704 to which a network interface 1706 is coupled. The processor 1702 is also in communication with random access memory (RAM) 1708, program memory 1710, and database memory 1712. The processor 1702 controls the database memory 1712 under the direction of a general database manager, a specialized database manager, a combination thereof (herein referred to as a hybrid database manager), or a collection of database managers, implemented in codes stored in the program memory 1710)

that direct the processor 1702 to perform database management functions to maintain one or more databases of data records in the database memory 1712.

The term "processor system" has been used to indicate that the processor circuit shown in FIG. 17 is only one of a plurality of implementations and configurations and that, for example, the processor system 1700 may employ a plurality of processors locally or geographically distributed to effect the functions described below that are performed by the processor system 1700. The processor system 1700 may be configured to contain fewer or more components. For example, the RAM 1708 may comprise parts of or the entire database. Or the general database manager, the specialized database manager, the hybrid database manager, or the collection of database managers may include codes that direct the processor 1702 to communication with a database located remotely from the review system. The remotely located database could be a commercial database, for instance, and the review system may merely be configured to interact with such database without requiring substantial memory or detailed database management functionality at the review system. A terminal interface (not shown) may be connected to the I/O interface 1704 for direct interaction with users. Or the I/O interface may comprise the network interface 1706. The processor system 1700 may comprise a plurality of distributed processors, program memories, and databases coupled over a network. Or it may comprise a plurality of processor subsystems each capable of operating as a standalone processor system.

In one embodiment, to enable a review system (such as the one (1406) shown in FIG. 14) to collect reviews and proof records from a user and to present their indications to another user, the program memory 1710 may include the following components or modules: a communications interface 1714 (such as the one (1502) shown in FIG. 15, and being operably configured to perform its functionality as described above), a user interface 1716 (such as the one (1504) shown in FIG. 15, and being operably configured to perform its functionality as described above), an input handler 1718 (such as the one (1506) shown in FIG. 15, and being operably configured to perform its functionality as described above), a response handler 1720 (such as the one (1508) shown in FIG. 15, and being operably configured to perform its functionality as described above), a query engine 1722 (such as the one (1514) shown in FIG. 15, and being operably configured to perform its functionality as described above), a datastore manager 1724 (such as the one (1516) shown in FIG. 15, and being operably configured to perform its functionality as described above), and a proof manager 1726 (such as the one (1606) shown in FIG. 16, and being operably configured to perform its functionality as described above. The database 1712 includes the following storages or repositories of data records or entries: subject store 1728 (such as the subject store 1510 shown in FIG. 15, and being operably configured to perform its functionality as described above), review store 1730 (such as the review store 1512 shown in FIG. 15, and being operably configured to perform its functionality as described above), summary store 1732 (such as the summary store 1604 shown in FIG. 16, and being operably configured to perform its functionality as described above), and proof store 1734 (such as the proof store 1602 shown in FIG. 16, and being operably configured to perform its functionality as described above).

For instance, in one embodiment, the communications interface 1714 (e.g., HyperText Transport Protocol interface) is operably configured to direct a review system (such as the review system 1406 shown in FIG. 14) to send and receive data and messages over a network via the I/O interface 1704 (e.g., Transport Control Protocol port interface) coupled to the network interface 1706 (e.g., Internet Protocol network interface). The user interface 1716 is operably configured to cause the review system to accept requests and present responses and notifications from and to users via devices coupled to the users (such as the devices 1404*a* and 1404*b* and the users 1402*a* and 1402*b* shown in FIG. 14). The input handler 1718 is operably configured to cause the review system to process and interpret requests such as a query for subject matter information, a request for submitting reviews, and a request for viewing proof records. The response handler 1720 is operably configured to cause the review system to prepare results in response to user requests, and make them available to the users via the user interface 1716. Such results include a review summary (e.g., a score), reviews or their excerpts and indications (e.g., URLs), and proof representations or their indications in response to a query from a user. The query engine 1722 is operably configured to cause the review system to initiate a search of the subject store 1728 and review store 1730 for information entries that meets criteria set forth in user requests or requests from other components or modules. (In one embodiment, the query engine 1722 is also operably configured to cause the review system to search the summary store 1732 and proof store 1734 in accordance with criteria set forth in user requests or requests from other components or modules.) The datastore manager 1724 is operably configured to cause the review system to create and update data records in the subject store 1728 and review store 1730 for newly submitted information entries including subject matter entries (e.g., product, seller) and review entries. The proof manager 1726 is operably configured to cause the review system to create and update data records in the summary store 1732 and proof store 1734. (In one embodiment, the datastore manager 1724 may also be operably configured to cause the review system to create and update data records in the summary store 1732 and proof store 1734.)

Figure 18:
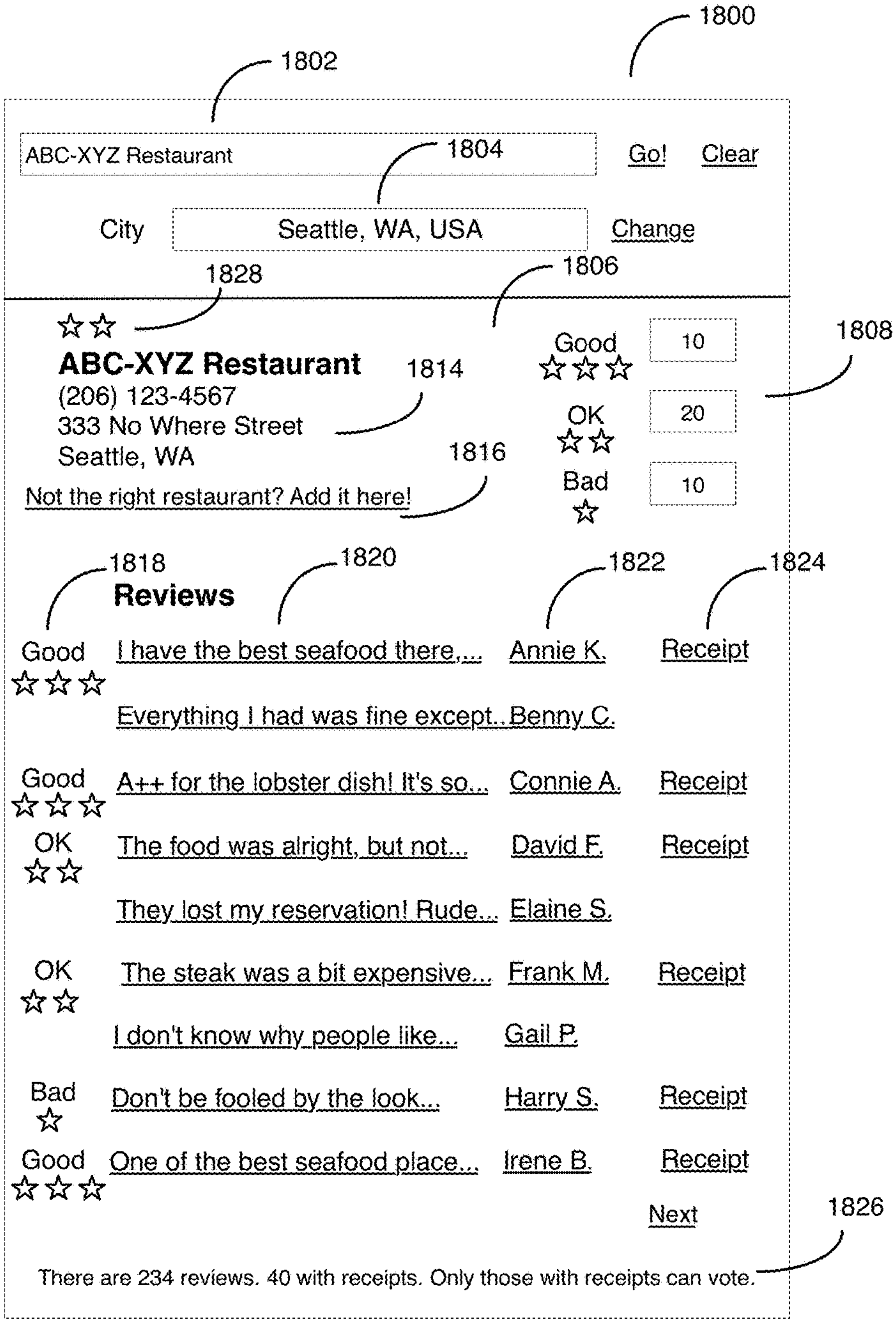
FIG. 18 illustrates an example presentation or screenshot of indications of reviews that may appear on a device coupled to a user, such as those coupled to the users as shown in FIG. 14.

FIG. 18 is an example presentation or screenshot of a user interface display 1800 that may appear on a device coupled to a user, such as the device 1404*a* coupled to the user 1402*a* shown in FIG. 14. At the top of the presentation 1800 is an input area that comprises an input field 1802 for description of subject matters (e.g., a restaurant) and a selection field 1804 for city of interest (e.g., Seattle). This selection field 1804 qualifies the geographical scope of the subject matter. Information in both fields constitutes as part of the query to be received and processed by the review system. (Any query criterion or mode of specification is within the scope of various embodiments.) Below them is query result area 1806 comprising information received from the review system. It includes the information 1814 of a matching subject matter entry (e.g., ABC-XYZ Restaurant), along with a review summary 1808 (e.g. 10 votes of good—three stars, 20 of OK—two stars, and 10 of bad—one star), an overage rating 1828 (e.g., two stars), and a list of review entries, each review entry comprising a rating 1818 (e.g., Good, corresponding to the rating of three stars), a review excerpt 1820 (e.g., "I have the best seafood there . . . "), a reviewer identity 1822 (e.g., Annie K.), and, if applicable, an indication 1824 of the availability of a proof record (e.g., Receipt). The user may select the hyperlinked review excerpt 1820, reviewer identity 1822 and the indication 1824 of proof to request further information regarding these entities respectively. The query result area also includes a hyperlinked message 1816 that indicates and enables the user to add a new subject matter entry to the review system. And the particular embodiment shown in FIG. 18 does not accept or include ratings from reviews that do not have an associated proof record, as indicated by the hint text 1826 at the bottom of the presentation.

Figure 19:
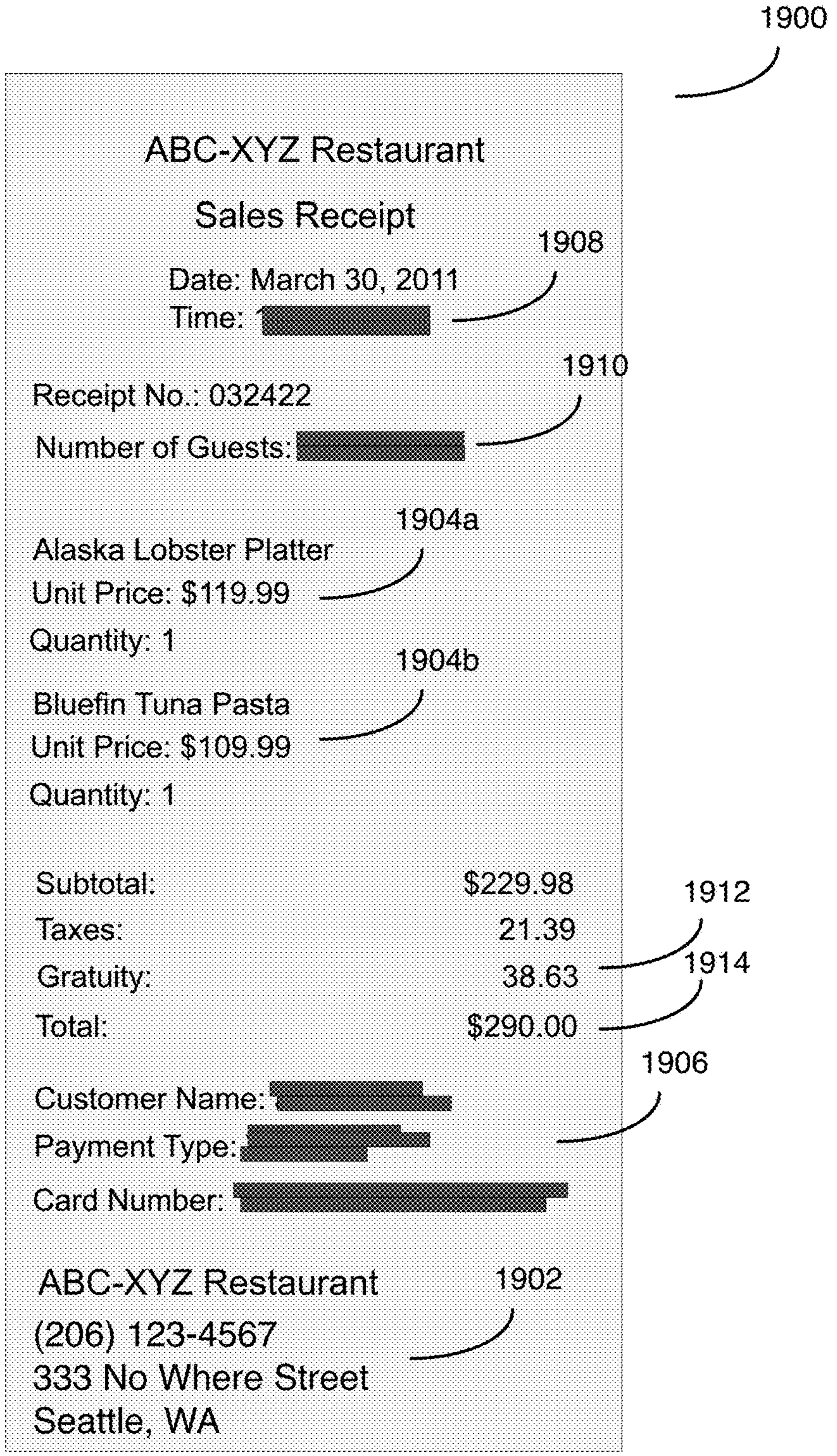
FIG. 19 illustrates an example presentation or screenshot of a proof that may appear on a device coupled to a user, such as those coupled to the users as shown in FIG. 14.

FIG. 19 is an example presentation or screenshot of a proof record 1900 that may appear on a device coupled to a user, such as the device 1404*a* coupled to the user 1402*a* shown in FIG. 14. According to one embodiment, the review system receives a sales receipt from the device, and the input handler 1718 of the review system may cause the proof manager 1726 to detect information on the submitted receipt, digitally obfuscate or make it undecipherable in creating its corresponding record, and store the record in the proof store 1734. Such detection may be performed based on recognition of key terms (such as payment, card number, customer name), or user assistance (such as coordinates or markers of areas of personal information accompanying the proof submission), or a combination thereof. A user may also submit a proof entry whose personal information has already been removed or made undecipherable. (All modes of detection and obfuscation are within the scope of various embodiments.) For instance, FIG. 19 shows the following information being obfuscated: transaction time 1908, the number of guests 1910, payment information 1906 (i.e., customer name, payment type, and card number). While the gratuity 1912 and total amounts 1914 are shown, another user may indicate to the review system that those information fields should also be obfuscated. In an embodiment, the user may choose to obfuscate information that he deems irrelevant, such as information of other items on a sales receipt. An embodiment may also detect and extract subject matter information (e.g., seller information 1902) on a proof submission and store it in the subject store 1728.

According to one embodiment, the review system may search the subject store 1728 for matching subject matters (e.g., product and/or seller) in response to proof submissions (e.g., a sales receipt). For instance, the review system may identify the seller of interest (e.g., ABC-XYZ Restaurant as in the seller information 1902) as well as the products of interest (e.g., Alaska Lobster Platter 1904*a* and Bluefin Tuna Pasta 1904*b*), and prompt the user for review information, or other information relevant to the system, such as a proof submission, a photo of the product, revisions to the seller or product information, or information for a new seller or product. The review system may also create a new subject matter entry based entirely from a proof submission, such as a retail offer comprising information available on a sales receipt, including the product information, seller information, and price information.

Figure 20:
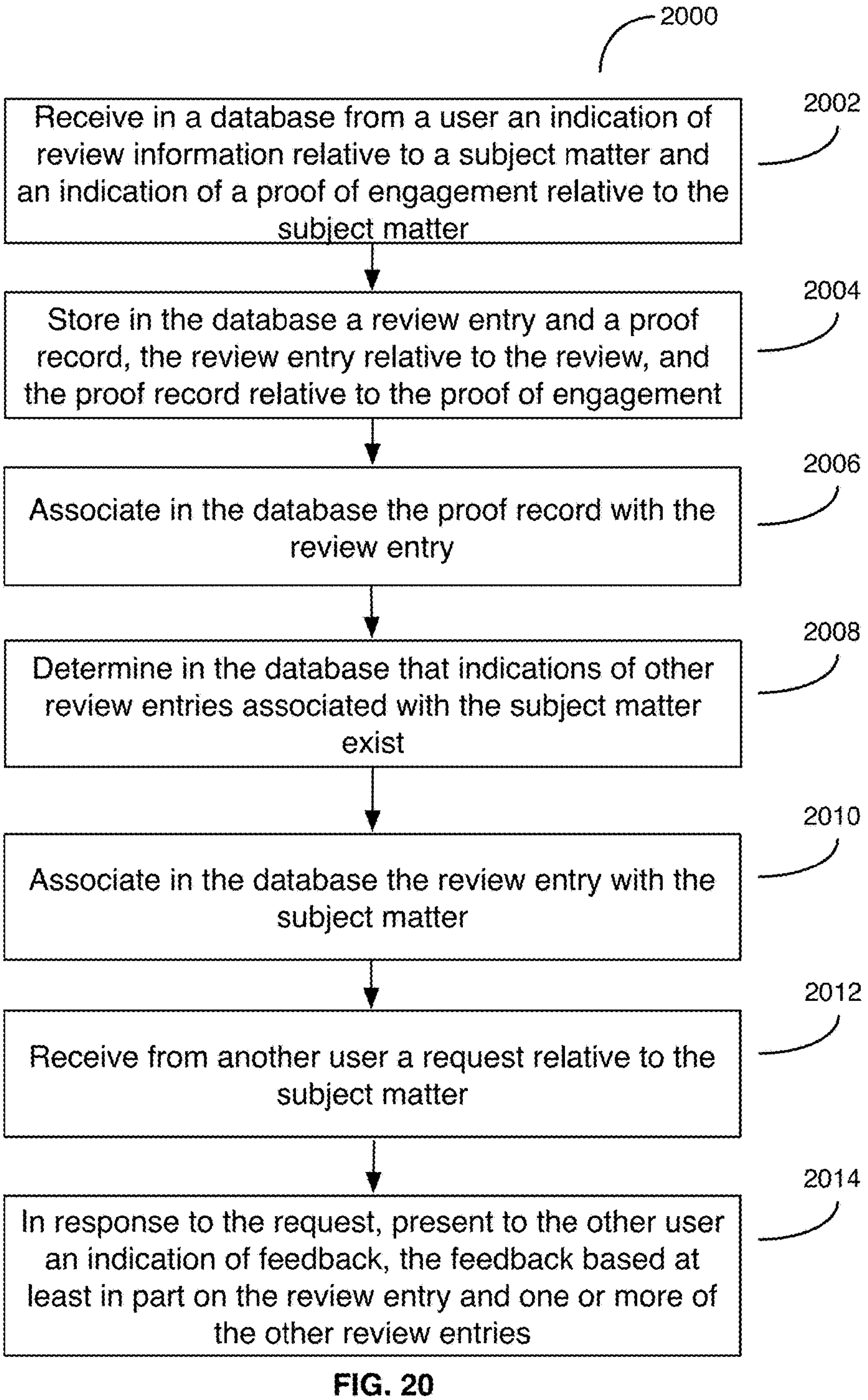
FIG. 20 illustrates a flow diagram of an example process for collecting reviews from users, such as those as shown in FIG. 14.

Referring to FIG. 20, a flow diagram of an example process 2000 for collecting and publishing reviews and proof records is provided. Per the example process 2000, an indication of review information relative to a subject matter and an indication of a proof of engagement relative to the subject matter are received in a database (2002), such as the database 1712 illustrated in FIG. 17. For example, the input handler of a review system such as the one (1718) illustrated in FIG. 17 may receive from a device, such as the one (1404*a*) shown in FIG. 14, an electronic submission of review text relative to a product that the review system has presented to the user of the device, as well as an electronic submission of a photo of a sales receipt for the product. In one embodiment, the receiving of the indication of the review and that of the indication of the proof of engagement may occur at a different time. The user of the device may also create a new entry of a product and submit it along with the review text and the sales receipt photo to the review system.

Per the example process 2000, a review entry and a proof record, the review entry relative to the review information, and the proof record relative to the proof of engagement are stored in the database (2004). For example, the input handler 1718 may cause the datastore manager 1724 of the review system to create a review entry based on the review submission, store the review entry in the review store 1730, associate the review entry with its corresponding subject matter entry in the subject store 1728 of the review system, and store this association in the review store 1730 of the review system. The input handler 1718 may also cause the proof manager 1728 of the review system to create a proof record based on the sales receipt submission, and store the record in the proof store 1734 of the review system. For example, such a proof record may be a digital representation of the sales receipt so submitted.

Per the example process 2000, the proof record is associated with the review entry in the database (2006). For instance, upon determining the time and submitter identity of the review submission and adding this information to the proof record, the proof manager 1726 may associate the proof record with its corresponding review entry in the review store 1730, and store this association in the proof store 1734.

Per the example process 2000, the existence of indications of other review entries associated with the subject matter is determined (2008). For instance, the input handler 1718 may determine if there exist in the review store 1730 (e.g., directly, or via the datastore manager 1724 or query engine 1722) review entries for the product, service, seller or event relative to the newly created review entry.

Per the example process 2000, the review entry is associated with the subject matter (2010). For instance, the input handler 1718 may cause the datastore manager 1724 to associate the review entry with the other review entries or with an indication of the subject matter (e.g., an entry or record indicating the subject matter), and maintain this association in the review store 1730. In one embodiment, such an association may be made via an entry or record relative to the subject matter, where the review entries maintain a reference to the entry or record. All modes and mechanisms of association in the database are within the various embodiments of the invention.

Per the example process 2000, a request relative to the subject matter is received from another user (2012). For instance, the input handler 1718 may receive a request from another user, the request for getting seller information for a particular product.

Per the example process 2000, in response to the request, the other user is presented with an indication of feedback, the feedback based at least in part on the review entry and one or more of the other review entries (2014). For instance, the input handler 1718 may cause the query engine 1722 to locate an entry in the subject store 1728, the entry matching the request relative to the subject matter (e.g., a particular product). The success of locating such an entry may cause the response handler 1720 to retrieve via the datastore manager 1724 relevant information in response to the request, the relevant information including review entries associated with the subject matter. In one embodiment, such relevant information includes indications of existence of proof records, whereby the other user may retrieve the proof records via these indications. In another embodiment, a summary score derived based on review entries having proof records may be provided.

It should be appreciated that the specific steps illustrated in FIG. 20 provide a particular method of collecting and disseminating review information and proof records according to an embodiment of the present invention. Other sequences of steps may also be performed according to alternative embodiments. For instance, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications and still fall within the scope of various embodiments. One of ordinary skill in the art would recognize many variations, modifications, and alternatives. For instance, in one embodiment, the step of associating in the database the review entry with the subject matter may be modified or otherwise implemented to associating in the database the review entry with other review entries for the subject matter, or with an entry or record relative to the subject matter. In another embodiment, the step of determining in the database that indications of other review entries associated with the subject matte exist may be omitted. In yet another embodiment, the feedback sent to the other user in response to his request may include only a review summary, or one review entry, even when there is more than one review entry available, for example, the entry with the latest review information or the most favorably voted entry. And the step of determining in the database that indications of other review entries associated with the subject matter exist may take place after the step of receiving from another user a request relative to the subject matter. In addition, a new step of checking if there are proof submissions or proofs referring to the same engagement instance may take place, for instance, if there is a unique code or some identification available on the proof submissions that may be utilized for such purposes. For example, a transaction code on a sales receipt which may be unique to a seller for a given period of time or to a specific transaction or a specific instance of experience with a seller, may be used to identify duplicate proof submissions or records by recording and comparing the transaction code against the seller information and transaction date information pertaining to the subject matter.

Various embodiments of how the system or process can be employed for different review system applications have been provided. It will be appreciated that the system or process can be adapted to accommodate other applications of collecting and disseminating review information.

For instance, in one embodiment, a consumer providing submissions of review information and proof of engagement may replace or otherwise update a proof record in the review system. In another embodiment, users of the review system may vote or alert on the validity of proof records. For example, they may specifically indicate if certain information on a proof record is questionable, such as price, seller, date, or receipt information for the subject matter of a specific product whose acceptable proof of engagement is a sales receipt for the product. In another embodiment, a review summary instead of or in addition to individual review entries may be provided as feedback to a user request that triggers retrieval of review information for a subject matter. The determination of such a review summary may include taking an average of the total quantifiable reviews over the number of individual contributors or instances of contribution.

In another embodiment, the review system may accept entries comprising review information with or without corresponding proof submissions, while giving more weight to reviews therein having a proof submission or proof record. In yet another embodiment, the review system may accept and retain as proof record a reference (e.g., a uniform resource locator) or a machine-readable code via which other users or the review system may ascertain as proof of engagement for the subject matter in question. For example, a sales receipt for a product, seller, or event may be maintained at a third-party system (e.g., a file repository or server of a seller or a reviewer). A reference to the sales receipt or its representation may also be made available by the review system upon request. The review system may also contact a third-party system to verify any user-submitted information pertaining to the proof of engagement, the user-submitted information being made available by the review system also to the users of the system.

In one embodiment, the review system may enable a user to input, select, or otherwise identify information regarding the subject matter that can be verified on a proof submission, such as the price of a product, or a transaction code unique to the provider of a product for that particular transaction. The information so captured may be utilized to provide machine-implemented comparisons among review entries for the subject matter in question, and enable other users to verify the truthfulness or accuracy of such information, and report any discrepancies, thereby improving the transparency or accuracy of a proof-based open reviews collection process. In another embodiment, the review system may check the accuracy or validity of user-provided information against the proof submission without manual user intervention. The review system may also perform automatic or semi-automatic (i.e., partial assistance from submitters) information extract from proof submissions for a particular subject matter.

In one embodiment, the use of paper or electronic sales receipts or invoices, or the information thereon, may enable cost saving instantly. For instance, a parking receipt may contain information identifying the parking location or venue, the specific spot or stall where the car is parked, the time of payment or dispensing, and the time of expiry or duration of paid payment. A system may receive the information from extracting it automatically from a submitted receipt, or from input performed manually by a user. The user associated with the submission of this information or receipt may then indicate to the system (e.g., sending from an application on his mobile device a message identifying the submission) that his car has left the spot or stall. In relation to receiving a request from another user, for example, to look for free parking in vicinity of the parking location or venue, the system may then send a response to a device communicatively coupled to the other user, the response indicating the parking location or venue, the specific spot or stall where the car of the earlier user was parked, and the time remaining with respect to the expiry or duration of paid parking.

As discussed earlier, a website may distinguish or otherwise identify reviews from buyers who purchased a product under review from the website, from those belonging to non-buyers. In one embodiment, these so-called non-buyers may submit to a website or system equipped with the present invention a proof record, such as a digital copy of a sales receipt for the product (or from the seller) under review, thereby providing support to their review and/or rating, even when they did not buy the product or from the seller at the website or through a platform connected to the website or system.

In one embodiment, a user may include a copy of proof record (e.g., an invoice, quote, or sales receipt) as part of the submission of his annotation entry for a retail offer from a brick-and-mortar seller or an online seller. For example, one skilled in the art may adapt the user interfaces illustrated in FIG. 2 and FIG. 7 respectively to enable a user to upload a copy of proof record in relation to an entry submission for a retail product, and the user interfaces illustrated in FIG. 10 and FIG. 13 respectively to view and review one or more copies of proof record in relation to a retail offer entry presented thereon.

In another embodiment, a system may determine summary information from a plurality of retail offer entry submissions. Such summary information may include but not limited to a price range or history for a product available at a particular seller, or a price range for a product available at known sellers in a particular city or vicinity or locality. In one embodiment, a retail offer entry used for calculation or determination of summary information would be associated with a proof record, a copy of which (e.g., a photo of a sales receipt) being retrievable, and therefore auditable, by other users upon request to the system. Other users may flag or otherwise indicate to the system if the retrieved record is inconsistent with the entry information or the summary information. For example, for five entries pertaining to a product at a seller, each comprising a price of $3.00, $3.75, $3.50, $3.50 and $3.25 respectively, the price range would be determined to be from $3.00 to $3.75, and the average price, $3.50 (e.g., for a period of time from one date to another). The system may present a user interface enabling a user to inspect a list of entries that contribute to the determination of this summary information, and to retrieve the detailed information for each entry, including the copy of proof record (e.g., a sales receipt) associated with the entry. A user may therefore check the entry information against the supporting proof record.

Embodiments of the present invention may accept a photo or digital copy of a sales receipt, invoice, quote, and the like as part of a submission for reviews, ratings, metadata, and annotation entries.

"Protocol is the Context."

Embodiments of the present invention provide systems, methods, processes, and products for establishing one or more semantic contexts for dissemination and retrieval of digital resources such as those available on the Web, including but not limited to webpages, documents, multimedia presentations, computer executables, interactive programs, and any online information or resources, partial or otherwise. For instance, they make possible context-layer, context-level or context-aware communication between communication entities such as clients and servers, information requesters and providers, information senders and receivers, and so on, and enable a plurality of communication entities to transfer, interact with or otherwise handle digital resources via context layer or context-level protocols or interfaces. A semantic context, or simply context, refers to providing a denotation or setting for interpreting information in relation to a specific intent or subject matter (e.g., advertising, reviews, news, business and finance, entertainment, politics, science and technologies, medical and health, history, books and arts, scholastic and academic). A context may be thematic and self-contained. In contrast, an attribute (e.g., a length) may be a characteristic, property or quality inherent or subordinate to something, which it serves to qualify. As such, an attribute on its own may not be capable of providing a context.

According to one embodiment, a context for an interface (or protocol) may mean a primary context whereby a digital resource deemed relevant to the context may include contextually irrelevant content or data, as long as the primary content or data is consistent with or otherwise relevant to the context. For example, a webpage of a news article including ads may be served in a news context, as long as the news article itself is not of advertising. This is similar to a specialty television channel where the primary content of interest should be consistent with the claimed specialty (e.g., history), while ads may be exhibited during program breaks, or concurrently with the program runs, e.g., at the bottom margin of the screen. According to another embodiment, a context's definition is provided in a URI-identifiable (Uniform Resource Identifier-identifiable) or publicly available document. (This could be similar to how various IETF (Internet Engineering Task Force) protocols are defined in RFC (Request for Comments) documents.)

An interface, as herein referred to, defines a programmatic, access or communication point or a set of such points at which operative or communication entities such as independent systems or diverse components may interact, entailing certain service or protocol declarations or agreements. (Entities that provide the services of an interface may be referred to as interface service providers, while those that use the services may be referred to as interface service users. An interface service provider may be regarded as a service or server while an interface service user may be regarded as a user or client to the service or server.)

For instance, the following shows some example interface definitions or declarations:

(1) get(<location>)=>< >
(2) get(<location>)=><document>
(3) get(<location>)=>[Advertising]
(4) get(<location>)=>[Advertising]<document>
(5) getAdvertising(<location>)=><document>
(6) getGarbage(<location>)=>[Advertising]
(7) getAdvertising(<location>)=>[Advertising]

The first interface "get" makes no statement about the data type or format of digital resources being retrieved, nor the context to which such resources may be related. A source of digital resources is being identified by a location such as a URL. (Such a source may refer to some repository or service hosting or capable of locating digital resources.) The second interface "get" is also context-free, but it states that target resources for retrieval is of document type, e.g., a web page or a spreadsheet. The third interface "get" is context-aware, in that it states the semantic context of target resources is of advertising. A target digital resource needs not be a document; it could be a computer executable file, for example. The fourth interface "get" is also context-aware, and it states not only that the semantic context of its target resources is of advertising, but also that they are of document type. The fifth interface "getAdvertising" is context-free, even though the name itself may suggest that its target entity is of advertising. As far as an interface declaration or specification is concerned, the name of an interface provides identification and description, but does not necessarily make any declarative or binding statement on the acceptable types, let alone contexts, of the interface's input and output. That is, if the interface returned a document not of advertising, the interface service provider did not break its service agreement. In contrast, the sixth interface "getGarbage" declares to return some digital resource of advertising. If it returned a document not of advertising, the service provider of this interface would have broken its service agreement. The seventh interface "getAdvertising" is context-aware, and it has the same interface name as the fifth interface, though the latter is context-free.

A protocol, such as a communication protocol, may be considered as a form of interface. A protocol may provide a convention whereby communicably-coupled entities could send, receive, or exchange requests, responses or data via some communication link such as a connection, channel, path, memory, or any medium across between two endpoints or across an interface, whether physical (including wireless), programmatic (including procedure call stacks), or logical (including pipes and queues). When a communication link embodies an interface, there may involve two (or more) endpoints, each of which may be considered as an interface for each side or end of the communication in question. For example, a HTTP server may use port 80 (namely, the server port) for accepting requests while a HTTP client may use available ports other than port 80 (namely, the client port) for sending requests. There may exist a communication link between a HTTP client and a HTTP server when the former sends requests to and receives responses from the latter. The client in this case may regard the client port as its interface for sending requests to the server while the server may regard the server port as its interface for receiving requests from the client.

An implementation of a protocol may include client or server functionality when the protocol involves exchange of requests and responses between two communication entities, with one assuming the role of a client while the other, the role of a server. A server-side protocol implementation may be referred to as a protocol server, while a client-side protocol implementation, a protocol client. A protocol server or client may provide services for sending and/or receiving information over a communication link to and from its peer at the other end of a communication link. It may make available these services for third-party use (e.g., an interface service user) via a service access point or service interface, for example, an application programming interface (API). An example of such third-party use includes a higher-layer protocol client or server using the services of a lower-layer protocol client or server, such as a HTTP client and server using services provided by a TCP protocol client and server respectively, or a Web browser using services provided by a HTTP protocol client. According to some embodiments, a protocol client or server may include its protocol service user. For example, a Web browser may be regarded as a HTTP protocol client communicating with a HTTP server on behalf of a human user.

Information exchanged in accordance with a protocol may include overhead information such as those for connection initiation, maintenance or control. User content, information or payload of a protocol includes data or digital resources that may be received from or delivered to an interface service user or an application. For example, a file for transfer is a payload of FTP (File Transfer Protocol), while a webpage to retrieve is user data of HTTP.

Figure 21:
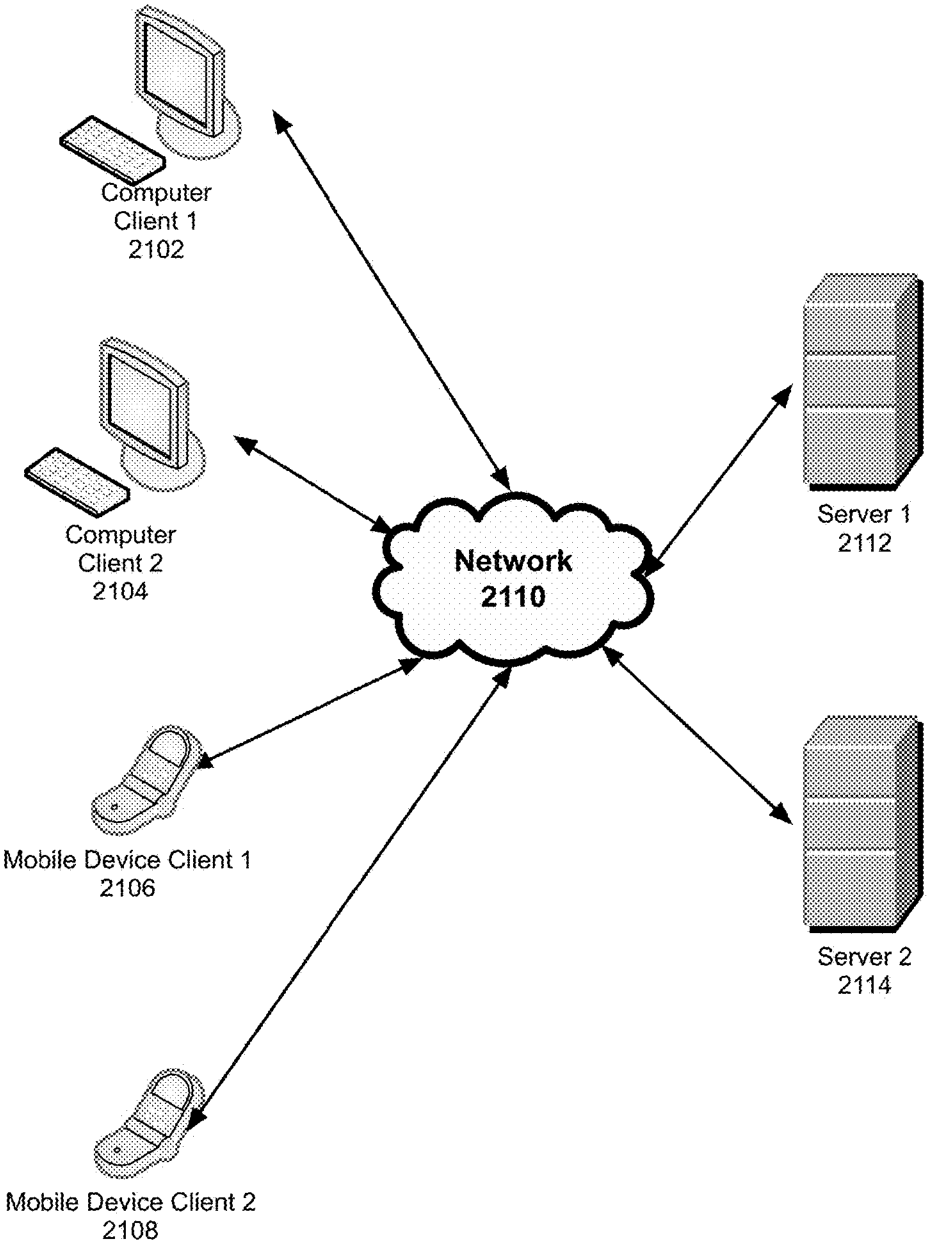
FIG. 21 shows a client-server communication in accordance with an embodiment.

FIG. 21 shows a system for retrieval of digital resources relative to some specific contexts according to an embodiment of the present invention. Portable and mobile devices and computers are example clients that may communicate with a server over a network.

The system may include one or more client computers and devices 2102-2108. A client is any general-purpose apparatus that can communicate with other computers or devices over a network and has the capability of connecting to the network 2110. In one embodiment, a client may be a portable or mobile communications device having the requisite functionality. The system may include a server 2112, 2114 such as a database server or a Web server. The server may be any general-purpose computer capable of storage, such as hosting a database or file system, and of communication with multiple clients over a network. The network may be an intranet, the Internet, the World Wide Web (i.e., the Web), or any other network, either closed or open, that includes one or more devices or applications that are communicating over the network. Clients and the server may communicate using a wired or wireless medium. A client may include a web browser when the server is a Web server. In addition, a client may also include an application resident in its memory (not shown) that may provide a user interface through which the client may receive input, instructions or directives from a user. In some embodiments, the user interface may reside as an extension to a software application and may be integrated into a web browser resident of client. In some other embodiments, a client and a server may be embedded into a single apparatus and communicate with each other. A server may also receive requests, responses or some other transmissions from another server. A server that sends a request or response to another server without prior solicitation from the latter is often referred to as a proxy server or a proxy. A client may also receive responses or some other transmissions from a server without specific corresponding requests, usually upon some prior authorization or setup. This is often referred to as notifications or events.

Figure 22:
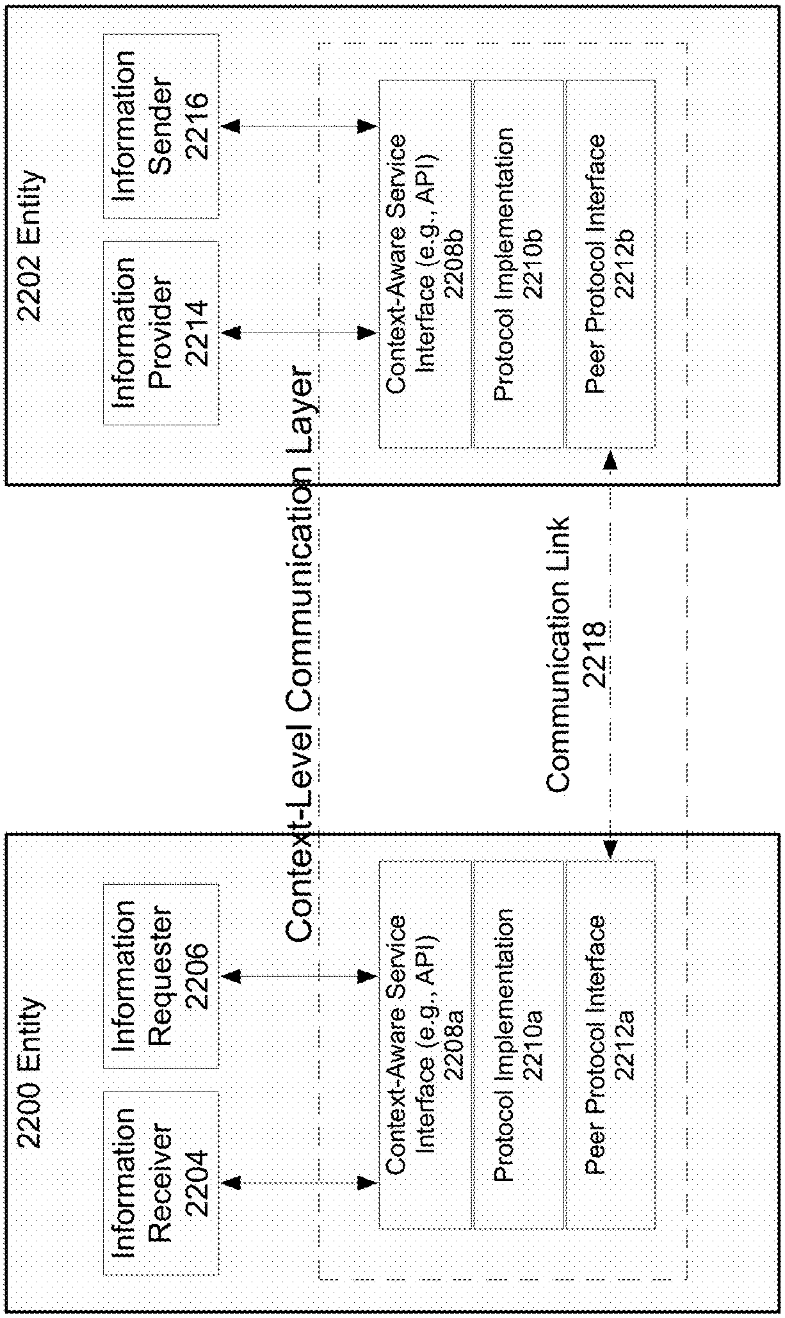
FIG. 22 shows a context-level communication layer in accordance with an embodiment.

FIG. 22 shows two communication entities, such as those embedded in or otherwise embodied by the clients and servers shown in FIG. 21, communicating via a context-level communication layer according to one embodiment. Each entity 2200-2202 comprises three components, which may be realized in software and/or hardware. A context-aware service interface 2208*a*-2208*b* or service access point component enables an information receiver 2204 (or requester 2206) and information sender 2216 (or provider 2214) to access and use services provided by a protocol implementation to receive and deliver context-denoted payload (such as data or digital resources). A protocol implementation component 2210*a*-2210*b* (e.g., a protocol client or server) may realize a specific protocol in accordance to some rules, specifications or roles. It may use services provided by other entities, such as those available from other communication layers. The layer that uses the services of another layer but not the other way around is often regarded as a higher layer in relation to the latter. A peer protocol interface 2212*a*-*b* (e.g., a TCP/IP stack) provides an endpoint for a communication link (e.g., a network socket) with another entity capable of communication via the same or compatible protocol. Below the protocol interface, a communication link can establish a connection via a physical link or a wireless channel. A communication link 2218 may also be encapsulated into or otherwise established upon another communication link to achieve its functions or utilities. For example, a payload of a higher-layer communication link may be encapsulated into or otherwise carried by a payload of a lower-layer communication link for delivery, e.g., the transfer of encoded data from one geographical location to another via a physical communication link (i.e., the lower layer) may be performed before the data may be decoded by a recipient application (i.e., the higher layer).

For non-physical communication links, there may be addressable identifiers (IDs) for identifying peer protocol interfaces or endpoints. For example, MAC (Media Access Control) addresses provide an addressable ID for interfacing with Ethernet and Token Ring network devices or adapters, which may be regarded as being capable of layer-2 communication as defined in the OSI Reference Model. IP (Internet Protocol) addresses provide an addressable ID for computers and devices communicable via the Internet or Web. Internet Protocol may be regarded as a layer-3 protocol in accordance to the OSI Reference Model. TCP (Transmission Control Protocol) port numbers provide a 16-bit addressable ID for one of the virtual interfaces that a TCP/IP-capable device may provide for interfacing with its applications and services therein. In accordance to the OSI Reference Model, TCP may be regarded as a layer-4 protocol that uses services provided by a lower-layer protocol, e.g., Internet Protocol, which in turn may also use services by a lower-layer protocol, e.g., Ethernet. Communication entities peer to one another would use addressable IDs suitable to their layer of communication to identify the specific interfaces of interest.

Addressable IDs may be independent or relative to addressable IDs at dependent or otherwise lower layers of communication. For example, IP addresses (OSI layer 3) may be regarded as independent from MAC addresses (OSI layer 2), even the former might map to the latter for effecting actual transmission of data from one computer or host to another. TCP or UDP port numbers (OSI layer 4) would require a layer-3 address (e.g., IP addresses) to identify a specific interface or endpoint for peer-level communication. For example, an endpoint of a bi-directional inter-process communication such as an IP socket may have an address comprising the address of the host where the process resides and that of an endpoint at the host. For instance, an IP socket address may comprise an IP address and a port number. In contrast, an IP address or MAC address on its own would suffice in this respect.

Peer interfaces or endpoints of some protocols, especially at the higher layers, may include or otherwise involve a reference to a digital resource (e.g., a user account, a software program, a file, a webpage), which may also be independent or relative to addressable IDs of some lower-layer protocols. Such inclusion or involvement may depend on specific connections, operations or payload that a protocol in question may support. For example, Telnet, an Application Layer or Layer 7 protocol according to the OSI Reference Model, may require or otherwise accept a user account for connection, when there are multiple user accounts available for Telnet connections. FTP and HTTP (both also of OSI layer 7) may accept a file path or URL (Uniform Resource Locator) to identify for retrieval, for example, a software program, folder, file or webpage. Such references to digital resources themselves may be regarded as interface or endpoint IDs in relation to these digital resources, especially when these resources may provide services or interactivity, such as a user account having specific access and operation privileges, or a webpage comprising hyperlinks, videos or spreadsheets.

In contrast to those at OSI layer 4 or below, protocol implementations of higher layers may use OSI layer 4 interfaces or endpoints to identify point of entries or access points for peer communication. For example, TCP port 80, an OSI layer-4 addressable interface ID, is designated as a well-known port for HTTP (i.e., layer-7) servers or services. While any available and unoccupied TCP port may be used by a HTTP server or service as the server or service's interface or endpoint for communication, port 80 is the official addressable interface for a computer, server or host to provide HTTP services. For example, the Web at large comprises a myriad of HTTP service providers accepting requests at port 80.

According to one embodiment, an OSI layer-4 addressable ID, such as a TCP or UDP port, may be assigned to or otherwise associated with a protocol implementation whose peer communication is relative to one or more contexts. According to another embodiment, a peer communication relative to a context (e.g., advertising) may be established in a layer higher than the Application layer of either the OSI Model or the TCP/IP Model, and references to digital resources of interest in relation to this communication may include URIs (Uniform Resource Identifiers), which comprise URNs (Uniform Resource Names) and URLs. For instance, a protocol implementation for a context-level layer of communication may listen to a TCP/IP or TCP/UDP port for accepting context-level requests for digital resources. According to yet another embodiment, a context's definition as well as the association between an endpoint and the context is provided in a URI-identifiable or publicly available document, such a standard or specification published or maintained by an organization or corporation.

In contrast, TCP or UPC ports like port 13 (associated with a so-called “daytime” protocol), port 17 (“quote of the day” protocol), port 43 (WHOIS protocol), ports 350 and 351 (for mapping of Airline Traffic over IP), and port 666 (for DOOM, an online game) provide an interface for obtaining data pertaining to debugging and measurement purposes (e.g., via a sequence of characters, including time information or an arbitrary message), to a particular system operation (e.g., an online game or air traffic system), or to a proprietary, centrally managed, or application-specific database (e.g., domain holder information), and not to a defined context with which information or digital resources having the same, equivalent or compatible context may be published, requested, or retrieved in accordance with the context.

For example, port 13 (for both TCP and UDP) provides a service to output a current date and time as a character string without regard to the corresponding input (e.g., whatever reference to a digital resource present in the request would be ignored). Port 17 provides a service to output an arbitrary short message, also without regard to the corresponding input. Although the name of the protocol associated with port 17 is called Quote of the Day protocol, the standard or definition of this protocol does not require sending of any actual notable quote, but simply a short message (without regard to the input). Hence a service implementing the protocol may send an arbitrary text (instead of any notable quote) without violating the standard governing or otherwise defining the protocol. In fact, the purpose of ports 13 and 17 is for testing and measurement. That is, any data (including any references to digital resources) received by their protocol servers or services implementing these protocols are ignored or discarded, and a sequence of characters expressing a date or a short message would be sent as response to their protocol clients or service users for the purpose of network testing and measurement, rather than anything useful in a given context. In addition, these testing and measurement ports are often disabled by default in a server or host for security concerns.

Ports 350 and 351 (both TCP and UDP) as well as 666 (UDP only) provide an interface for accepting requests for operation of a particular system, namely an airline traffic system and an online game system respectively. Port 43 (TCP only) provides a service to obtain registration information about an Internet domain (i.e., the WHOIS service).

Usually only domain registrars would provide such a service. Domain names are managed under an administrative hierarchy headed by the Internet Assigned Numbers Authority (IANA), and only relevant to the operation, administration and maintenance of Domain Name System (DNS), a hierarchical naming system for computers, services, or resources connected to an IP-based network, including the Web.

According to one embodiment, a TCP port may be used for publishing or receiving requests for online ads using HTTP as an underlying context-ignorant transport protocol. Such publications and requests may be accomplished without any central administration or authoritative control, just like how digital resources such as webpages may be published and requested via HTTP over TCP port 80. According to another embodiment, an endpoint for communication of layer lower than the Transport layer may be assigned with or otherwise declared for a context, such as an IP address (i.e., the Network layer).

Figure 23A:
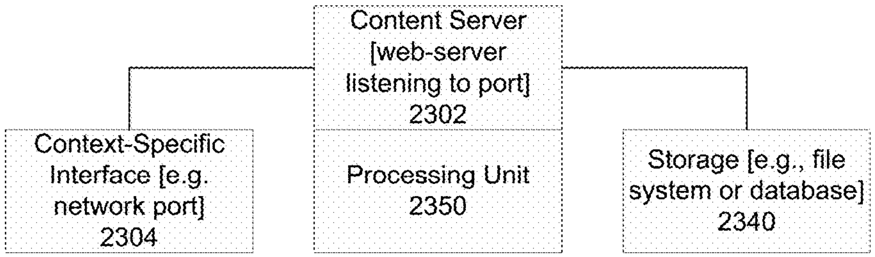
FIGS. 23A, 23B, and 23C show a number of systems capable of handling context-level requests in accordance with some embodiments.
Figure 23B:
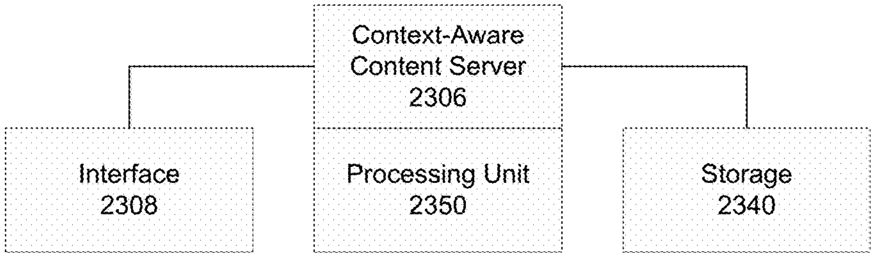
Figure 23C:
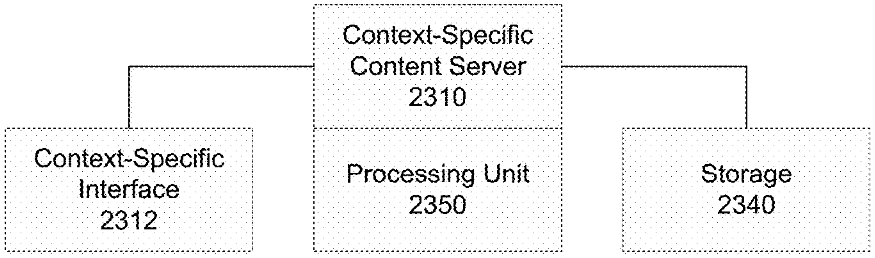

FIGS. 23A to 23C show three example systems capable of contextualizing digital resources in response to a request. Each example system comprises a processing unit 2350 (e.g., a processor coupled with an operating system), a storage device 2340 (e.g., a file system, a database), an interface (e.g., an endpoint capable of establishing or otherwise facilitating a communication link with one or more clients, the endpoint including both hardware and software necessary for such connection, virtual or otherwise, such as a network port), and a content server (e.g., a service having a protocol stack that may process requests and send responses including digital resources maintained in the storage, the protocol stack being a particular software implementation of a computer networking protocol suite or a collection of protocols for communication via the interface). According to one embodiment, a content server includes a plurality of protocol servers, the plurality of protocol servers having at least one protocol server capable of establishing or supporting a context-level communication layer, such as the one shown in FIG. 22.

FIG. 23A shows a system according to one embodiment, where there exists an interface 2304 which may be context-specific. For example, a TCP/IP port or IANA-maintained port may be designated for scholastic and academic content or for advertising of goods and services. As such, user-level or payload-related requests, responses, and messages sent to this interface or port are considered to be relative or in relation to the context.

Other types of requests, responses, messages, or data such as those for transmission control and protocol operation may also go through the interface or port, and yet they need not be considered as having bearing on any context. For example, between a Web browser and a Web server 2302 participating in context-level communication, a HTTP request for a webpage and a corresponding response including the webpage may be considered as a user-level data or payload-level request and response in relation to a given context. On the other hand, context-ignorant protocol data in support of a context-level protocol (e.g., those of TCP) may also go utilize the same port. A context-level Web server may also send context-irrelevant responses to its clients (e.g., for server capability queries or service timeout). According to one embodiment, only user data or payload requests and responses may be relative to a given context for context-level communication or in a context layer of communication. According to another embodiment, a context-specific interface may be defined as providing digital resources primarily for advertising of goods and services via HTTP, for example, through TCP/IP port 98 or 2040, which may be in contrast to port 80 the official or well-known port of the Web's context-ignorant HTTP interface. According to one embodiment, instead of the context-specific interface that receives requests for digital resources, another interface, which may or may not be context-specific, can be responsible for delivering those digital resources. According to another embodiment, an entire website (e.g., as identified by a domain name or IP address) may be regarded as a digital resource. Such a digital resource may provide other digital resources (e.g., web pages, videos, interactive programs). A computer or system hosting the website that listens on a context-specific network port, or otherwise serves via a context-specific interface, may contextualize the website as a whole. Depending on the definition or scope of a subject matter context, the website associated with the subject matter context may include contents not associated with the subject matter context per se. For example, a website associated with a shopping context may include webpages containing investor and management information, legal statements about the terms of use of the website, application programming interface (API) specifications for accessing services or contents of the website, and so on. According to one embodiment, a subject matter context of a website or a collection of web resources pertaining to a website indicates the overall nature of the website or the collection of digital resources pertaining to the website. An individual digital resource of the website needs not be consistent with the subject matter context in question.

FIG. 23B shows a system according to one embodiment, where there exists a content server 2306 which may be context-aware. For example, the content server may determine from protocol data, message metadata, or payload whether the transmission in question may be context-specific or what context it may belong to. According to one embodiment, a content server may be responsible for handling requests received via an otherwise context-ignorant interface 2308 (e.g., port 80 for HTTP), in addition to context-specific requests received via the same interface. As such, the content server may service HTTP requests just like a typical HTTP server would, except that the former may also handle context-specific requests and responses. For example, a context-specific protocol may also use port 80 as its contact or well-known port. A context-aware content server would service context-level messages, while still being able to recognize and process messages for the other and context-ignorant protocol sharing the same port, i.e., HTTP on port 80. Such a context-level protocol may or may not be a superset of this other protocol. A superset protocol often provides an extension to its constituent protocols wherein data for such an extension would be transparent to constituent protocol servers or handlers if they receive transmissions relative to the superset protocol. According to one embodiment, a context-aware protocol server needs not be able to handle messages of an otherwise context-ignorant protocol. According to another embodiment, a context-aware protocol server may determine or decide whether a message is context-specific via data or metadata carried in an otherwise context-ignorant or context-neutral protocol. For example, context indication, declaration or data may be specified as optional parameters in a URI, protocol data or payload metadata, and that their presence would not interfere with the operation of the context-ignorant or context-neutral protocol in question (e.g., HTTP). According to yet another embodiment, a context-aware protocol may handle requests or messages for more than one context. A digital resource may also be relevant to more than one context. For example, an online ad for airline tickets may be relevant to both travel and shopping contexts that may otherwise, according to one embodiment, be unrelated to one another.

FIG. 23C shows a system according to one embodiment, where there exists an interface a content server 2310 which may both be context-specific. For example, an interface 2312 of port 98 or 2040 may be assigned to the context of advertising of goods and services, while the content server responsible for that port is only capable of receiving and generating requests and responses whose digital resources of interest are provided in or otherwise primarily related to the advertising context.

Embodiments of the present invention may also provide asynchronous retrieval or receipt of digital resources via context-level protocols and interfaces. According to one embodiment, a system such as one shown in FIG. 23A to FIG. 23C may be configured or otherwise adapted to receive digital resources via a context-level protocol and/or interface. For example, a content receiver along with an interface, processing unit, and storage may receive digital resources via a contextualized endpoint. A content receiver may also implement or otherwise include a context-level protocol client capable of identifying incoming context-level messages or payload, similar to the manner or scheme in which a context-level protocol server may identify context-level requests or digital resources. According to one embodiment, a prior registration or configuration may be set up (e.g., establishing or installing authorization code, logon credential, secret token) so that the content receiver may perform authentication against the receipt or delivery of unsolicited or asynchronous receipt of digital resources.

Figure 24:
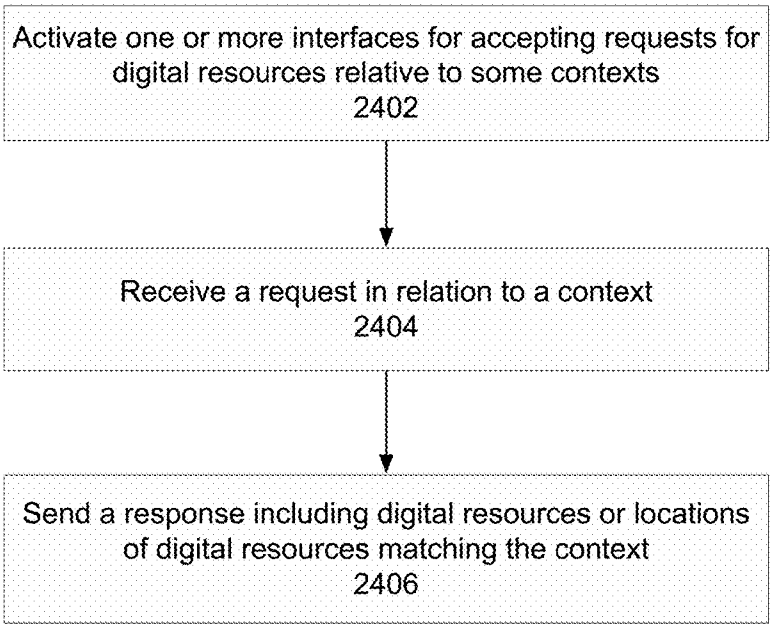
FIG. 24 shows a computerized method in accordance with an embodiment.

FIG. 24 is a high-level flow diagram for a computerized method that may be executed by a functional entity, such as a context-level protocol server, or a system such as one of those shown in FIG. 23A to FIG. 23C, according to one embodiment. Those of skill in the art will understand that various steps in the method (and in other methods described herein) may be added or combined without deviating from the spirit and purview of the embodiment. The high-level flow diagram is not limiting on any claims. As shown in FIG. 24, a system may:

(a) activate one or more interfaces for accepting a request for one or more digital resources, the one or more digital resources having relation to one or more contexts 2402;

(b) receive the request in relation to a context 2404; and (c) send a response including a collection of the one or more digital resources or a collection of locations of the one or more digital resources, wherein the collection has relation to the context 2406.

The one or more digital resources may include digital resources identifiable by URI or accessible by HTTP or FTP. The request may include the URI. The activating may include assigning the one or more contexts to the one or more interfaces. The one or more interfaces may include one or more communication endpoints, the one or more communication endpoints including a TCP port or UDP port. In addition, the receiving may include receiving from a client while the sending may include sending to the client. The one or more contexts may include Advertising, Reviews, News, Science and Technologies, Medical and Health, History, Books and Arts, Scholastic and Academic. Each pair of the one or more contexts and the one or more interfaces may be associated with a URI-identifiable or publicly available standard or specification defining the context in each pair.

Figure 25:
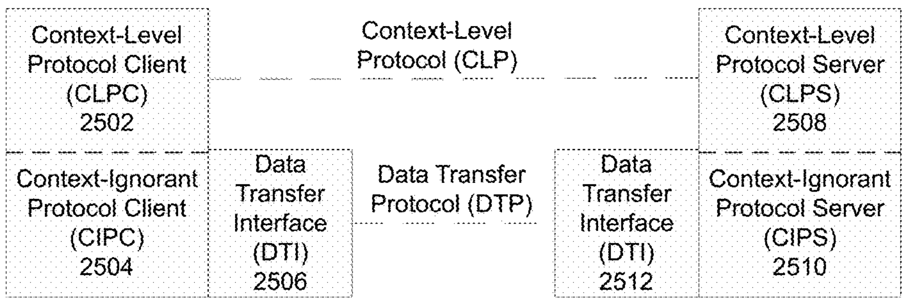
FIG. 25 shows multi-layer communication between a client and server via a context-level protocol, in accordance with an embodiment.

FIG. 25 shows a client and server capable of context-level communication, according to one embodiment. The client comprises three components: a context-level protocol client (CLPC) 2502, a context-ignorant protocol client (CIPC) 2504, and a data transfer interface (DTI) 2506. The server comprises a context-level protocol server (CLPS) 2508, a context-ignorant protocol server (CIPS) 2510, and a data transfer interface (DTI) 2512. A protocol whose purpose is to transfer data from one endpoint to another without regard to any context is herein referred to as a data transfer protocol (DTP). A protocol intended or used for communication or connection (virtual or otherwise) at a context layer or level is referred to as a context-level protocol (CLP).

Examples of DTP are TCP/IP and HTTP, where HTTP uses the services of TCP/IP. As such, HTTP is usually regarded as a higher level or layer protocol than TCP/IP. (HTTP is an application layer protocol while TCP/IP, a transport layer one, according to OSI Reference Model.) Examples of CIPS are protocol servers for TCP/IP and HTTP respectively, while examples of CIPC are protocol clients for TCP/IP and HTTP respectively. A CLPC or CLPS may rely on or otherwise use one or more DTPs explicitly for data delivery across two endpoints over a communication link. A protocol client or server may use services from some lower layer or level protocols without explicit knowledge or exposure. For example, a HTTP protocol server may use TCP services (Layer 3) that may in turn rely on Ethernet services (Layer 2) without the HTTP protocol server being aware of the latter. A context-level protocol server may use HTTP services without the context-level protocol server being aware of TCP services on which the HTTP services may rely.

A DTI may be context-specific or context-ignorant. For example, the status-quo well-known port 80 for HTTP may be regarded as context-ignorant, whereas the example of port 98 or 2040 having assigned the context of advertising (as described herein) may be regarded as context-specific. On the other hand, an interface may also simultaneously be context-ignorant with respect to one protocol or protocol server, while being assigned with one or more specific contexts with respect to a context-level protocol or protocol server. For instance, port 80 of HTTP may also be designated for use with a context-level protocol or communication link, with which a protocol server may accept, distinguish, and serve all requests arriving at that port, or otherwise direct the two different types of requests (i.e., context-level vs. context-ignorant) to their respective dedicated servers or handlers. A protocol server may also embed or otherwise comprise a plurality of individual protocol servers or handlers that may otherwise be distinctive from one another. In addition, a CLPS or CLPC may incorporate the functionality of a CIPS or CIPC instead of relying on services of an otherwise distinctive CIPS or CIPC for data transfer, the latter case being illustrated in FIG. 25.

Figure 26:
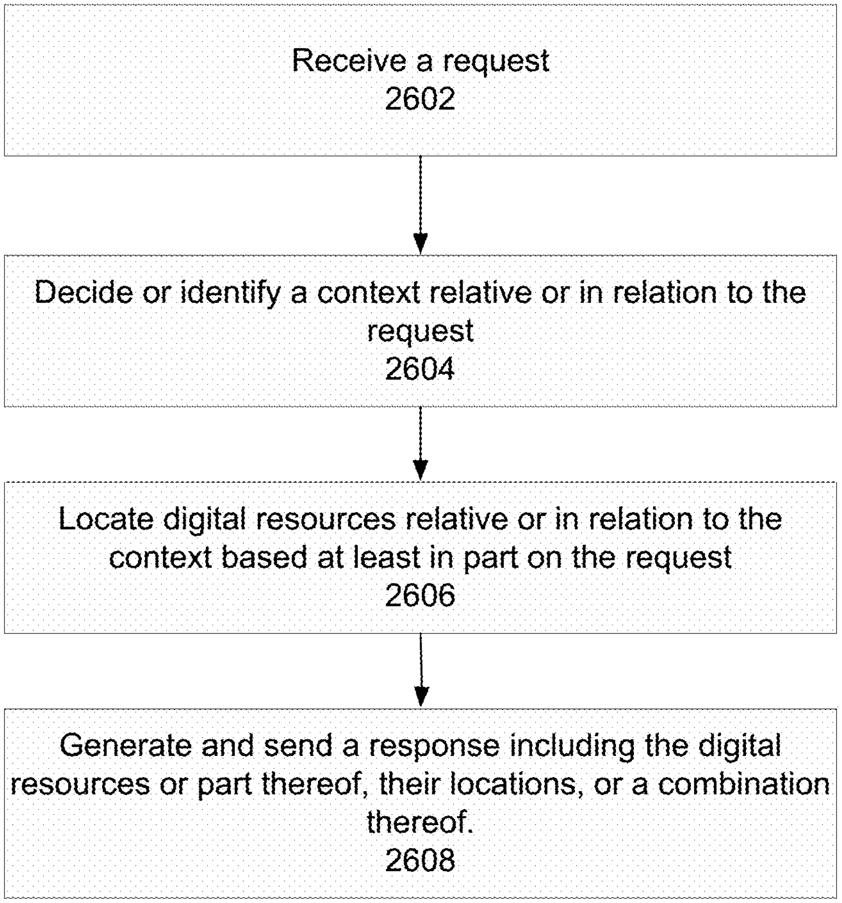
FIG. 26 shows another computerized method in accordance with an embodiment.

FIG. 26 is a high-level flow diagram for a computerized method that may be executed by a server, a communication entity or a content server, such as those shown in FIG. 21, FIG. 23A-23C and FIG. 25, according to some embodiments. Those of skill in the art will understand that various steps in the method (and in other methods described herein) may be added or combined without deviating from the spirit and purview of the embodiment. The high-level flow diagram is not limiting on any claims. As shown in FIG. 26, a server may:

(a) receive a request, wherein the receiving includes receiving from a client 2602;

(b) decide or identify a context relative or in relation to the request 2604;

(c) locate one or more digital resources relative or in relation to the context based at least in part on the request 2606; and (d) generate and send a response comprising the one or more digital resources or part thereof, their locations, or a combination thereof, wherein the sending includes sending to a client 2608.

In addition, the server may relate an interface to one or more contexts, wherein the interface may include a communication endpoint. It may receive the request via the interface, wherein the request may include a reference to digital resources, the reference including a URI. It may then locate digital resources via the reference. Furthermore, the server may determine if the reference refers to the one or more contexts, wherein the determining includes looking up a table having entries each comprising one or more criteria for matching one or more references, and a corresponding context. The server may identify dialogue questions in the request if the reference refers to the one or more contexts, generate dialogue answers for the dialogue questions, and include the dialogue answers in the response. (Dialog questions and answers would be described later.) Moreover, the server may identify the context in the reference, locate dialogue questions in the reference, and determine dialogue answers based at least in part on the one or more digital resources.

Figure 27:
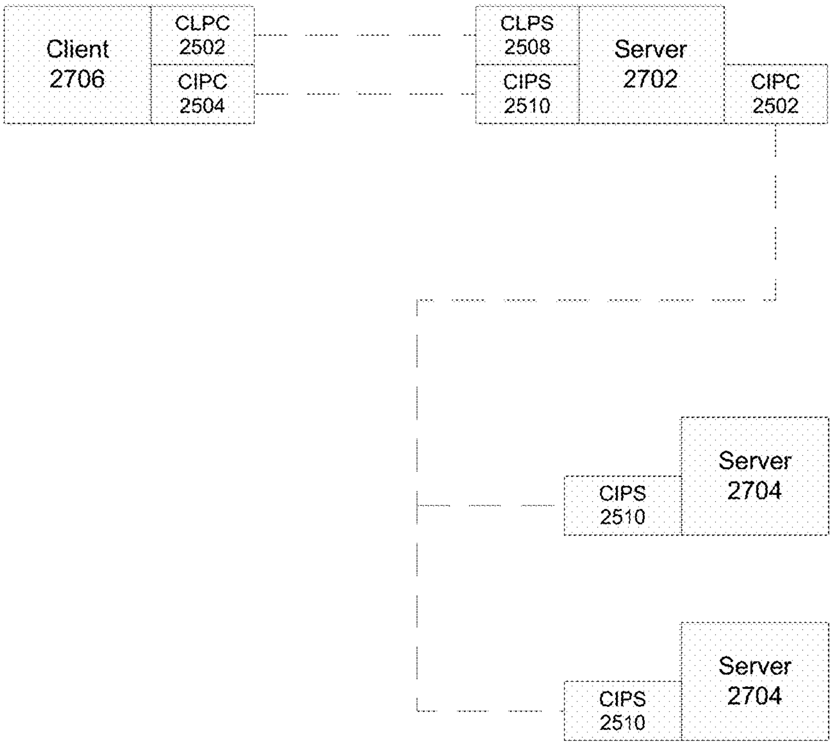
FIG. 27 shows a server acting as proxy for context-level communication in accordance with an embodiment.

FIG. 27 shows a scenario where a server 2702 embodying or otherwise equipped with a CLPS and DTI (no DTIs shown in FIG. 27; see FIG. 25) may serve as a proxy to another server 2704 that is otherwise context-ignorant, according to one embodiment. A client 2706 may send a server a context-level request (e.g., a request via a context-level protocol). The server may in turn request digital resources from one or more servers that are otherwise context-ignorant, and return them via a context-level protocol (e.g., a response including context-specific digital resources), thereby contextualizing these digital resources. For instance, such a proxy or a server having the capability of a proxy may contain information, e.g., via a directory, lookup table or database, that may help map a context-level request to applicable digital resources. For example, such a request may refer to an URL of a digital resource. Upon receiving the request, a proxy or proxy server may try to locate the URL from its database of URLs having the context that the request may correspond to or otherwise implicate. If the lookup is successful, then the proxy may retrieve the corresponding digital resource from another server having only CIPSs, and then forward it to the client of the request, both the server and client participating in a context-level connection or communication via their respective CLPS and CLPC. Alternatively, among other possible options, the proxy may reply the client with a location of the digital resource so that the client may directly fetch or otherwise receive the digital resource in question from a server hosting that resource.

Figure 28:
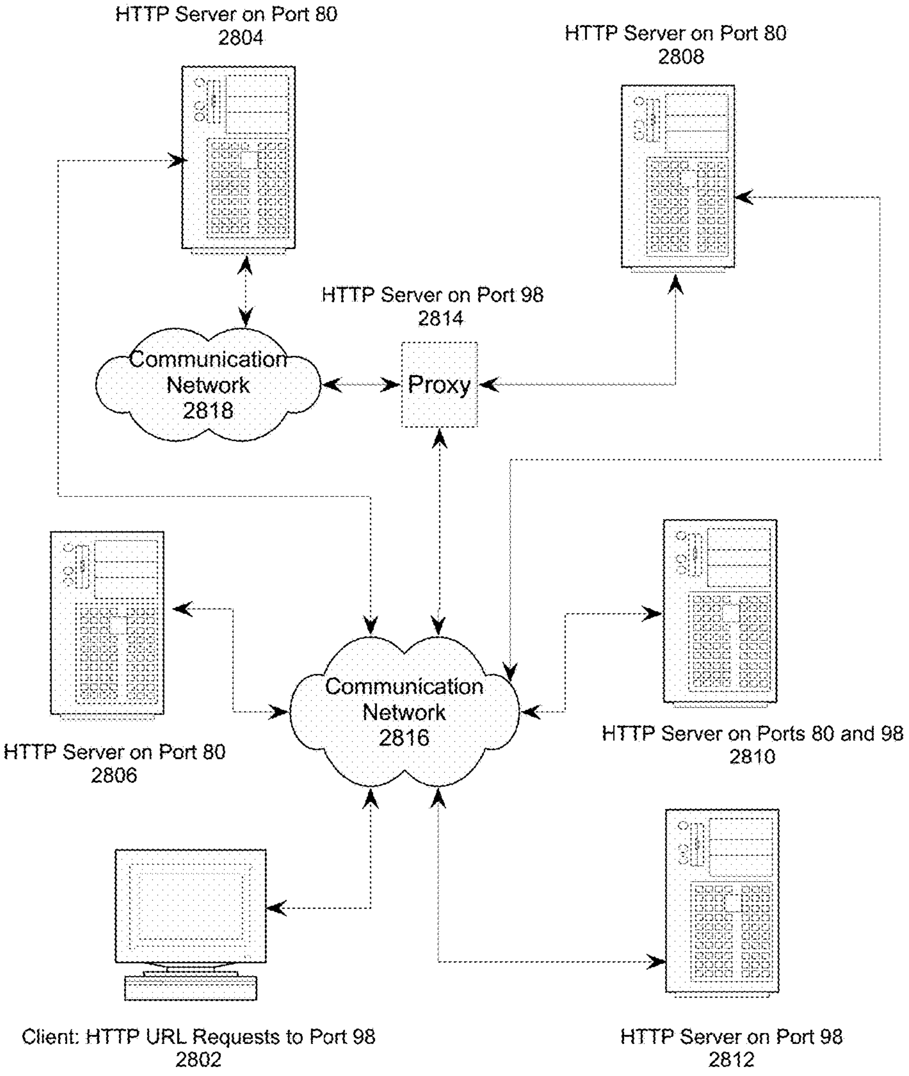
FIG. 28 shows a proxy and a plurality of servers involved in context-level communication in accordance with an embodiment.

According to another embodiment, a context-level proxy or proxy server may provide contextualization of digital resources via interfaces, such as a communication endpoint or a TCP/IP port, the contextualization including denoting requests for digital resources via a specific endpoint or interface as requests for resources about advertising of goods and services. For instance, FIG. 28 shows a client (e.g., a computer), a proxy server (or simply proxy), and a plurality of HTTP servers and communication networks (wireless or otherwise), according to one embodiment. Here port 98 is used as a context-denoted port. As such, HTTP traffic destined or otherwise addressed to the port would carry context-level payload, information or resources of interest consistent or congruent to the context associated with the port. For example, if the context is of shopping, then webpages whose primary concern is politics should not be requested or received through port 98. In contrast, the official HTTP port 80 makes no such contextual denotation or declaration, and cannot impose or demand any contextual integrity. According to embodiments of the invention, a declaration of a subject matter context (such as Shopping) of an interface, a network port, or a TCP/UDP port number is published in a publicly accessible resource or document. According to another embodiment, such a declaration is published in a standard or specification, such as one defined, maintained, or overseen by the Internet Assigned Numbers Authority (IANA), the Internet Engineering Task Force (IETF), or a private company.

Figure 30:
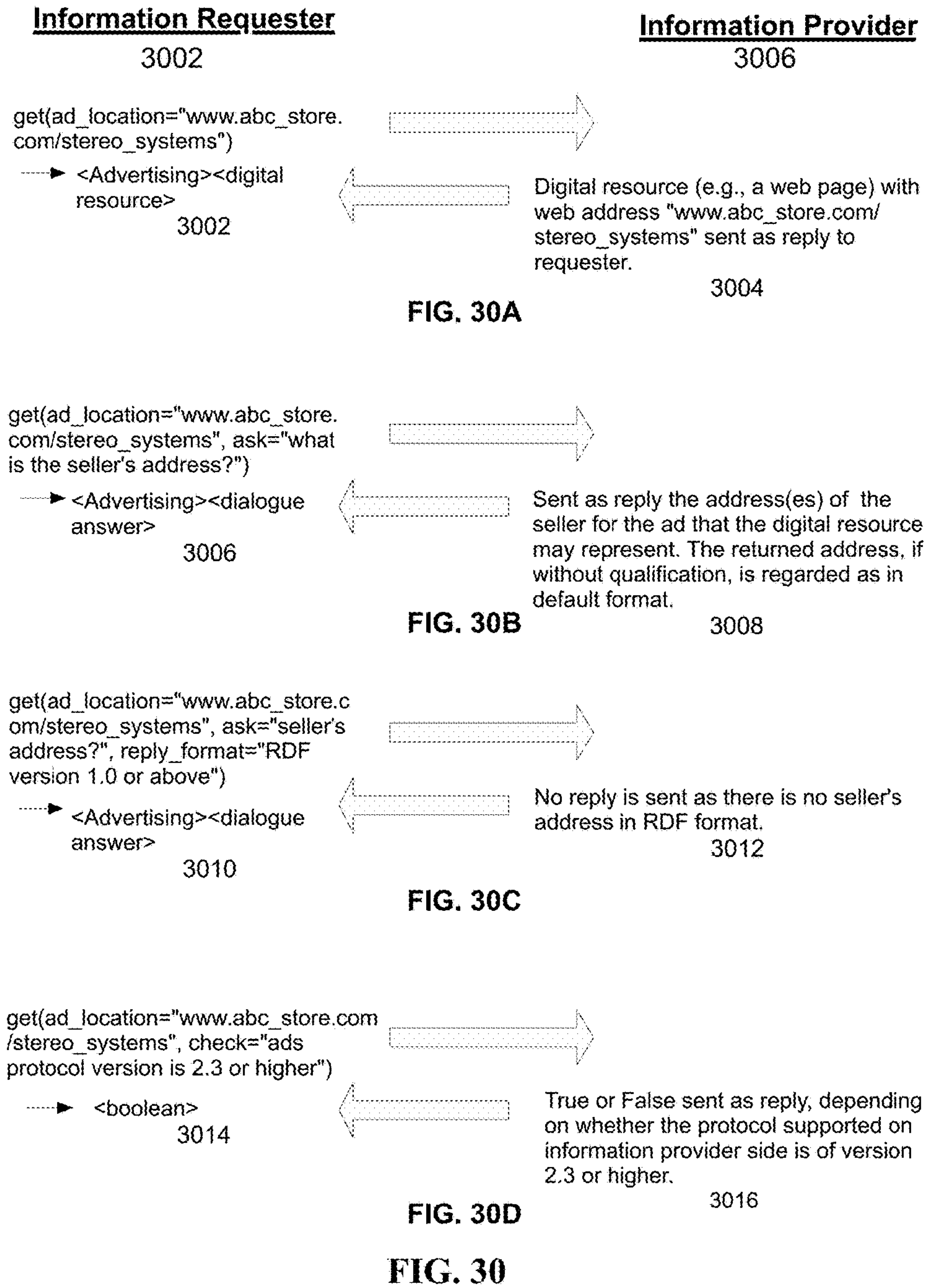
FIGS. 30A, 30B, 30C, and 30D show a number of context-level requests and responses between an information requester and provider in accordance with an embodiment.

In FIG. 30, the client 2802 is set up to send HTTP URL requests to port 98 over a communication network 2816. HTTP servers 2804-2808 listening only on Port 80 (namely, the official HTTP port) may not be reachable by requests from the client. While unavailability of these otherwise operational information servers might be regarded as a problem at the data communication level or for dissemination of digital resources via HTTP, it may be an advantage at the context level or for dissemination of context-denoted digital resources. This is so because the client by targeting port 98 indicates that it is interested in information or resources (such as a webpage) for a specific context. For example, a search engine crawling and indexing webpages obtained from port 98 would generate and maintain indexes comprising, maintaining or otherwise referring to context-denoted webpages. As such, the results from such a search engine would be much more contextually certain than those from a general-purpose search engine of port 80. As such, both information requesters and providers sharing the same context would be able to more reliably receive and publish digital resources of their interests by utilizing a context-denoted interface for communication between their respective clients and servers.

There are two HTTP servers connected to a proxy 2814 shown in FIG. 28. One is connected directly to the proxy while the other through a communication network 2818. Although these two servers are listening to or otherwise serving port 80, the context of some or all webpages provided by them may be denoted or otherwise made certain by the proxy that may handle context-level HTTP requests on their behalf (e.g., HTTP requests sent to port 98). For instance, the proxy may intercept or otherwise receive HTTP requests sent from the client. It would process the requests, e.g., parsing the URL in the requests for information on a host or server and its port (e.g., port 98), as well as a path identifying a webpage or digital resource. (A HTTP request of port 80 could bypass the proxy and go directly to the intended HTTP server, as illustrated in FIG. 28.) According to one embodiment, all digital resources of a server registered with or otherwise reachable by the proxy (e.g., via port 80) may be retrieved by context-level requests sent to the proxy (e.g., via port 98), thereby contextualizing all such digital resources. According to another embodiment, only a subset of digital resources of such a registered or reachable server may be contextualized. For example, a lookup table or rules such as URL pattern matching, either maintained by the server or its proxy, may further distinguish digital resources of a specific context from those without or otherwise with an incompatible one. According to one embodiment, the proxy may retrieve digital resources from a server, and then forward them to the client sending the request in question. Alternatively, among other possible options, the proxy may reply the client with a location of the digital resources so that the client may directly fetch or otherwise receive them from the server.

FIG. 28 also shows a HTTP server listening on both ports 80 and 98. Such a server may be able to serve in both the context-ignorant Web (i.e., port 80) of the status quo and an alternative context-aware Web made possible by context-level interfaces. According to one embodiment, currently unassigned TCP/IP ports may be adopted or otherwise chosen as official or default context-level ports so to create one or more context-aware Webs or information channels, which may be placed under different jurisdictions, whether administrative, technical or otherwise. Such a Web or channel demands or otherwise declares an information space relative or congruent to one or more contexts. According to one embodiment, context-ignorant protocols such as HTTP and FTP as well as clients, servers and services available for the status quo Web may be re-used or otherwise applicable to these individual context-aware or channelized Webs. For instance, a single server may participate in both types of Webs, e.g., by serving both port 80 and 98 as illustrated in FIG. 28.

When there is more than one context for a given information space, the contexts may or may not be compatible with one another. For example, the context of wars and military and the context of shopping might be regarded as incompatible or otherwise mutually independent. Yet a Web or Web channel may be associated with both contexts, thereby regarding digital resources about wars and military or those about shopping as contextually relevant. On the other hand, a composite context may also be supported, so that a digital resource contextually relevant to it would also be contextually relevant to its constituent contexts. For example, an online ad for a video disc whose content is about a certain war may be regarded as relevant to the composite context of wars and military, and shopping. In addition, a context may comprise one or more sub-contexts, as will be discussed later.

FIG. 29A to 29D together illustrate how a protocol in embodiments of the present invention may establish an advertising context for user information or payload that may otherwise be context free. FIG. 29A shows an information requester 2902 asks 2908 for some information 2904 from an information provider 2906 via a context-free protocol. The information provider returns the requested information 921, void of context 2910. FIG. 29B shows an information requester asking for a specific piece of information 2920 of a specific name and on a specific location, also via a context-free protocol. The information provider returns the requested information, also void of context 2922.

FIG. 29C, similar to FIG. 29A, shows an information requester asks for some information 2930, except this time it is via a context-specific or context-making protocol 2934, e.g., for advertising. Although the information provider may have behaved the same as in FIG. 29A, the returned information 2932 is construed to be of advertising nature 2936, whereas in the scenario depicted in FIG. 29A there is no such revelation. The difference that exists between the two scenarios depicted respectively in FIG. 29A and FIG. 29C may be only the use of advertising-context protocol or interface over the use of context-free protocol or interface. In both cases, the information requester and provider may have performed the same actions. Yet the advertising-context protocol may provide preliminary meaning (i.e., context) to the information being requested and returned.

In FIG. 29D, both an information requester and provider may benefit from the semantic implication of using a context-aware protocol or interface on user information or payload in question 2940. Transfer of digital resources via a context-aware protocol or interface may provide an unambiguous context denotation that would otherwise be unavailable or difficult to ascertain. An information provider might find a piece of information of the same name and location as specified and requested by an information requester, but if it is not of the requested, expected or specified context, the information provider shall deem that there is no such relevant information 2942. Subsequently the information provider would not reply to the requester with that piece of information even it exists on the location as specified, as demonstrated in FIG. 29-D.

According to one embodiment, a context-aware protocol may handle more than one context, and a default context may be established or otherwise implied if no context is explicitly specified. According to another embodiment, a context-aware protocol may support or otherwise handle context-ignorant or context-neutral payload, in addition to context-denoted one.

According to yet another embodiment, having a context established or otherwise declared for a communication link or endpoint, a protocol may provide capabilities to inquire about a digital resource in relation to the context. A client of such a protocol may obtain responses from a server hosting or otherwise providing the digital resource or a location of the digital resource, or from the digital resource itself (e.g., a running computer executable referenced by a URI or URL). Exchange of context-level inquires and responses about a digital resource between a requester and a provider may herein be referred to as dialogue. A context-level inquiry and response may also be herein referred to as a dialogue inquiry and a dialogue response respectively. A dialogue inquiry may comprise one or more questions (namely, dialogue questions), while a dialogue response may comprise one or more answers (namely, dialogue answers). A dialogue inquiry requester or dialogue inquirer may send via an advertising context protocol an inquiry comprising dialogue questions as well as other requests, such as a request for the possible formats of seller addresses, or a request for seller addresses in a specific format. Likewise, a dialogue response provider or a dialogue responder may send a response comprising dialogue answers as well as other results, such as those corresponding to requests not at the context level.

According to one embodiment, an advertising-context protocol may provide services for inquiry of information about a product or service that a digital resource may represent or otherwise have data for, such as its detailed specification or after-sales warranty information, the seller's address and rating information, and shipping and handling costs for a specific location of a prospective customer. According to one embodiment, a digital resource may represent or otherwise has data for more than one product or service. Questions or inquiries may be specific to a certain type of products or services. For example, a question "What is the product's 'best before' date?" may be applicable only for perishable goods.

A context-level protocol or protocol client may interpret or otherwise process dialogue answers for its own operation or on behalf of an information requester, or simply pass them back as the protocol's user information or payload for processing and manipulation by a protocol service user (e.g., an application such as a Web browser) or a higher-level or layer protocol implementation, whether a human, a piece of hardware, a software program, or so on.

A dialogue question or answer may specify a framework or format that information in an answer or response would adhere to. For example, a freeform answer may comprise a piece of structure-free content such that there may be no structure within the content of the answer for guided parsing and interpretation, although the content as a whole is still associated with a context relevant to a given question. For example, the answer to the question “Seller's Address” in freeform could be “1213 First Avenue, Vancouver, Wash., USA 91021”. A structured answer, such as that of AVP (Attribute-Value Pair), may be:

Street=“1213 First Avenue”
City=“Vancouver”
State=“Washington”
Country=“USA”
ZipCode=“91021”

An attribute may be associated with a definition of meaning while a value with a definition or format. For instance, a structured answer, such as that based on RDF (Resource Description Framework of the Semantic Web Initiative by W3C—the World Wide Web Consortium), could provide much more precise definitions to street, city, state, etc. so that there should be no semantic ambiguity of what each piece of data means in accordance to some semantic definitions specified elsewhere. There may be other possible frameworks or formats suitable for use in the specification of dialogue answers or responses.

According to one embodiment, a context-level protocol may allow a dialogue inquirer to specify preferences for formats or frameworks in which answers shall be provided. It is up to whether a dialogue responder may fulfill such preferences. A context-level protocol may allow a dialogue inquirer to stipulate that certain dictionaries be used to provide for term definitions of an answer that should follow a given framework or format.

For example, a plurality of dialogue questions may be specified for a given context. Digital resources relevant to the context may result in dialogue answers to these questions. With advertising or shopping context, possible dialogue questions may include “What is the product name?,” “What is the product specification?” and “What are the customer satisfaction ratings of the seller according to Rating Agency X and Rating Agency Y?”. A dialogue inquirer such as a search engine or crawler may post, send or otherwise search dialogue questions to or against digital resources via a context-aware protocol. Digital resources or protocol servers found ignorant of these questions may result in the digital resources in question deemed contextually irrelevant. Those found capable of containing or handling dialogue questions may result in the digital resources in question deemed contextually relevant. Specific answers to those dialogue questions would afford a search engine or service to provide context-specific results with better relevancy or precision, such as when serving a query in relation to a particular product from a seller of a particular location with a specific customer satisfaction rating.

According to one embodiment, dialogue answers may be embedded in a digital resource to which they may be applicable, or be maintained and served as metadata to the digital resource. They may be identified by their corresponding dialogue questions, which may be specified by computer-readable codes or human-readable text. A context-level protocol may locate dialogue answers therein and deliver them to dialogue inquirers as if sent or otherwise provided by a dialogue responder. For example, a search engine or service equipped with an embodiment of the present invention may be able to identify and include digital resources such as webpages that are relevant to a certain context of interest, such as advertising or review of products and services, and exclude irrelevant ones, so to create and maintain a context-specific search index or service. According to another embodiment, a dialogue question (or a dialogue answer identifier or referrer) may be specified or otherwise identified as a markup tag (such as those on a HTML-authored page) and the corresponding dialogue answer may be specified as data to the markup tag. Such a dialogue question and/or answer may be hidden from visual presentation of the digital resource in or to which it may be specified or otherwise belong. Or it may be included as part of the visual presentation, with the tag optionally being indicative of some stylistic implication (such as boldfacing the dialogue answer) or associated with some other data (such as a hyperlink).

FIG. 30A to FIG. 30D provide an illustration of interactions between an information requester and an information provider through a protocol in embodiments of the present invention, and how they act as dialogue inquirer and dialogue responder respectively.

FIG. 30A shows that an information requester specifies a digital resource for retrieval 3002. The digital resource is referred to by a web address (e.g., www.abc_store.com/stereo systems). An information provider replies 3004 with the requested advertising digital resource. (Note that many may consider a web address is equivalent to a URL (Uniform Resource Locator), which includes an access scheme or protocol part, e.g., the “http://” or “http” in http://www.abc_store.com/stereo_ systems. The term “web address” as used herein does not necessarily include an access scheme or protocol part.)

FIG. 30B shows an information requester asking 3006 for addresses of the seller associated with a particular advertising digital resource. An information provider capable of such dialogue may reply 3008 with the requested addresses. If there is no specified reply format, then the addresses are deemed to be in a default format, e.g., in freeform.

FIG. 30C shows an information requester asking 3010 for seller addresses associated with a particular advertising digital resource, and demanding the reply in a specific format. An information provider replies 3012 none, even though the digital resource may exist and the information provider is capable of such dialogue, because none of the available addresses is in the requested format.

FIG. 30D shows an information requester asking 3014 for information not of advertising nature. The requester asks whether the protocol supported by an information provider is of version 2.3 or higher. Some designation (such as “check” as shown in FIG. 30D) that appears in a protocol request may indicate that the requested information is not of advertising nature. The corresponding API for this request may explicitly state that the user information in response to this request is not a context-level payload of the protocol. For example, the API for FIG. 30D indicates the reply 3016 would be of a Boolean data, i.e., either true or false, and not of any specific context, namely advertising.

Note that a digital resource may represent a single product or service, and may act as dialogue responder. In addition, an information requester or dialogue inquirer may not need to specify a reference to the digital resource as part of a dialogue question if it has already addressed or otherwise identified the digital resource as part of the communication link between the information requester and provider or between the dialogue inquirer and responder.

Figure 31:
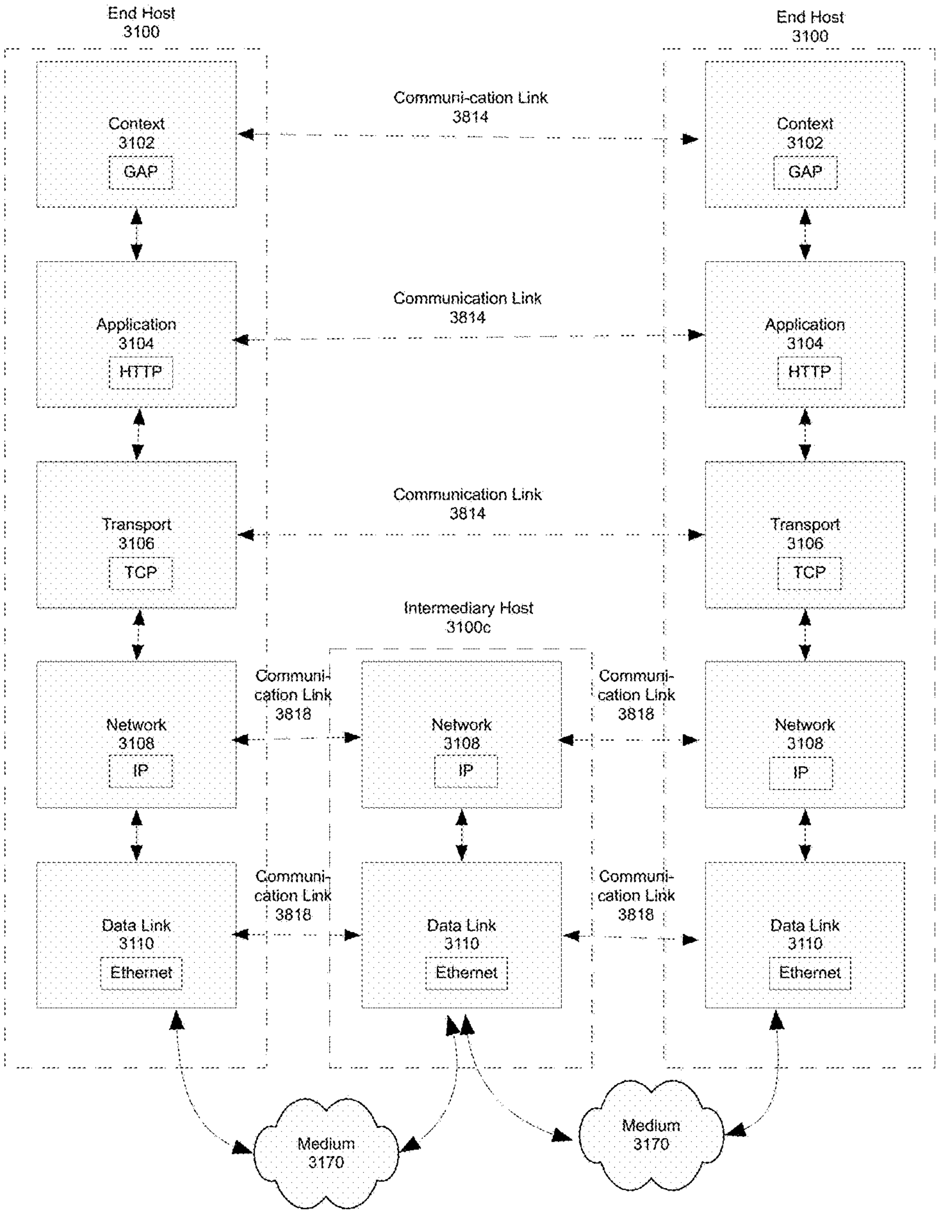
FIG. 31 shows a layered communication model including a context layer in accordance with an embodiment.

FIG. 31 shows an ARPANET (Advanced Research Projects Agency Network) TCP/IP Reference Model (or simply TCP/IP Model) equipped with the present invention, according to one embodiment, as implemented in end host 3100. The reference model comprises five layers of communication. A protocol is given as an example for each layer: Ethernet for Data Link Layer 3110 (which, as depicted, may communicate via communication link 3818 or medium 3170), IP (Internet Protocol) for Network Layer 3108, TCP (Transmission Control Protocol) for Transport Layer 3106, HTTP for Application Layer 3104, and GAP (Global Advertising Protocol) for Context Layer 3102. GAP is a context-level protocol for advertising of goods and services. An intermediary host 3100*c* may comprise a network layer 3108 and a data link layer 3110. Multiple protocols may exist for the same, compatible or similar context, and may assume different names, such as Shop or Ad. According to one embodiment, a context-level protocol may be published in a standard or specification, such as one defined, described, or maintained by the Internet Engineering Task Force (IETF) or a private company.

As illustrated in FIG. 31, GAP uses services provided by HTTP (Hyper-Text Transfer Protocol), a common-place communication protocol for use on the Web. Other protocols at lower layers may also be used by GAP, such as HTTPS, an extension of HTTP to include security functionality. Note that some define the Web as a complete set of hypertext documents available on the Internet that are accessible through HTTP. However, since protocols such as FTP are also supported by web browsers using the same URL (Uniform Resource Locator) syntax to retrieve digital resources or online entities, accessibility through HTTP may be considered by some to be an insufficient defining characteristic of the Web.

The basic syntax of an address in form of URL (Uniform Resource Locator) for locating a HTTP-accessible resource on the Web is as follows:

http://<authority>[/<path>][/<object>][?<query>], where:

A part is represented by a token with a pair of enclosing angular brackets, such as <authority> for an authority part. Parts delimited by a pair of square brackets mean optional. <authority> may be optional too if the HTTP request is for a local host. URL also supports a fragment part that is not shown in this basic syntax above.

The term <authority> refers to a resource-serving host, and comprises an optional <userinfo> in the form of <username>:<password> terminated with "@" (e.g., johndoe: mypassword@), a hostname in the form of a domain name or an internet protocol address (e.g., www.example_forsales.com or 134.12.13.23), and an optional port number (with default port 80) preceded by ":".

The term <path> is a sequence of subdirectory-like abstract containers separated and delimited by "I" (e.g., cars/honda). When <path> is absent, the logical root of the resource repository on the host may be considered.

The term <object> is a location-invariant handle that identifies on a host a specific local object or digital resource, which usually takes the form of a file (e.g., index or index.html), but not necessarily so. When <object> is absent, a default object (e.g., index.html), if any, in the identified logical location of the resources repository would be considered.

The term <query> is a series of name-value pairs in the form of <name>=<value>, separated and delimited by "&" (e.g., clientName=John&gender=Male). They are not used as any special queries specific to HTTP itself. An application that uses HTTP queries may specify name-value pairs that are meaningful only to information requesters and providers involved in the HTTP communication.

The following is an example address (e.g., URL) for a HTTP-accessible resource:

http://john:passwd@www.uspto.com:80/patents/index?clientId=1010

A more common syntax seen by web users would be:

http://www.uspto.com/patents/index?clientId=1010

A HTTP information requester (namely, an information requester using HTTP) such as a web browser or some other software capable of HTTP can get a URL from many sources, such as user input, web pages, a plain-text file, and a database. The requester would then formulate a HTTP request message based on the selected URL, and send it away via HTTP. The implementation of the underlying transport protocol (i.e., TCP—Transmission Control Protocol) of HTTP would be responsible for the delivery of the request message to its counterpart at the host specified in the URL. When an information provider on the destination host receives the request through HTTP, it or its agent would interpret the request, and return the requested resource if the resource exists on the host, regardless of the context that the resource may belong to. GAP (Global Advertising Protocol) information provider, on the other hand, should not return the requested resource (namely, a target digital resource or digital resource) even if the named resource exists on the host, when the context of the resource is not of advertising. That is, HTTP is a context-free protocol in relation to GAP, whose target entities or user-level payloads are of advertising nature. An example URL of GAP is as follows:

gap://www.example_cars_for_sales.com/honda/

In this example, whether a GAP information requester should receive the referenced resource depends not only on its existence on the referenced host location (i.e., www.example_cars_for_sales.com/honda/), but also the context of the referenced resource. A GAP information provider will reply with the requested resource only if the resource is of advertising nature. In the other words, HTTP will retrieve the resource, but GAP will not do so should the requested resource is not of advertising. (According to one embodiment, the context information of a digital resource may be maintained as metadata stored in the digital resource. According to another embodiment, it may be stored in a lookup table or index external to the digital resource.) However, a GAP information provider can "lie," in that it returns resources of non-advertising nature to a GAP information requester. GAP protocol users (i.e., both GAP information providers and requesters) that do so behave like a software component that does not act in accordance to its interface specification in a distributed software system, or like a licensed specialty television channel for shopping that broadcasts history shows as its regular programming. Such GAP information providers shall be regarded as malfunctioning or violating a protocol's interface service agreements.

To realize an implementation of GAP, a HTTP interface (including its URL) and implementation may be modified as per following specification. Likewise, to realize a GAP information provider and requester, a HTTP information provider and requester may also be modified accordingly.

First, the protocol or access scheme part of URL is "gap" (which stands for Global Advertising Protocol). Then two optional parts, namely <options> and <inquiry>, are added as follows between <object> and <query> in the URL syntax, as shown below:

gap://<authority>[/<path>][/<object>][*<options>][|<inquiry>][?<query>]

Note that both the asterisk and vertical-bar characters would then become special characters, or characters reserved for the use by the protocol for special meanings. The <options> part, with an asterisk character "*" as a marker prefix and delimiter, provides alternatives to the default behavior or mode of operation of the protocol. (Multiple options may be separated by "&".) Exemplary alternatives are described in the following paragraphs.

The part context=<on or off: this allows the retrieval of resources not of advertising nature. E.g.: "gap://www.example_onlinestore.com/nikeShoes/history*context=off". (This may be optional for questions in <inquiry> if those questions are already unambiguous in their context relevance in relation to the target digital resource in question. For example, a question like "what is the protocol's version?" is self-evident in its context irrelevancy.)

A part entityFormat=<format>: this specifies the expected format(s) of the requested digital resource. Examples of possible formats are dontCare (the default), freeform, markup, nvp (name-value pair), and rdf (Resource Definition Framework). Multiple formats specified in <options> are possible. E.g.:

gap://www.example_onlinestore.com/nikeShoes/catalog*entityFormat=freeform&entityFormat=nvp A part answerFormat=<format>: this specifies the expected format of answers to the inquiry in the protocol request. Possible formats are the same as those of the entityFormat option. E.g.:

gap://www.example_onlinestore.com/nikeShoes/Air3000*answerFormat=nvp&answerFormat=markup|sellerRatings( )

The part <inquiry>, with a vertical-bar character "|" as a marker prefix and delimiter, contains pre-defined questions capable of parameters. (Multiple questions are separated by "&".) These questions in attribute form include:

A query sellerName( ): What is the seller's name?

A query sellerAddresses([<location>]): What are the seller addresses for a given location?

A query sellerRatings([<ratingAgency1>[,<ratingAgency2>]]): What are the seller's ratings? (This example question supports up to two rating agencies to simplify the presentation above. More could be supported in an implementation. Alternatively, multiple sellerRatings questions may be used in a single request.)

A query productOrServiceName( ) What is the product or service name?

A query productOrServiceDescription([<language1>[,<language2>]]): What is the product or service description? (This example question supports up to two languages to simplify the presentation. More could be supported in an implementation. The order of the languages specified indicates preference from most preferred to least.)

A query marketType( ) What is the market type? (E.g., fixed price, auction)

A query price( ) What is the current price of the product or service?

A query acceptablePaymentTypes( ) What are the acceptable payment types? (E.g., paypal, Visa, Amex.)

A query shippingAndHandlingCharge(<location>): What is the shipping and handling charge given the consumer's location specified in <location>?

A query paymentAt([<location>]): Where do I go to do the payment for the purchase given the consumer's location specified in <location>?

A query currency( ) What is the currency of this offer?

A query offerExpiryDate([<location>]): What is the offer's expiry date given the consumer's location specified in <location>?

A query offerLastChanged( ) What was the date and time that the offer was last modified?

The following is a list of questions applicable to advertisements of perishable goods:

A query bestBeforeDate( ) What is the product's best-before date for consumption?

The following is a list of questions applicable to advertisements of auction-type markets:

A query reservedPrice( ) What is the reserved price of the auction? A query minimumBid( ) What is the minimum bid of the auction?

A query currentBid( ): What is the current bid of the auction?

A query increment( ) What is the minimum incremental amount of the bidding price?

A query maximumPrice( ) What is the "buy it now" price of the auction?

A query auctionAt([<location>]): Where do I go to participate in the auction given the consumer's location specified in <location>?

Questions not of advertising nature include:

A query protocol Version( ) What is the version of the protocol being used by the information provider?

A query entityCapabilities( ) What are the format and dialogue capabilities of the digital resource?

A query isMasterInstance( ) Is the digital resource the original copy? A query masterInstanceURL( ): What is the URL of the original copy of the digital resource?

Of course, the above lists of pre-defined questions and their options are by no means exhaustive. They may also be modified as the protocol evolves over time while in use. The form and format of these questions (and their answers) is also just one of many that may be implemented for a particular embodiment of the present invention. For example, in conjunction with providing <options> and <inquiry> on a GAP-supported URL (or simply GAP URL), <options> and <inquiry> may also be specified via a method similar to HTTP's POST method in a GAP request message, one of whose functions is to provide a block of data to information providers for processing. Proper markup tags to delineate <options> and <inquiry> making up such block of data may easily be furnished by one who has skill in Standard Generalized Markup Language (SGML) and its related or spin-off markup standards (e.g., HTML—HyperText Markup Language and XML—eXtensible Markup Language).

Based on a GAP URL, a GAP information requester would be able to construct a GAP request message using the same format of HTTP request header that a HTTP information requester would construct using a HTTP URL. Additional fields (e.g., name-value pairs to specify <options> and <inquiry>) in the request header may be added. Successfully constructed GAP request messages are sent to their destination hosts (which may also include the host where the information requester resides, if applicable) via the underlying network transport mechanism (e.g., TCP as for HTTP) available at the information requesters' host.

Likewise, GAP's responses follow the same structure of HTTP's responses. Additional fields (e.g., name-value pairs to specify answers to dialogue questions as well as the formats of those answers and of the requested online entities or resources) may be added to the response header. Such extra fields may also be specified as part of HTTP response content, embedded inside HTML comments. For example:

```
<!-- HTML comments are here
<-! GAP comments are here. !->
<gap:seller name="ABC Example Retailer" format="nvp">
        <address format="markup"
        definition="www.fictitious.org/dictionary/all/2.0">
                <street> 1032 Empire Street </street>
                <city> Los Angeles </city>
                <state> California </state>
                <country> USA </country>
                <zipCode> 91321 </zipCode>
        </address>
</gap:seller>
-->
```

The above HTML entity provides an answer to two possible dialogue questions, i.e., the seller's name and addresses. (Note that "<!--" and "-->" are HTML comment opening and closing markers. Content inside these markers is not interpreted at all by HTTP requesters for visual presentation on web browsers.) Such embedment within a HTTP comment allows a GAP-aware resource to serve both GAP and HTTP requesters without causing confusion to the latter. GAP-specific comments may be placed within "<!-" and "!->" as shown in the example above. Again, proper field and markup tags for GAP responses may easily be furnished by one who has skill in Standard Generalized Markup Language (SGML) and its related or spin-off markup standards.

Similar to HTTP protocol servers, a GAP protocol server may use a Transport Layer endpoint or TCP/IP port for its designated level or layer of communication. A suite of GAP protocols may use a plurality of lower-layer protocols, such as HTTPS, FTP and FTPS. Realization of such a GAP protocol suite (e.g., GAPS—GAP Secure, GAPF—GAP File Transfer, and GAPFS—GAPF Secure) may include assigning different TCP/IP ports to each GAP protocol in the suite and providing standards for each of them (e.g., GAPS—secure access to digital resources of advertising context via HTTP; GAPFS—secure retrieval of digital resources of advertising context via FTP). Variations of GAP or other context-level protocols may define or adopt a different URI syntax (e.g., "GAP://com/cookshot/www" instead of "GAP://www.cookshot.com"), and they may use services provided by other context-ignorant application-level protocols, or those of transport-level protocols, or a combination thereof. (Similarly, an application-layer protocol server or service may communicate with a transport-layer protocol server or service with no necessary support from any explicit protocol servers of the intervening session and presentation layers between the application and transport layers in the OSI Reference Model.) According to one embodiment, a context-level protocol may not need to re-invent or otherwise be concerned with how data or digital resources are transferred or displayed. Instead, its functionality may focus on context determination and establishment of requests and responses, or identification and retrieval of context-denoted digital resources.

According to another embodiment, a digital resource itself needs not be GAP-aware. A plain-text digital resource with no markup tags could totally be acceptable to GAP requesters. The GAP response header for this entity would specify the resource's encoding scheme (e.g., ASCII—American Standard Code for Information Interchange) and its format (i.e., freeform text). If such information is missing in the response header, then GAP requesters could attempt to determine the format of the presentation of the retrieved entity by checking the resource's file extension, if there is one (e.g., ".txt" file extension means text file).

For example, if an embodiment of a GAP information requester includes a web browser-type application, therefore displaying a retrieved digital resource, it may choose to display a format-unclassified presentation in ASCII plain text format, when the file size of the entity is below a certain threshold. That is, if the entity in question is large and of some unknown media type, it is usually not useful to display the content in ASCII plain text format in its entirety. On the other hand, such a browser-type application may also allow its users to try various presentation formats and encoding schemes to attempt successful display of the presentation of a retrieved resource or entity with respect to the user's intent. For example, a user may view a HTML-formatted entity in plain-text format, so to reveal all HTML markup tags embedded for the presentation of the entity.

There may be a variety of ways to make available digital resources via GAP as advertising entities. One is to equip web servers with GAP-capable protocol servers or information providers, such as those shown in FIG. 23B and FIG. 23C. Another is to provide a GAP-capable proxy system or server that may maintain a list of URLs of advertising resources on GAP-incapable web servers, such as the proxy shown in FIG. 28. Such URLs may then be submitted or otherwise made available to the proxy system or server. A GAP information requester would learn about these URLs when communicating to the proxy system or server. The proxy system or server may also handle dialogue questions on behalf of those advertising resources. Dialogue answers may be generated for the proxy system or server as part of the URL submission process.

A GAP information provider and requester both expect the primary context for digital resources of their interest to be of advertising. For instance, similar to FIG. 30, a GAP information provider would not reply a GAP information requester asking for advertising digital resources with a non-advertising digital resource (or web resource) even the resource exists as specified in its URL. On the other hand, if the content of the same resource (i.e., by the same or equivalent identifier or address) is replaced with one of advertising nature, then it would be legitimate for a GAP information provider to make it available to the GAP information requester. It is an obligation of a GAP information provider to respect this rule, and behave accordingly in presenting its resources as target entities or user payloads for retrieval by a GAP information requester.

Existing web tools and technologies such as search engines may be applied to or otherwise adapted for GAP. Knowing that digital or web resources available through GAP may be contextually ascertained to be of advertising, an online consumer may formulate his search words or phrases on a GAP-aware search engine more confidently, knowing non-advertising web resources would be excluded from the search all together. In addition, a GAP-aware browser or search engine needs not be resident on the online consumer's host system. Online consumers may use a GAP-unaware browser or client software to access GAP-aware browsers, search engines and applications. Moreover, new and better tools and technologies using contexts and dialogues afforded by GAP would now be possible.

On the Web, existing online advertisements (or simply called online ads or web ads) available via HTTP may simply be made available to GAP as well. This in effect contextualizes web resources that are of advertising nature but otherwise lack a reliable and recognizable context for such interpretation. There may not be need to change the content of existing web ads if their context is consistent with advertising. The advantage of such contextualization is already substantial. It is no longer legitimate to get non-advertising resources on the Web through GAP when one is actually interested only in advertisements of goods and services.

For example, an online consumer may see an ad on a magazine about a new mobile phone. The ad shows a GAP URL. He then enters the URL on a GAP-capable web browser. The browser as a GAP information requester would then:

(1) Process and interpret the given URL to create a GAP request.

(2) Send the request via its underlying transport mechanism to the destination host, i.e., the authority specified as part of the URL.

(3) Receive an online resource of interest (namely, the primary resource) as a response from a GAP information provider at the specified destination host. The online resource is an ad about the mobile phone which includes the phone's specification and unit price.

(4) Interpret the response for proper presentation as per format (e.g., HTML) specified in the GAP response.

(5) Send retrieval requests, if necessary, for other resources (i.e., secondary resources, such as inline graphics) making up a complete presentation of the primary resource.

(6) Display the received resources as a single page. A page may contain both GAP URL links (such as GAP links to the phone's accessories) and non-GAP URL links (such as a HTTP link to a high-resolution picture of a product, a FTP link to a user guide, and so on).

(7) Indicate that the pending resource is not of advertising context when the online consumer clicks on a non-GAP URL link to, for example, a user manual.

(8) Retrieve the user manual and present it on a separate non-GAP or a separate context-off GAP browser.

All the above steps are procedurally similar to those of HTTP, except the last two steps (Step 7 and Step 8) which demonstrate how the context-making ability of GAP influences the selection and presentation of a resource based on the resource's context, or its lack of it.

On the content supply side, no undue effort is imposed on the creation and provision of online ad content for GAP (namely, GAP online ads). For example, a plain text of advertisement is sufficient as a response body (along with a corresponding response header) for presentation via GAP. Of course, one may also create presentation-rich online ads, much like HTTP-accessible web pages written in HTML. Such online ads may themselves contain GAP links as well as non-GAP links. Conversely, non-GAP resources such as a web page of a discussion forum may also contain links to GAP resources, although a GAP-incapable information requester such as a conventional web browser would not recognize these links to GAP resources. These links may be embedded in comments if they pose problems to a GAP-incapable information requester. A GAP-capable browser would recognize GAP links as well as dialogue answers embedded in non-GAP comments, and display or interpret them accordingly.

To serve an information requester a GAP online ad, an ad exhibitor would place the ad in a host's GAP information realm. (Note that content of an online ad may be dynamically generated on demand upon request, instead of being prepared in advance.) An information realm of a protocol in relation to a computing host is a subdivision of the information available in a host that is accessible or otherwise applicable to a protocol. For example, a HTTP (information) realm comprises all the resources visible and accessible via HTTP, subject to security and connectivity considerations. The same online ad may also be made available as a regular context-free web page to the HTTP realm of the same host. Moreover, the same instance of an online ad can be placed in both GAP and HTTP realms, as well as other realms such as FTP.

A GAP-capable search engine may operate on GAP realms, much the same way as search engines of the status quo operate on HTTP realms (and possible other realm types such as FTP) on the Web. Moreover, HTTP realms could also be examined to discover GAP resources. Furthermore, advanced indexing based on query answers may be performed on dialogue-capable GAP resources. Query answers may be obtained through dialogue with GAP resources or their information providers or proxies, or through parsing of dialogue answers embedded in their representations.

With a GAP-capable search engine, an online consumer may enter his search words for information in the GAP realms. The consumer may also have an option of performing a more refined search if the search engine supports the use of dialogue answers as part of its indexing. In this case, the consumer would be able to enter search words for specific dialogue answers, for example, a product name as a search word entry for searching first the part of the index that contains answers to the dialogue question "What is the product or service name?," and then the rest of the index. This facilitates a much more reliable ordering of results in which links with more relevance precede those with less. Similarly, the more precise the format of a resource representation and its dialogue answers in relation to the demand of the search words or phrases, the better chance of quality matching between an online consumer's intent and ads providers' offerings there could be.

A search engine may also be capable of multiple types of realms, for example, GAP and HTTP. A search can be performed indiscriminately on all supported realms. A user can also prioritize the realms (e.g., GAP first followed by HTTP) or exclude certain realms (e.g., no GAP) for the search operation and result presentation.

As shown above, online consumers and ad providers familiar with the web would readily appreciate the similarities between GAP and HTTP in their user-level operations. The added features afforded by GAP are also intuitive, since they are user-centric, and semantically relevant to their need. Of course, the user-level GAP operations depicted above are not exhaustive, and there are many variations and additions possible. As such, these operations should not be construed to be the limitations on the operation of GAP. Although simple, these operations serve to demonstrate the effectiveness of embodiments of the present invention in form of GAP when applied to a HTTP-like environment, which is familiar to web users.

Note that GAP may use HTTP's well-known port 80 as its contact port as well, while according to another embodiment, it may be assigned with a currently unassigned TCP/IP port. While ports other than their respective well-known ports may be used for HTTP and GAP, such use may require clients to first discover the ports at which servers are listening to or waiting on, before requests may be sent to them. For example, all HTTP servers deployed on the World Wide Web (i.e., the Web) at large would use port 80 for accepting requests. Without explicit port specification in a URL, HTTP clients such as web browsers would usually by default send their HTTP requests to port 80 of their target hosts or web servers. On the other hand, a URL on a webpage may embed the port information so that it would lead clients to the correct port at the time of requests, without any prior port discovery per se.

Figure 32A:
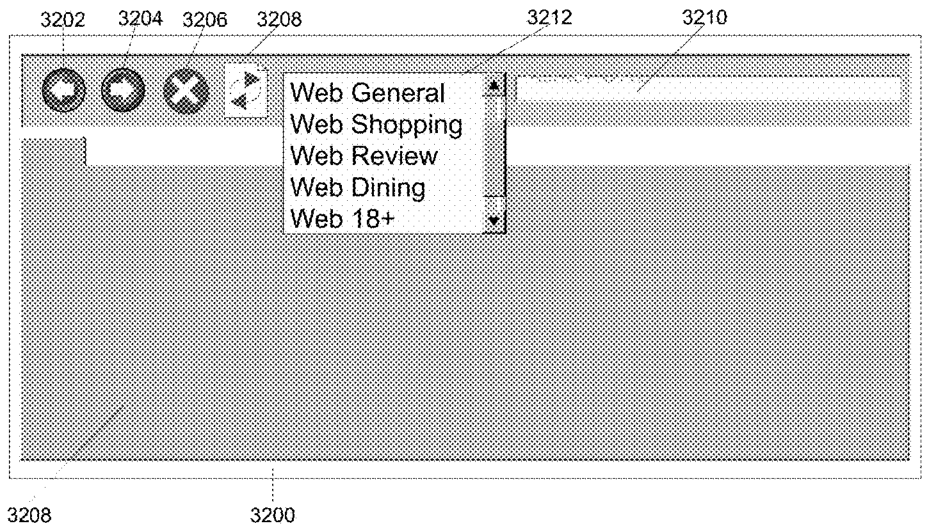
FIGS. 32A, 32B, 32C, and 32D show a number of Web browser user interfaces equipped with the present invention in accordance with some embodiments.

FIG. 32A shows an example browser page 3200, according to one embodiment, that one may see on a HTTP client station. The browser page comprises the back 3202 and next 3204 buttons, the abort 3206 and refresh 1208 buttons, an empty tab-enabled display page or area 1208, an input field for URL entry 3210, and a scrollable pull-down menu 3212 listing a plurality of context-selector phrases such as Web General (i.e., no context), Web Shopping, Web Travel, Web Dining, and Web 18+ (e.g., adult-only content). These illustrative user-interface elements with the exception of the pull-down context selection menu are commonly seen in many web browsers. The first selectable choice is "Web General," which is the status quo Web, for which the default port would be 80. The next one is "Web Shopping," which may refer to the context-denoted Web for shopping, whose default port could be 98, such as the one shown in FIG. 28. The other choices such as "Web Review" and "Web Dining" correspond to the context-denoted Webs for reviews and dining respectively, whose default ports could be any distinct port numbers chosen among available port numbers not in official, de facto, or common use by other protocols. Consequently, the URL specified in the URL input field would result in a HTTP request being sent to or otherwise set up for the target HTTP server (or its proxy) at the specific port designated for the chosen context.

A URI (Uniform Resource Identifier), of which URL is a particular type, is a string of characters that adheres to a specification for identifying or otherwise referencing resources (e.g., a webpage) on the Internet or a private intranet. A URI scheme is the top level or part in the syntax of a URI construct. The remainder of the construct is to be structured and interpreted per specified URI scheme, subjected to certain constraints and conventions. For instance, the URL "http://www.uspto.gov/" has a URI scheme name "http," and the rest of the URI (not including the preceding colon ":"), namely "//www.uspto.gov/," is considered a scheme-dependent or specific part. The colon serves as a separator or delimiter between the scheme part and the scheme-specific part(s). Note that it is not necessarily for the scheme part of a URI construct to be a protocol (e.g., HTTP) even though it is commonly so. In addition, different URI schemes (e.g., HTTP and FTP) may share the same or a subset of structure and semantics for their scheme-specific parts.

Figure 32B:

FIG. 32B shows another example browser page 3200*b*, according to another embodiment, where a pull-down context selection menu is not present. There the example URL entry at the URL input field has "shop" as its scheme. This keyword "shop" is a scheme name associated with a protocol of shopping context. In particular, the protocol uses the same syntax and semantics of the scheme-specific part of HTTP URL, except now the default port would be, using the example illustrated in FIG. 28, port number 98, not 80. Hence the HTTP server to which "www.cookshot.com" in the URL refers would be listening and serving requests at port 98. (As such, URL entry "http://www.cookshot.com:98" would also be able to reach the HTTP server in question.) According to one embodiment, a TCP port other than port 80 is assigned with a context of shopping including sub-contexts of online ads and reviews of products and services, such that a HTTP server listening on or otherwise serving at this port are expected to deliver digital resources whose primary context being shopping or whose content of interest having a primary context of shopping. A HTTP client generating HTTP requests for target digital resources associated with URLs having "shop" as their scheme part or its equivalent would send the HTTP requests to that port, and not port 80.

Figure 32C:
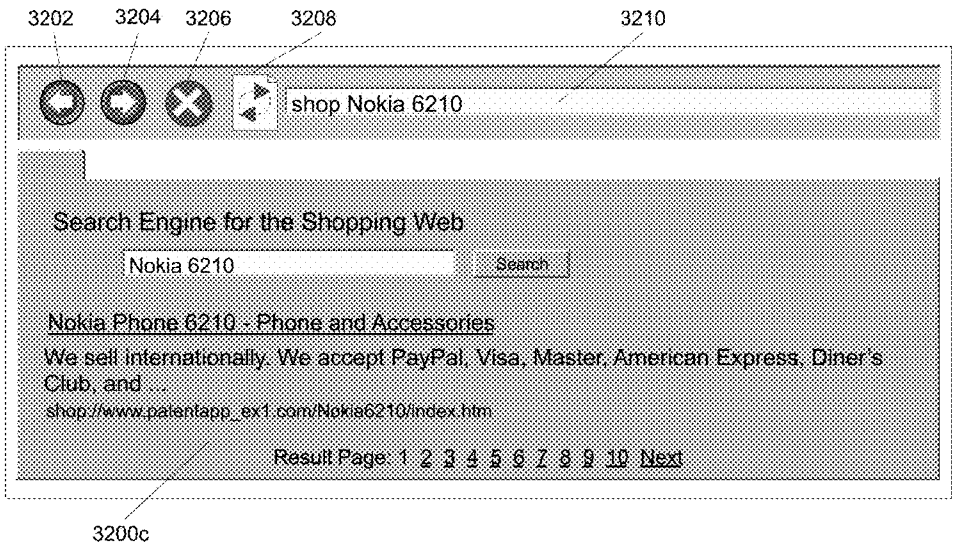
Figure 32D:
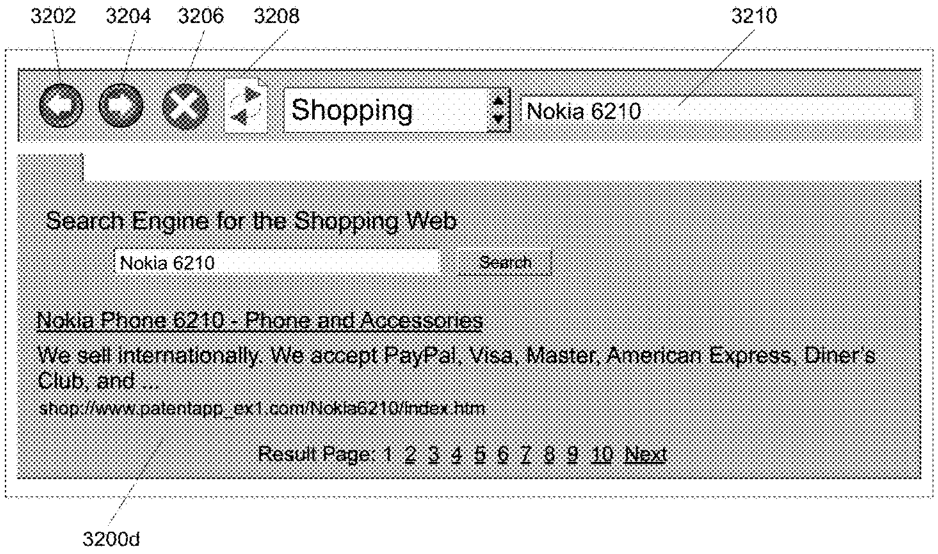

The "shop" scheme may further provide context-specific enhancement to the scheme-specific part. For instance, an entry "shop Nokia 6210" (see FIG. 32C) may result in a query with the search string "Nokia 6210" sent to a default search engine pre-assigned to or otherwise associated with the "shop" scheme. That is, if free-form keywords or phrases or those involving Boolean logic are detected as entry to the scheme-specific part, then it is considered as input to a search engine for the context of shopping. FIG. 32C illustrates such an example 3200*c*. (For example, the HTTP server of web address "www.cookshot.com" described earlier could be the default search engine.) FIG. 32D illustrates the same example but in a browser page 3200*d* similar to that of FIG. 32A.

A contextualized Web made possible by embodiments of the present invention may allow the use or adaptation of existing context-ignorant technologies, protocols and schemes in providing a context-certain or context-denoted layer or filter over digital or online resources delivered, processed or otherwise handled by or through these technologies, protocols and schemes. The operation scenarios for online resource providers and consumers participating in information exchange via such an embodiment, while may differ from one specific application to another, may not require any undue effort from these participants. Their skills and abilities in online resource retrieval, browsing, creation and publication may remain applicable or relevant. For instance, the user operations shown in FIG. 32A to FIG. 32D should be quite straight forward, and a Web user would find the user interface intuitive and consistent with what they are accustomed to. According to one embodiment, non-compliance of a digital resource provider may be reported by any party and be dealt with by the jurisdiction in accordance to the agreement or generally accepted practices, such as the removal or suspension of the addresses of non-complying online resource servers from the contextualized Web in question.

According to one embodiment, a contextually consistent space of digital resources may be achieved through communication end-points (e.g., a communication port of a TCP/IP protocol suite) that are dedicated to a certain context of digital or online resources, and by agreements, declarative or otherwise, between and by resource consumers and providers that their online queries, requests, and information of interest that may be received or served via these end-points shall be consistent with the context, unless otherwise specified.

For instance, among so many possible contextual integrity rules and guidelines, a certain TCP/IP port may be designated for serving webpages that are advertisements free, copyright free, one advertisement per page or one-offer per page, independent of or in addition to any contextual conformity requirement that the contextualized TCP/IP port may demand. Contextual integrity achieved through this approach would improve substantially the accuracy of indexing and queries of such webpages, while still allowing contextual heterogeneity among webpages and web resources that a server of digital resources may serve.

In addition, data going through a communication end-point with contextual conformity or integrity requirements may be protected or otherwise distinguished by a digital signature or other forms of security measures, so that only online resource providers and consumers (or requesters) that have formally accepted those requirements and, if any, the related penalty clauses for non-conformance, would have the keys or means to send, receive, read, produce or publish such data or digital resources.

A contextualized Web may also be furnished with enhancements such as tools, formats and rules (e.g., contextual integrity on a per webpage basis) and so on that aid in their ability to deliver, process or otherwise handle online resources in the specific context. Furthermore, sub-contexts such as "reviews," "offers" and "ads" may further refine or otherwise supplement a context to which these sub-contexts are applicable. The differentiation of these sub-contexts may be performed or otherwise realized at the port level or in the syntax of a protocol (e.g., special keywords defined in the syntax that may identify the sub-contexts of interest).

With the enhancements and modifications to HTTP as specified above, one who is skilled in the art would be able to realize an implementation of GAP, as well as other context-level protocols. For instance, a variant of HTTP may be specified as follows:

http://<authority>[/<path>][/<object>][*[<context>][*<context>]][?<query>]

(Note that while more than two named contexts may be supported, the above specification would support two for simplicity in illustration.)

The introduction of the optional part and its subparts "[*[<context>]*[<context>]]" to HTTP URL syntax allows the specification of additional contexts that the requested resource may belong to. The presence of the asterisk "*" alone in a HTTP URL would mean the default context, for instance, advertising. Without this optional part, an URL would be just a regular HTTP URL.

An additional context may also be specified in an optional "<context>" part. For example:

(1) http://www.wbstz.com/brandnamePhones (2) http://www.wbstz.com/brandnamePhones*

(3) http://www.wbstz.com/brandnamePhones*mobilePhone (4) http://www.wbstz.com/brandnamePhones*mobilePhone("USA")

(5) http://www.wbstz.com/brandnamePhones*mobilePhone("USA")*brand("Nokia")

The first HTTP request bears no context. The second request specifies an advertising context. The third request specifies advertising of mobile phones. The fourth request specifies advertising of mobile phones applicable to use in USA. The fifth request specifies advertising of Nokia-branded phone mobiles applicable to use in USA. (Note that the parameter "USA" is an example of context parameterization.)

Each explicitly named context and its supported parameters, if any, may not need to be defined as an inherent part of a context-aware protocol. They may be defined independently. Information requesters and providers could then use the named contexts of their interest to contextualize each individual requests and responses through a context-aware protocol capable of such on-demand contextualization, as long as these information requesters and providers share the same definitions of these named contexts. The fulfillment of this stipulation is made simple when the protocol is associated with a set of commonly used contexts. An "unknown" context may be included in requests and responses along with its unique identifier, such as an URI. Accordingly, an otherwise context-free protocol might reliably be made context-capable on a per request and response basis, as long as the information provider and requester may themselves be context-aware and know how to mutually specify and recognize these on-demand named contexts through the protocol. For example, the query part of the context-free HTTP URL may be used to carry these on-demand named contexts, such as:

"?contextName=mobilePhone&contextDefinition=urn:www.fictitious.org:glossary:all:2:0," and a context-ignorant HTTP information provider would return an error when it encounters a query part that the information provider fails to make sense or interpret.

The addition of these optional context parts to HTTP would incorporate embodiments of the present invention into HTTP, thereby upgrading the protocol while preserving its existing functionality. An ordinary HTTP information provider would not understand such a context-aware or context-making HTTP request, and would return an error (e.g., resource not found). A context-aware information requester would learn about this incapability from the error message so returned. Such an information requester capable of this enhanced HTTP is in effect capable of a "combined protocol," namely a combination of both the original context-free HTTP and a context-specific or context-making protocol made possible by embodiments of the present invention. Another illustrative variant of HTTP in embodiments of the present invention is as follows:

http://<authority>[/<path>][/<object>][*[<options>][l<inquiry>]][?<query>]

This variant supports GAP's features of options and inquiry in lieu of multiple contexts. Here is yet another variant:

http://<authority>[/<path>][/<object>][*[<context>][*<context>][*<options>]][l<inquiry>][?<query>]

This one supports GAP's features of inquiry and options in addition to multiple contexts. (Although both contexts and options use the asterisk "*" character as marker and delimiter, the latter are of name-value-pair, while the former are not. This difference in syntax is sufficient for proper distinction during parsing of the URL. Note that this is just one example syntax used by a protocol in embodiments of the present invention.) Contexts as well as options and inquiry may also be specified in a HTTP requester header.

In addition to open systems such as the Web, embodiments of the present invention may be applicable to use within an application or system, where a communication protocol is used among pre-defined modules or components within the application or system.

Furthermore, a communication protocol equipped with embodiments of the present invention may make a distinction between copying and transferring a target digital resource, and treat the resource as having more than one instance, if such distinction is useful to a given context, such as advertising. That is, when the protocol copies a digital resource, it leaves the number of instances of the digital resource unchanged. When the protocol transfers a digital resource, it removes an instance of the resource. For example, an advertising digital resource may be a limited number of discount coupons. A transfer of such a resource would reduce the number of available coupons. In addition, an information requester may register for notification of query answers, especially those that change over time such as the current auction price, if the information provider would support it. These additional features do not indicate a new use or an enhancement to embodiments of the present invention. Rather, they are some of many different features that a communication protocol equipped with an embodiment of the present invention may possess. Those skilled in the art would be able to realize a particular embodiment per some requirement in accordance with the present invention.

For instance, specific embodiments may vary depending on the specific operating environments as well as specific functional, performance, security, reliability, maintenance and presentation requirements. For instance, the art of communication protocol development has been around for more than 30 years. While in essence all communication protocols are designed to transfer some information from one end to another end, there are a myriad of variations, with different data representations, synchronicity and logical connection models, error handling, security mechanisms, data caching and buffering strategies, and so on. Some protocols work in conjunction with others, while some exclude each other for the same application. Embodiments of the present invention make possible context-level communication via interfaces and protocols for subject matters including but not limited to Advertising, Reviews, News (Business, finance, entertainment, politics), Science and Technologies, Medical and Health, History, Books and Arts, Scholastic and Academic.

For example, in addition to advertising, which could already encompass beyond retail goods and services, e.g., jobs and personal ads, a communication protocol herein referred to as Good Answers Protocol (GAP) may be specified as follows:

gap://<authority>[/<path>][/<object>]*<context>[*<context>][*<context>][?<query>]

(While the protocol shown here may support up to three contexts for simplicity, it may be extended to support an indefinite number of them.)

Furthermore, a context may be described in a hierarchical manner, like categories in a business directory. For example:

gap://www.movie_chain.com/movies/ABC*movie/review gap://www.movie_chain.com/movies/ABC*movie/showtime("New York City")

Instead of just a mere different representation of the same information the same digital resource (www.movie_chain.com/movies/ABC) provides different information, namely the critics' review on the movie ABC and the show times of the movie in New York City. The former and the latter are both related to movies, but differ in their specific "subcontexts." In addition, semantically independent contexts may also be specified as follows:

gap://www.example_travel info.com/destination/HongKong*touristInfo("New York City")*fineDining Here the request is to the entity "www.example_travel info.com/destination/HongKong" for information on fancy restaurants, specifically for visitors from New York City. The contexts "touristInfo" and "fineDining" are independent in that they can exist without the other. For example, without the "touristInfo" context, the returned information is still of fine dining, but it would not be customized to visitors coming from the New York City. On the other hand, without the "fineDining" context, the returned information would be of tourist information for visitors from New York City in general, including visa requirement, currency rate, embassy address, etc.

A glossary and grammar of contexts may be developed to facilitate this example Good Answers Protocol. An information provider may also maintain and make available a list of contexts supported for a particular or a group of digital resources or online entities that the provider may be responsible for, so that an information requester may survey the kinds of information available. In addition, this GAP protocol may also support dialogue. E.g., a digital resource, whose context is established as medication, may be asked about its generic name, indications, and so on.

Another example is an application of embodiments of the present invention to turn the Web from a global repository of distributed semantically-uncertain information base into one of semantically-rich information source. Different channels of specific semantic communication contexts may be established to support a much more effective heterogeneous mode of information dissemination and request. Because the current Web is inherently context-free, it inevitably treats all information dissemination and request as though for homogeneous users, thereby discriminating against user groups or interests of lesser majority. This would impede the growth to universality of the Web.

For example, someone looking for an urn for funeral use may get a large result of links to websites about URN (Uniform Resource Name—an IETF RFC protocol standard) if today he enters "urn" (when not even in form of a capitalized acronym) as a search word in a popular search engine. The result is biased towards the current user base of the Web, most of who would be considered computer savvy enough to be more interested in URN than an urn. However, one would argue, and rightly so, that most of the people in the world are not computer savvy, and should not be required to be so in order to take full advantage of the Web. It is similar to word processing software which in essence shall not give computer programmers any considerable advantage over non-programmers in using the software to perform its intended tasks, i.e., document creation, maintenance, collaboration, publication, and distribution. As such, contextualized channels on the Web made possible by embodiments of the present invention would drastically help equalize this imbalance. Context-specific search engines may be developed, relying on the communication contexts of the contextualized channels that these engines are to index and operate on. According to one embodiment, an otherwise general-purpose search engine serving a contextualized information channel or Web becomes contextualized. These contextualized channels may be likened to specialty channels in television broadcasting. This is like before the time of specialty channels, television audience could only choose channels of television stations or networks, and subject themselves to the programming of these conventional channels. The rise of specialty channels gives audience of heterogeneous nature the ability to choose content of their interested subject matters. Embodiments of the present invention might further reify Marshall McLuhan's famous literary trope "the medium is the message" with realization of "protocol is the context."

Still yet another example is an application of embodiments of the present invention to make possible legitimate user feedbacks for search engines and information provider. Because there is no established context for online information at large, it may not be suitable or relevant for web users to rate the results from search engines in relation to a given context. However, when web pages are presented in a certain context, such as that of advertising, web users may now rate more objectively on the relevance of a given web page in a search result. Based on the search input and ratings given by the web users, a search engine may improve the search quality based on this correlation. Information providers may also be rated for the content integrity. This is made possible because of an established context mutual to both content providers and consumers through a context-making communication interface or protocol. Contextual integrity of searchable content within a resource may subsequently improve.

For example, if an online consumer looks for a sailing jacket of a particular brand, and therefore specifies the search words of "Goodbrand sailing jacket," a search engine nowadays could return links to popular web pages that sell assortment of goods, some of which are of brand "Goodbrand," and some of which are about sailing, and some of which are jackets, but no item would be a sailing jacket of brand Goodbrand. In short, the online consumer would get a page that lists items that each of which may contain one or no relevant word. This illustrates while all content in a given resource may be of advertising, the contextual integrity of the resource is compromised by having listed many unrelated items for sales as its content.

Good contextual integrity should translate into better ratings for information providers, which in turn encourages contextual integrity improvement. In fact, a single webpage may contain more than one web resources. Yet multiple web resources presented together on the same webpage could have their own independence with respect to searches and dialogues. (That is, a resource may further be decoupled from its mere presentation. A webpage needs not be a single homogeneous resource. It may serve as a collection or presentation of one or more resources. Such a collection or presentation may itself be a resource.) Such independence may easily be set up and identified with structural markups. A search engine can consider individual web resources independently even though they appear on the same webpage. When there is a match for a given context, the search engine can return a link to the whole webpage, or a modified link to just the matched web resource for preciseness. Again, demand for such contextual integrity of web resources is made possible by embodiments of the present invention. In addition, a search engine may now disregard web resources of advertising nature whose offers have expired. (Note that an expiry of an offer is not the same as that of a web page. The former is a possible natural attribute to an advertised offer, while the latter is a control attribute to temporary storage of webpages for later retrieval.) That is, a web page may contain several ads, where some have expired and some have not. A search engine would ignore the expired ones should its user ask only for online ads still in effect.

As illustrated above, embodiments of the present invention make possible so many applications. Hence, while the specification so far may have contained much specificity, it should not be construed as limitations on the scope of the invention, but rather as an exemplification of embodiments thereof. One who is skilled in the art would be able to incorporate the present invention into a variety of embodiments and applications. For instance, an online document or resource may comprise an indication of its subject matter or subject matter context, the indication comprising an identification of a protocol interface associated with a subject matter or subject matter context. For example, a HTML webpage may indicate an alternate link (e.g., a LINK element with "rel" attribute whose value is "alternate"), the alternate link comprising a URL whose port (e.g., port 89) is associated with a subject matter (e.g. shopping). A search engine or a user agent such as a web browser may recognize the subject matter based on the alternate link, and process the webpage accordingly. For instance, the search engine may catalog, classify or index a web resource based on information available via an alternate link, and present or select the web resource based on matching of a query or context against the information, even though the webpage does not necessarily contain that information, or the information in the same or compatible form, mode or scheme. For example, an online video may be associated with an alternate link to a transcript of the video. A search service may index the transcript. It may present or select the video if the search service deems that the transcript is a match with a request or query. In one embodiment, such a matching may require that the alternate link is associated with a protocol interface that is associated with a particular subject matter, such as port 89 if port 89 is deemed being associated with the subject matter. In one embodiment, an online publication identifying a TCP/IP port and associating the port with a subject matter such as shopping is regarded as having the port deemed being associated with the subject matter.

Moreover, in one embodiment, a system or an application on a computer system may activate a protocol interface on the system, a server or a communication endpoint, the protocol interface comprising a network port, where the network port is predefined as providing only shopping information as payload available to a computer that submits a request for a digital resource, such as a device communicatively coupled to a consumer through which the consumer may request and/or submit information for comparative shopping, or a device communicatively coupled to an advertiser, seller or content provider through which the advertiser, seller or content provider may publish or submit information about shopping or retail products, services and offers. The system may send a message including shopping information as payload to a client computer in relation to receiving a request via the protocol interface. In one embodiment, such a protocol interface or network port is identified in a standards document published by an organization that is a third party to an operator of the server, where the standards document, independently of preexisting hyperlinks that identify a resource on the server, identifies shopping information as payload available via the network port, and is available outside the server. In one embodiment, the system, server or communication endpoint belongs to a first party and the client computer belongs to a second party. In one embodiment, such a standards document is an Internet Engineering Task Force (IETF) Request For Comment (RFC). In one embodiment, such a protocol interface is associated with a uniform resource identifier scheme. In another embodiment, the protocol interface comprises a communication protocol and the network port, wherein at least one of the communication protocol or the network port is associated with a shopping context, and the standards document identifies the shopping context. In yet another embodiment, the protocol interface comprises a uniform resource identifier scheme and the network port, wherein at least one of the uniform resource identifier scheme or the network port is associated with a shopping context, and the standards document identifies the shopping context. In one embodiment, the computer client is a Web crawler. In one embodiment, the network port is associated with a uniform resource identifier scheme or a shopping context specified in a standards document. In another embodiment, the network port is predefined or otherwise identified for or as receiving a request for shopping information. In one embodiment, such predefinition or identification is specified or otherwise published in or via a standards document.

In another embodiment, one or more non-transitory computer readable media may include executable instructions stored thereon, comprising instructions for activating a protocol interface on a server, the protocol interface comprising a network port, where the network port is predefined as providing only shopping information as payload available to a computer that submits a request for a digital resource; and instructions for sending a message including shopping information as payload to a client in relation to receiving a request via the protocol interface, where the network port is identified in a standards document published by an organization that is a third party to an operator of the server, the standards document, independently of preexisting hyperlinks that identify a resource on the server, identifies shopping information as payload available via the network port, and the standards document is available outside the server. In one embodiment, such media are under control of one or more computers. In another embodiment, one or more computers or systems are configured with the executable instructions on such media.

In one embodiment, a computer system useful for efficiently searching for shopping information online may activate a protocol interface on a server or the computer system, where the protocol interface is configured to provide a shopping-related resource from the server or computer system independently of requests, and comprises at least one of a network port, communication endpoint, communication protocol, and a communication protocol stack or handler; receive from a client over a communication network, via the protocol interface, a request; retrieve, at the server or the computer system, the resource; and send a response to the client, the response comprising the retrieved resource. In another embodiment, the computer system also performs determination, at the server or the computer system, as to whether the request is shopping related. In yet another embodiment, sending the message to the client comprises sending a subject matter-certain or subject matter context-certain message to the client in relation to receiving the request via the protocol interface and independently of content in the request, where the subject matter or the subject matter context is shopping or a shopping context, the message comprises content associated with shopping or the shopping context, and a standards document identifies the shopping subject matter or the shopping context. In one embodiment, the server or computer system may retrieve content via another server or computer system and generate the response or the resource based on the content.

In one embodiment, an information retrieval system equipped with the present invention is configured to receive messages, entries or submissions from one or more client or user devices over the Internet at a protocol interface on or at the information retrieval system, where the protocol interface may comprise a network port, a communication endpoint, and/or a communication protocol, and at least one of the network port, the communication endpoint, and the communication protocol is identified in a standards document as receiving and/or providing shopping information as payload over a network. The information retrieval system activates the protocol interface to receive those messages, entries or submissions. In another embodiment, the information retrieval system may activate the protocol interface to present or otherwise send responses to one or more client or user devices. In another embodiment, the information retrieval system may be configured to use the same protocol interface for receiving and providing shopping information. In one embodiment, a user may be provided with an application, such as shopping or price comparison application, to be installed on their device, and the application instructs or otherwise causes the device to communicate with the information retrieval system via the protocol interface independently of configuration by the user. For example, the application may be pre-configured or pre-defined to use a specific communication endpoint or network port to send and/or receives messages, where the specific communication endpoint or network port corresponds to one identified in the standards document. The user needs not provide specific configuration or setting change to the application or device to enable this setup or connectivity. In one embodiment, such a user device may communicate with one or more other information retrieval systems over the Internet to receive shopping-related content or payload via their respective protocol interfaces (e.g., communication endpoints, network ports, communication protocol handlers) at these systems, thereby effecting or establishing a Shopping Internet, in contrast to the subject matter-agnostic Internet via port 80 (HTTP), port 443 (HTTPS), and the like.

In one embodiment, a user may be provided with an application such as a shopping application for installation on his device, where the application enables the device to communicate remotely over the Internet with an information retrieval system equipped with the present invention. The information retrieval system may receive over the Internet from another device communicatively coupled to another user. The information retrieval system is equipped with or otherwise configured to provide a protocol interface which comprises at least one of a network port, a communication endpoint, and a communication protocol, and is identified in a standards document as receiving and/or providing only shopping information as payload over a network. In one embodiment, the information retrieval system activates the protocol interface to receive messages, content, requests, or submissions related to shopping. In another embodiment, the information retrieval system activates the protocol interface to send messages, content, responses related to shopping. In yet another embodiment, the information retrieval system activates the protocol interface to send and receive information related to shopping. In one embodiment, the information exchanged via the protocol interface comprises retail offer information, which may include an indication of an item (e.g., a product code or name), an indication of a seller (e.g., a seller ID or name, and/or address), and an indication of a price (e.g., the retail price for the item at the seller). In one embodiment, the standard documents may specify that item, seller and price information be available in messages exchanged via such a protocol interface. In addition, the information retrieval system may identify one or more retail offers from information received via the protocol interface, where each such retail offer may comprise an indication of an item, an indication of a seller, and an indication of a price. The system may then store the information so identified in one or more databases. The system may transmit or send a response to the device over the Internet, in relation to its receiving a request from the device, where the response includes information pertaining to the one or more retail offers stored in the one or more databases. In another embodiment, the other user who provides the shopping information to the system may also be provided with an application to be installed on his device, where the application is pre-configured or pre-defined to cause the device to send shopping information to the protocol interface at the system, without the need of configuration setup or change from the other user. In one embodiment, the application may cause the device to send shopping information to other systems equipped with such a protocol interface, i.e., one that is identified in a standards document as receiving only shopping information as content of interest or payload. In one embodiment, the shopping information or entries submitted by the other user may include or refer to a digital copy of a sales receipt pertaining to the item, seller and price information associated with the shopping information or entries. The system is configured to generate or otherwise keep a version of the digital copy, and provide an indication (e.g., a hyperlink, an icon, or some interactive user interface element) of the version of digital copy as part of the response. Upon receiving a request from the user device in relation to the indication, the system presents or otherwise sends over the Internet the version of digital copy to the user device, thereby providing verifiability to the shopping information so collected and organized.

While the embodiment(s) described above may make reference to specific hardware and software components, methods, and structures, as well as organizations and arrangements thereof, those skilled in the art will appreciate that different modifications, adaptations, combinations, variations, and distributions of hardware components, software components, methods, and/or structures may also be used, and that particular operations described as being implemented in hardware might also be implemented in software or vice versa. All such modifications, adaptations, combinations, variations, and distributions that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiment(s) illustrated. For instance, method steps described herein may be performed in alternative orders or in parallel. Various embodiments of the invention include logic stored on non-transitory computer readable media, the logic configured to perform methods of the invention. The examples provided herein are exemplary and are not meant to be exclusive.

In addition, embodiments of the present invention may be realized using any combination of dedicated components and/or programmable processors and/or other programmable devices. Furthermore, computer programs incorporating various features of the present invention may be encoded on various non-transitory computer readable media for storage and/or communication; suitable media include magnetic disk or tape, optical storage media such as compact disk (CD) or DVD (digital versatile disk), flash memory, hard drive, and any other computer readable medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

Thus, although the invention has been described with respect to specific embodiments, it will be appreciated that the invention is intended to cover all modifications and equivalents within the scope of any relevant claims.

What is claimed:

1. A computer-implemented method for online comparative shopping, the method comprising:

under control of one or more computing systems of a service, the one or more computer systems configured with executable instructions, receiving, by the one or more computer systems, first data from a first device over a communication network, wherein the first data is associated with a retail item available for sale, the first data comprises first price information and information identifying the retail item, and the first device is communicatively coupled to a first user;

storing in one or more databases, by the one or more computer systems, at least a portion of information available in the first data;

receiving, by the one or more computer systems, second data from a second device, wherein the second data is associated with the retail item, the second data comprises second price information and information identifying the retail item, and the second device is communicatively coupled to a second user;

storing in the one or more databases, by the one or more computer systems, at least a portion of information available in the second data;

determining from the one or more databases, by the one or more computer systems, a price range based on the first price information and the second price information, wherein the price range is associated with the item;

in relation to receiving a request from a third device, presenting, by the one or more computer systems, a response to the third device, wherein the response comprises the price range and identification of the item, and the third device is communicatively coupled to a third user; and wherein at least one entity from among at least one of the following: the first data, the second data, the request, and the response, is communicated via a protocol interface at the one or more computer systems, wherein the protocol interface comprises at least one entity in at least one of the following categories: network ports, communication endpoints, and communication protocols, the protocol interface is identified in a specification as transmitting only shopping information as payload over a network, and the specification is publicly accessible via a Uniform Resource Locator (URL).

2. The method of claim 1, further comprising:

wherein the first data further comprises first seller information;

wherein the second data further comprises second seller information;

wherein determining the price range comprises determining from the one or more databases, by the one or more computer systems, the price range based on the first price information and the second price information in relation to determining that the first seller information and the second seller information identify a common seller; and wherein the response further comprises identification of the seller, wherein the price range is associated with the seller and the retail item.

3. The method of claim 1, further comprising:

wherein the protocol interface comprises at least one entity in at least one of the following categories: network ports and communication protocols; and providing an application to the first user for installation on the first device, wherein the application causes the first device to send the first data via the protocol interface, independently of configuration by the first user, wherein the application is configured to communicate with one or more systems, each being equipped with a protocol interface that is identified in the specification.

4. The method of claim 1, further comprising:

wherein the protocol interface comprises at least one entity in at least one of the following categories: network ports and communication protocols; and providing a price comparison application to the third user for installation on the third device, wherein the price comparison application causes the third device to send the request via the protocol interface, independently of configuration by the third user, wherein the price comparison application is configured to communicate with one or more systems, each being equipped with a protocol interface that is identified in the specification.

5. A system useful for electronic commerce, the system comprising:

one or more processors; and one or more memories communicatively coupled to the one or more processors when the system is operational, the one or more memories bearing computer-readable instructions that, when executed by the one or more processors, cause the system at least to:

receive first data from a first device over a communication network, wherein the first data is associated with a retail item, the first data comprises first price information, information identifying the retail item, and an image associated with a first sale receipt, and the first device is communicatively coupled to a first user;

store in one or more databases at least a portion of information available in the first data;

receive second data from a second device, wherein the second data is associated with the retail item, the second data comprises second price information, information identifying the retail item, and an image associated with a second sale receipt, and the second device is communicatively coupled to a second user;

store in the one or more databases at least a portion of information available in the second data;

determine from the one or more databases a price range in relation to the first price information and the second price information, wherein the price range is associated with the item;

receive one or more requests from a third device, wherein the third device is communicatively coupled to a third user; and send one or more responses to the third device, wherein the one or more responses, alone or in combination, comprise the price range, identification of the item, and at least one indication of proof record.

6. The system of claim 5, further comprising:

wherein the one or more memories further bear computer-readable instructions that, when executed by the one or more processors, cause the system at least to:

determine that first seller information and second seller information identify a common seller, wherein the first data comprises the first seller information, and the second data comprises the second seller information; and wherein the price range comprises price history information for the retail item with respect to the common seller.

7. The system of claim 5, further comprising:

wherein at least a part of the portion of information available in the first data is determined by the system in relation to the image associated with the first sale receipt; and wherein the at least one indication of proof record is associated with one or more proof records, the one or more proof records comprise at least one proof record from among a first proof record and a second proof record, the first proof record is associated with the first sale receipt, and the second proof record is associated with the second sale receipt.

8. The system of claim 5, wherein the instructions that, when executed on the system, cause the system to at least determine the price range in relation to the first price information and the second price information, further cause the system to at least determine the price range in relation to a plurality of price information, wherein the one or more databases comprise the plurality of price information, and the plurality of price information comprises the first price information and the second price information.

9. The system of claim 8, wherein at least one amount from among a first amount and a second amount is neither the lower limit nor the upper limit of the price range, wherein the first amount corresponds to the first price information, and the second amount corresponds to the second price information.

10. The system of claim 8, wherein at least one amount from among a first amount and a second amount is not the lower limit of the price range, wherein the first amount corresponds to the first price information, and the second amount corresponds to the second price information.

11. The system of claim 8, wherein at least one amount from among a first amount and a second amount is not the upper limit of the price range, wherein the first amount corresponds to the first price information, and the second amount corresponds to the second price information.

12. The system of claim 5, wherein the at least one indication of proof record is associated with at least one proof record from among a first proof record and a second proof record, wherein the first proof record is associated with the first sale receipt, and the second proof record is associated with the second sale receipt.

13. A system for improving the quality of query results comprising user-submitted data, the system comprising:

one or more processors; and one or more memories communicatively coupled to the one or more processors when the system is operational, the one or more memories bearing computer-readable instructions that, when executed by the one or more processors, cause the system at least to:

receive first data from a first device over a communication network, wherein the first data is associated with a retail item, the first data comprises first price information, information identifying the retail item, and a first record of a transaction in relation to the retail item, the first price information, and the information identifying the retail item, and the first device is communicatively coupled to a first user;

store in one or more databases at least a portion of information available in the first data;

receive second data from a second device, wherein the second data is associated with the retail item, the second data comprises second price information, information identifying the retail item, and a second record of a transaction in relation to the retail item, the second price information, and the information identifying the retail item, and the second device is communicatively coupled to a second user;

store in the one or more databases at least a portion of information available in the second data;

determine from the one or more databases a price range in relation to the first price information, the first record, the second price information, and the second record, wherein the price range is associated with the item; and present a response to a third device, wherein the response comprises the price range and identification of the item, and the third device is communicatively coupled to a third user.

14. The system of claim 13, further comprising:

wherein the first data further comprises first seller information;

wherein the second data further comprises second seller information;

wherein the one or more memories further bear computer-readable instructions that, when executed by the one or more processors, cause the system at least to determine that the first seller information and the second seller information identify a common seller;

wherein the instructions that, when executed on the system, cause the system to at least determine the price range, further cause the system to at least determine from the one or more databases the price range in relation to the first price information, the second price information, the first record, the second record, and the seller; and wherein the response further comprises identification of the seller, wherein the price range is associated with the seller and the retail item.

15. The system of claim 13, wherein the one or more memories further bear computer-readable instructions that, when executed by the one or more processors, cause the system at least to:

provide an application to the first user for installation on the first device, wherein the application causes the first device to send the first data via a network port, independently of configuration by the first user, and wherein the application is configured to communicate with a system equipped with the network port, the network port being identified in a publicly accessible document as transmitting shopping information as payload.

16. The system of claim 13, wherein the one or more memories further bear computer-readable instructions that, when executed by the one or more processors, cause the system at least to:

providing a price comparison application to the third user for installation on the third device, wherein the price comparison application causes the third device to send the request via a network port, independently of configuration by the third user, and wherein the price comparison application is configured to communicate with a system equipped with the network port, the network port being identified in a publicly accessible document as transmitting shopping information as payload.

17. The system of claim 13, wherein at least one entity from among at least one of the following: the first data, the second data, the request, and the response, is communicated via at least a network port at the system, the network port is identified in a specification as transmitting shopping information as payload over a network, and the specification is publicly accessible via a Uniform Resource Locator (URL).

18. The system of claim 17, wherein the specification that identifies the network port as transmitting shopping information as payload over a network is an Internet Engineering Task Force (IETF) RFC (Request for Comment) document.

19. The system of claim 13, wherein at least one entity from among at least one of the following: the first data, the second data, the request, and the response, is communicated via at least a communication end point operative at the system, the communication end point is identified in a specification as transmitting shopping information as payload over a network, and the specification is publicly accessible via a Uniform Resource Locator (URL).

20. The system of claim 13, wherein at least one entity from among at least one of the following: the first data, the second data, the request, and the response, is communicated via at least a communication protocol functional at the system, the communication protocol is identified in a specification as transmitting shopping information as payload over a network, and the specification is publicly accessible via a Uniform Resource Locator (URL).

21. The system of claim 13, wherein at least the request is communicated via at least a network port at the system, the network port is identified in a specification as a default network port for a Uniform Resource Identifier (URI) scheme, and the URI scheme is identified in the specification as transmitting shopping information as payload over a network, and the specification is publicly accessible.

22. The system of claim 13, wherein the instructions that, when executed on the system, cause the system to at least receive the first data, further cause the system to at least receive an image, wherein the image is associated with the first record.

23. The system of claim 22, wherein the response comprises the price range, the identification of the item, and at least one indication of proof record, wherein the at least one indication of proof record is associated with at least one images, and the at least one images comprise the image.

24. The system of claim 23, wherein the one or more memories further bear computer-readable instructions that, when executed by the one or more processors, cause the system to at least:

receive another request from the third device, wherein said another request comprises an indication, the indication being associated with the at least one indication of proof record; and present another response to the third device, wherein said another response comprises an indication of the image.

25. The system of claim 13, further comprising:

wherein the first data comprises an image, the image being associated with a sale receipt, the first record is associated with the sale receipt, and the sale receipt is associated with the first price information, the item, and a seller;

wherein the one or more memories further bear computer-readable instructions that, when executed by the one or more processors, cause the system to at least determine, in relation to the image, at least a part of the portion of information available in the first data; and wherein the response further comprises the identification of the seller.

26. The system of claim 13, further comprising:

wherein the first data comprises a first image, the first image being associated with a first sale receipt, the first record is associated with the first sale receipt, and the sale receipt is associated with the first price information, the item, a seller, and time information;

wherein the second data comprises a second image, the second image being associated with a second sale receipt, the second record is associated with the second sale receipt, and the sale receipt is associated with the second price information, the item, the seller, and other time information;

wherein the one or more memories further bear computer-readable instructions that, when executed by the one or more processors, cause the system to determine from the one or more databases a first amount, a second amount, the identification of the item, identification of the seller, a first time information, and a second time information, wherein the first amount is associated with the first price information, the second amount is associated with the second price information, the first time information is associated with the time information, and the second time information is associated with said other time information; and wherein the instructions that, when executed on the system, cause the system to at least determine the price range, further cause the system to at least determine from the one or more databases the price range in relation to the first amount, the second amount, the first time information, and the second time information.

27. One or more non-transitory computer-readable storage media for storing a plurality of instructions for controlling at least one processing unit of one or more computers to obtain information pertaining to electronic commerce, that when executed on one or more systems, cause the one or more systems to perform operations comprising:

receiving first data from a first device, wherein the first data is associated with a retail item, the first data comprises first price information, information identifying the retail item, information identifying a seller, and an indication of an image, the image is associated with a sale receipt, and the first device is communicatively coupled to a first user;

storing in one or more databases a first image and at least a portion of information available in the first data, wherein the first image is associated with the indication of the image;

receiving second data from a second device, wherein the second data is associated with the retail item, the second data comprises second price information, information identifying the retail item, information identifying the seller, and an indication of another image, said another image is associated with another sale receipt, and the second device is communicatively coupled to a second user;

storing in the one or more databases a second image and at least a portion of information available in the second data, wherein the second image is associated with the indication of said another image;

determining from the one or more databases a price range in relation to the first price information and the second price information;

receiving a request from a third device, wherein the third device is communicatively coupled to a third user; and presenting a response to the third device, wherein the response comprises the price range, identification of the item, identification of the seller, and at least one indication of sale receipt, and the at least one indication of sale receipt is associated with at least one image from among the first image and the second image.

* * * * *